(12) United States Patent
Okamoto

(10) Patent No.: US 9,497,432 B2
(45) Date of Patent: Nov. 15, 2016

(54) MULTI-PROJECTOR SYSTEM, PROJECTOR DEVICE, ADJUSTMENT DEVICE, ADJUSTMENT METHOD, AND COMPUTER-READABLE RECORDING MEDIUM

(71) Applicant: JVC KENWOOD Corporation, Yokohama-shi, Kanagawa (JP)

(72) Inventor: Naoya Okamoto, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/980,068

(22) Filed: Dec. 28, 2015

(65) Prior Publication Data
US 2016/0112689 A1 Apr. 21, 2016

Related U.S. Application Data

(63) Continuation of application No. PCT/JP2014/068835, filed on Jul. 15, 2014.

(30) Foreign Application Priority Data

Jul. 19, 2013 (JP) .................. 2013-151002
Jan. 10, 2014 (JP) .................. 2014-003773

(51) Int. Cl.
*H04N 9/31* (2006.01)

(52) U.S. Cl.
CPC .......... *H04N 9/3179* (2013.01); *H04N 9/3138* (2013.01); *H04N 9/3147* (2013.01); *H04N 9/3182* (2013.01); *H04N 9/3194* (2013.01)

(58) Field of Classification Search
CPC ................. H04N 9/3179; H04N 9/3138; H04N 9/3147; H04N 9/3182; H04N 9/3188; H04N 9/3185; G06T 11/60; G06T 3/20; G06T 7/004; G06T 7/20
USPC ................................. 348/744–747, 806–808
IPC ...................................................... H04N 9/31
See application file for complete search history.

(56) References Cited

U.S. PATENT DOCUMENTS 6,717,625 B1 * 4/2004 Thielemans ............. H04N 9/31
348/745
7,857,464 B2 12/2010 Saito et al.
2009/0002637 A1 1/2009 Harada

FOREIGN PATENT DOCUMENTS

JP 2007-043274 2/2007

OTHER PUBLICATIONS

International Search Report for International Patent Application No. PCT/JP2014/068835 dated Sep. 9, 2014.

* cited by examiner

*Primary Examiner* — Sherrie Hsia
(74) *Attorney, Agent, or Firm* — Amin, Turocy & Watson LLP

(57) ABSTRACT

A multi-projector system includes two or more projection devices including a first projection device and a second projection device, an image output device configured to output an image to each of the two or more projection devices, and an adjustment device configured to adjust projection positions of projection images on a medium to be projected, the projection images being projected by the two or more projection devices, and a first projection image emitted by the first projection device, and a second projection image emitted by the second projection device being projected on the medium to be projected to have an overlapped region.

18 Claims, 27 Drawing Sheets

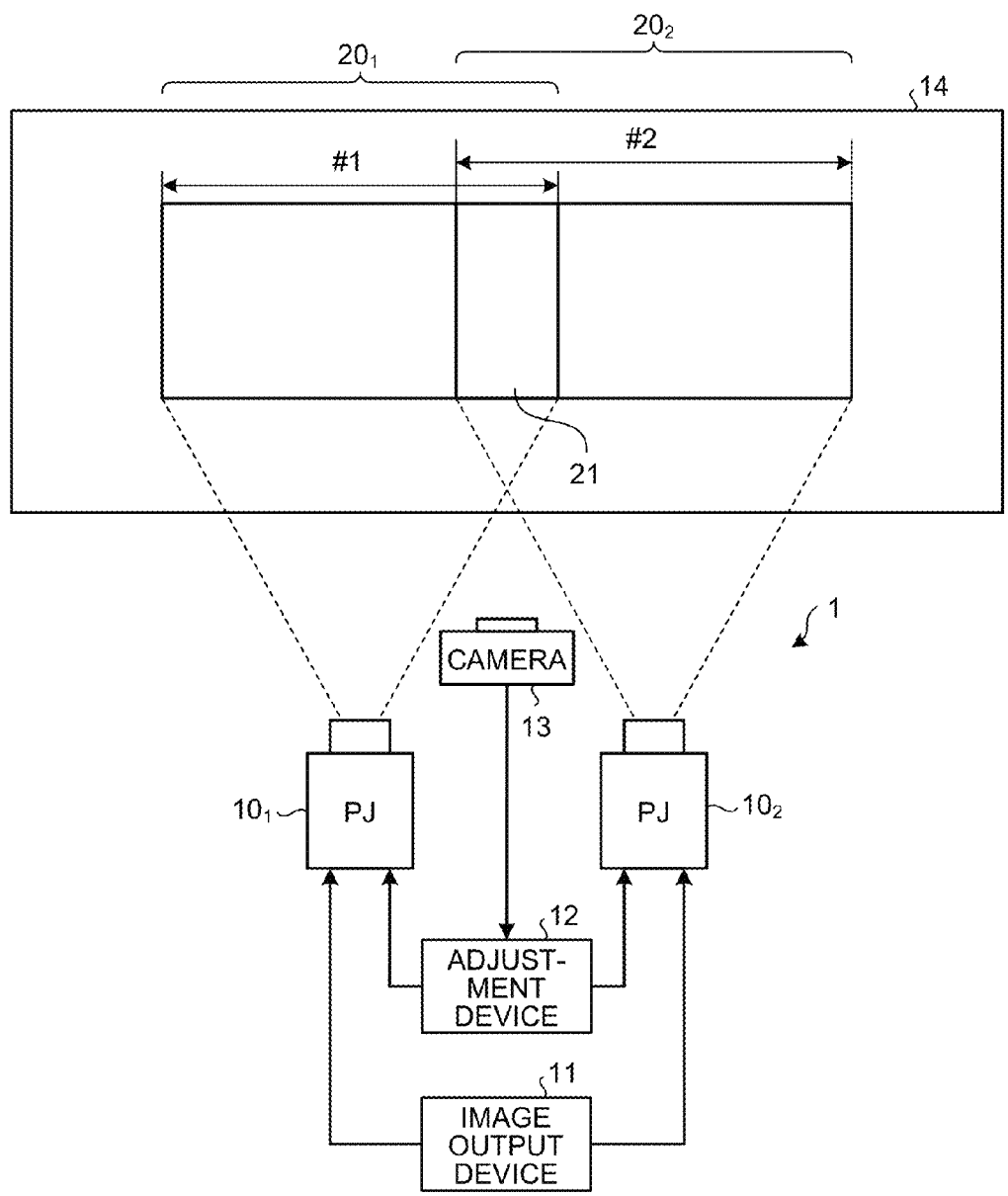

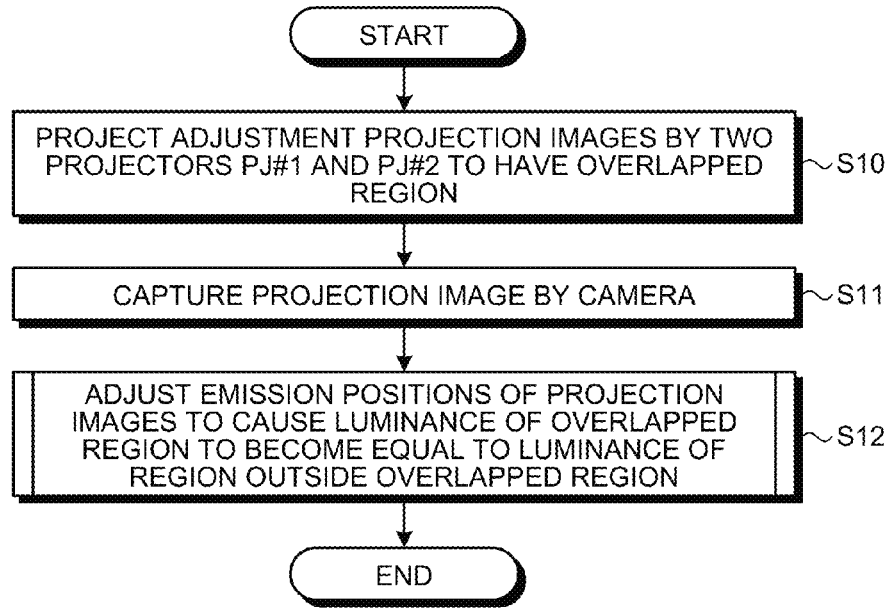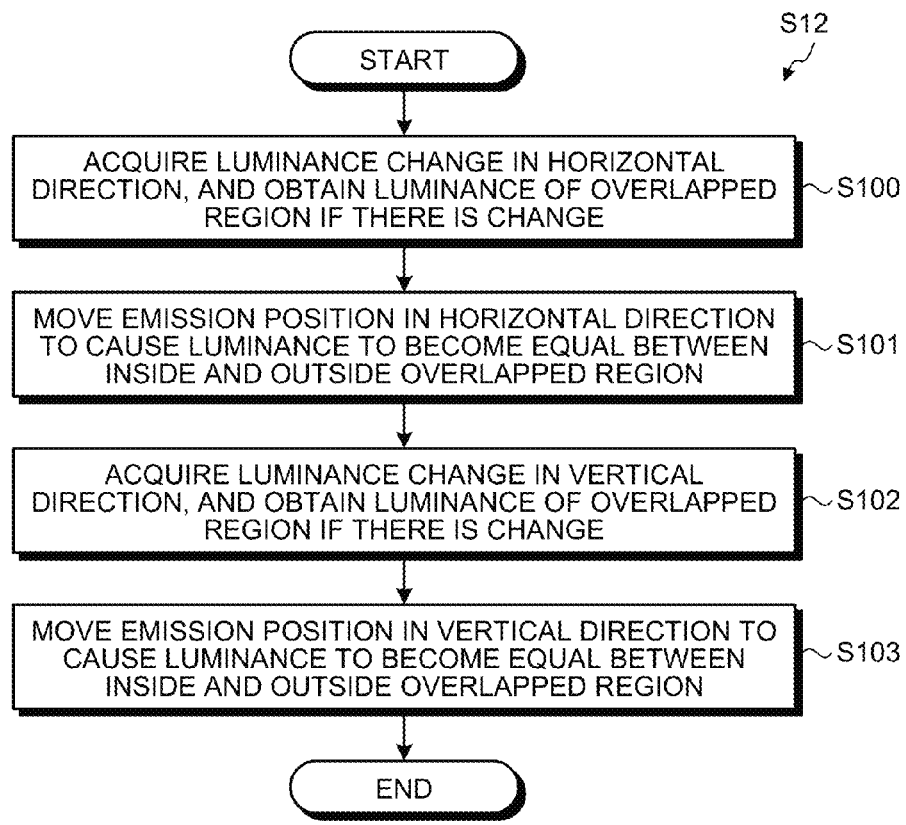

FIG.14A
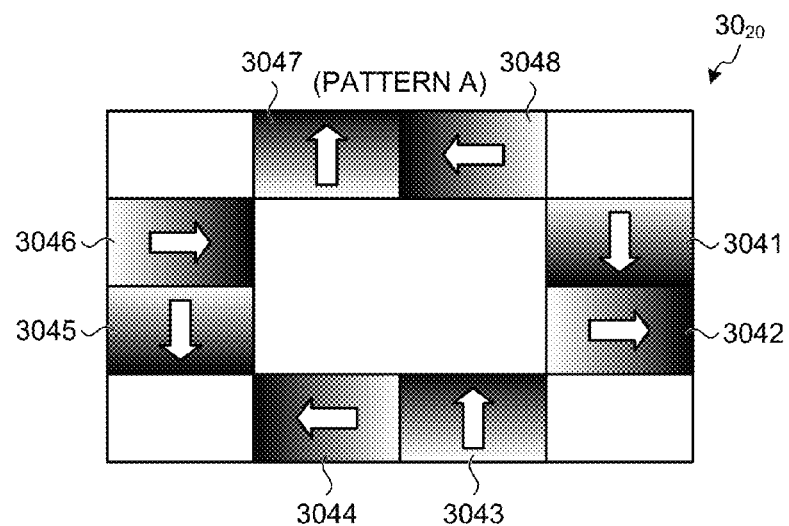
FIG.14B
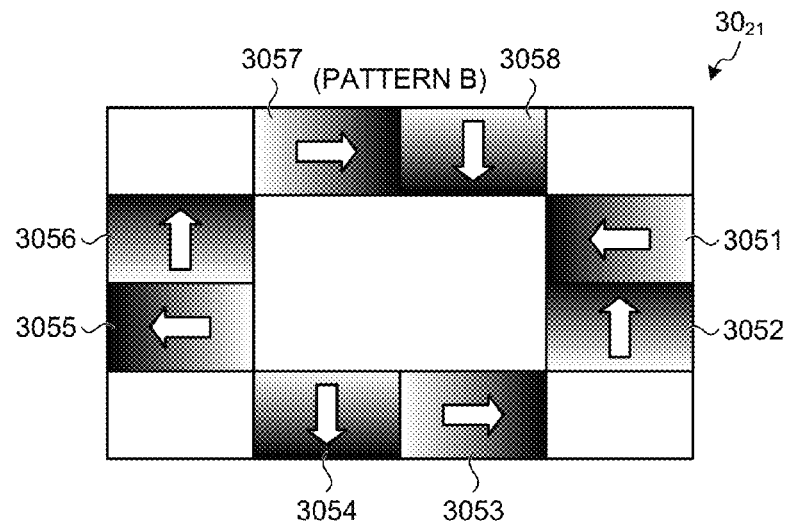
FIG.14C
| PATTERN A | PATTERN B | PATTERN A |
|---|---|---|
| PATTERN B | PATTERN A | PATTERN B |
| PATTERN A | PATTERN B | PATTERN A |

| PATTERN C | PATTERN C | PATTERN C |
|---|---|---|
| PATTERN C | PATTERN C | PATTERN C |
| PATTERN C | PATTERN C | PATTERN C |

FIG. 30A
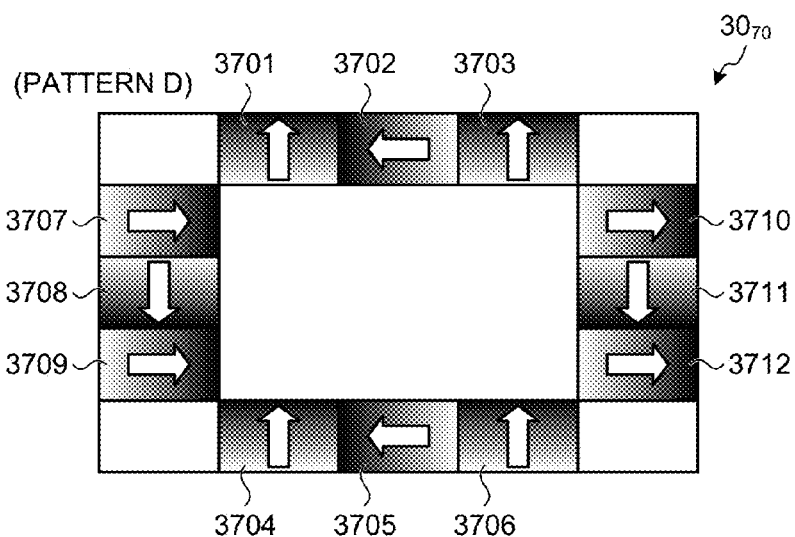
FIG. 30B
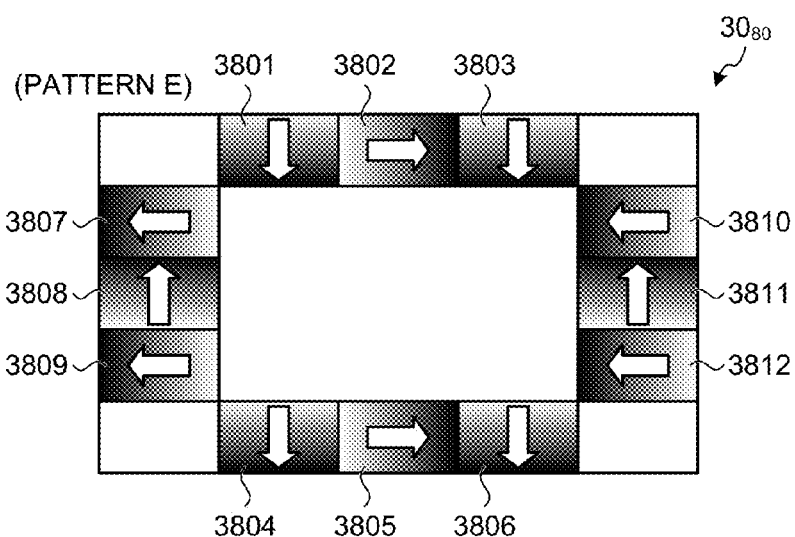
FIG. 30C
| PATTERN D | PATTERN E | PATTERN D |
|---|---|---|
| PATTERN E | PATTERN D | PATTERN E |
| PATTERN D | PATTERN E | PATTERN D |

MULTI-PROJECTOR SYSTEM, PROJECTOR DEVICE, ADJUSTMENT DEVICE, ADJUSTMENT METHOD, AND COMPUTER-READABLE RECORDING MEDIUM

CROSS-REFERENCE TO RELATED APPLICATIONS

This application is a continuation of PCT international application Ser. No. PCT/JP2014/068835 filed on Jul. 15, 2014 which designates the United States, incorporated herein by reference, and which claims the benefit of priority from Japanese Patent Application No. 2013-151002, filed on Jul. 19, 2013 and Japanese Patent Application No. 2014-003773, filed on Jan. 10, 2014, incorporated herein by reference.

BACKGROUND OF THE INVENTION

1. Field of the Invention

The present invention relates to a multi-projector system, a projector device, an adjustment device, an adjustment method, and a computer-readable recording medium.

2. Description of the Related Art

Conventionally, when a projection image having a larger size than a projection image by one projector device is necessary, a plurality of projection images by a plurality of projector devices is projected on one screen at the same time, and one large projection image as a whole has been obtained. As an example, a horizontally long image is divided into right and left images, and the divided images are adjacent in the horizontal direction, using two projector devices, and are projected on one screen so that one continuous projection image as a whole can be made. At this time, a superimposed region may be provided in adjacent portions of the projection images.

When the projection images by a plurality of projector devices are projected on one screen such that the projection images are continued, it is necessary to adjust positions of the projection images among the plurality of projector devices. As a method of positioning the projection images, conventionally, a method of capturing each projection image projected on a medium to be projected by a camera, recognizing relative positions of the projection images, based on the captured images, and adjusting the positions of the respective projection images has been used.

For example, Japanese Laid-open Patent Publication No. JP 2007-043274 A discloses a technology of adjusting respective projection positions of a plurality of projector devices, based on captured images obtained by projecting projection images on one medium to be projected by the plurality of projector devices, and capturing the projection images by a camera. According to Japanese Laid-open Patent Publication No. JP 2007-043274 A, the projection images, with which a superimposed portion whose mutual patterns are superimposed becomes white, are projected by the plurality of projector devices on the medium to be projected such that the superimposed portion is caused in the mutual patterns. The positional relationship of the projection images is obtained based on the captured image of the projection image on the superimposed portion captured by the camera.

However, the method of positioning projection images by the conventional technology has a problem that necessary accuracy may not be able to be obtained in the positioning when the resolution of the camera that captures the projection image is not sufficient. For example, when the camera does not have the resolution in units of pixels about the projection image in the captured image, it is difficult to highly accurately adjust the positions of the projection images.

SUMMARY OF THE INVENTION

It is an object of the present invention to at least partially solve the problems in the conventional technology. The present invention provides a multi-projector system that includes two or more projection devices including a first projection device and a second projection device, an image output device configured to output an image to each of the two or more projection devices, and an adjustment device configured to adjust projection positions of projection images on a medium to be projected, the projection images being projected by the two or more projection devices, and a first projection image emitted by the first projection device, and a second projection image emitted by the second projection device being projected on the medium to be projected to have an overlapped region, wherein each of the projection devices includes a light emission unit configured to modulate light from a light source according to an input image to emit the light as the projection image, and an emission position adjustment unit configured to adjust an emission position of the light by the light emission unit, the image output device includes an output unit configured to output a first adjustment image and a second adjustment image, as the input images of the first projection device and the second projection device, respectively, the first adjustment image having an adjustment region formed in a region corresponding to the overlapped region of the first projection image, the adjustment region including a first gradation region and a second gradation region in which directions of luminance gradients intersect with each other, and the second adjustment image having an adjustment region formed in a region corresponding to the overlapped region of the second projection image, the adjustment region including a third gradation region having a direction of a luminance gradient being opposite to the first gradation region, and a fourth gradation region having a direction of a luminance gradient being opposite to the second gradation region, and in which the third gradation region is arranged in a position corresponding to the first gradation region, and the fourth gradation region is arranged in a position corresponding to the second gradation region, the adjustment device includes a capturing unit being configured to capture the projection image projected on the medium to be projected and output a captured image, an analysis unit being configured to acquire first luminance of a region where the first gradation region and the third gradation region are overlapped, the first gradation region and the third gradation region being included in the overlapped region of a first adjustment projection image projected on the medium to be projected by the first projection device based on the first adjustment image, and a second adjustment projection image projected on the medium to be projected by the second projection device based on the second adjustment image, second luminance of a region where the second gradation region and the fourth gradation region are overlapped, and third luminance of a region outside the overlapped region, in at least one of the first adjustment projection image and the second adjustment projection image, by analyzing the captured image, a control unit being configured to output a control signal for controlling the emission position adjustment unit of the projection device so that each of the first luminance and the second luminance acquired by the analysis unit is matched with the third luminance. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram schematically illustrating a multi-projector system according to a first embodiment;

FIG. 6 is a flowchart illustrating an example of positioning processing according to the first embodiment;

FIG. 7 is a flowchart illustrating the positioning processing according to the first embodiment in more detail in more detail;

FIG. 14A is a diagram illustrating an example of adjustment projection image according to a second modification of the first embodiment;

FIG. 14B is a diagram illustrating an example of adjustment projection image according to a second modification of the first embodiment;

FIG. 14C is a diagram illustrating an example of adjustment projection image according to a second modification of the first embodiment;

FIG. 30A is a diagram illustrating a second example of an adjustment projection image according to a second modification of the fifth embodiment;

FIG. 30B is a diagram illustrating the second example of an adjustment projection image according to the second modification of the fifth embodiment; and FIG. 30C is a diagram illustrating the second example of an adjustment projection image according to the second modification of the fifth embodiment.

DETAILED DESCRIPTION OF THE PREFERRED EMBODIMENTS

Figure 2A:
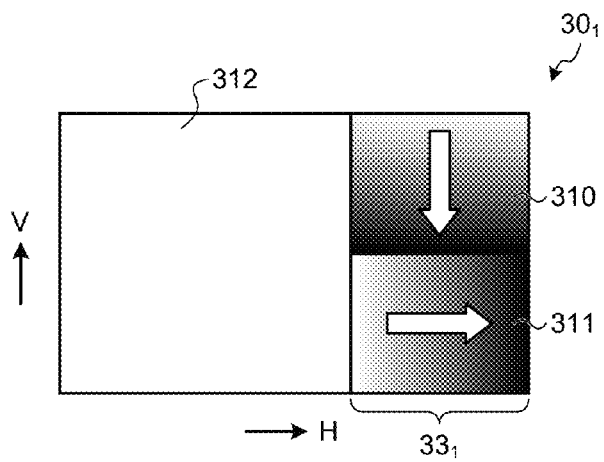
FIG. 2A is a diagram for describing a method of adjusting an emission position of projected light according to the first embodiment.

Hereinafter, favorable embodiments of a multi-projector system, a projector device, an adjustment device, an adjustment method, and a computer-readable recording medium according to the present invention will be described with reference to the drawings. Specific numerical values and external configurations described in the embodiments according to the present invention are mere examples for easy understanding of the present invention, and do not limit the present invention unless otherwise specified. Note that detailed description and illustration of elements not directly relevant to the present invention are omitted.

First Embodiment

FIG. 1 schematically illustrates a multi-projector system according to a first embodiment. A multi-projector system 1 illustrated in FIG. 1 includes a plurality of projector devices (PJs) $10_1$ and $10_2$, an image output device 11, an adjustment device 12, and a camera 13.

The image output device 11 outputs image data to each of the projector devices $10_1$ and $10_2$. The projector devices $10_1$ and $10_2$ respectively input the image data output from the image output device 11, as input image data. The projector devices $10_1$ and $10_2$ respectively apply predetermined image processing to the input image data to generate projection image data, modulate light from a light source with an optical modulator, based on the projection image data, to project the projection image data on a screen 14, as projection images $20_1$ and $20_2$. Note that the projector devices $10_1$ and $10_2$ are horizontally installed.

Here, the two projector devices $10_1$ and $10_2$ project the projection images $20_1$ and $20_2$ on the common screen 14 to overlap end portions that face each other, with a predetermined width. The portion where projection image $20_1$ and the projection image $20_2$ are overlapped is called an overlapped region 21.

When the two projection images $20_1$ and $20_2$ are arranged and projected on the one screen 14 as described above, the two projector devices $10_1$ and $10_2$ project the projection images $20_1$ and $20_2$ to cause a joint portion of the projection images $20_1$ and $20_2$ to have the overlapped region 21 on the screen 14. At this time, each of the projection images $20_1$ and $20_2$ arranges the same image with halved luminance on a region corresponding to the overlapped region 21. Accordingly, the two projection images $20_1$ and $20_2$ are projected on the screen 14 as if the two projection images were one large continuous projection image.

In this case, the projector devices $10_1$ and $10_2$ need to project the projection images $20_1$ and $20_2$ at correct positions on the screen 14. To be more specific, the projector devices $10_1$ and $10_2$ respectively adjust projection positions of the projection images $20_1$ and $20_2$ on the screen 14 in each of a horizontal direction and a vertical direction to match a position where the region corresponding to the overlapped region 21 in the projection image $20_1$ is projected, and a position where the region corresponding to the overlapped region 21 in the projection image $20_2$ is projected.

Hereinafter, a positional relationship between the projection images $20_1$ and $20_2$ of when the positions where the regions corresponding to the overlapped region 21 are projected are matched between the projection image $20_1$ and the projection image $20_2$ is appropriately called a correct positional relationship.

Here, it is favorable to adjust the projection positions of the projection images $20_1$ and $20_2$ in units of pixels. For example, when one continuous image is divided into two images, and the two images are projected as the projection images $20_1$ and $20_2$, if the positions of the two images are shifted in the horizontal and vertical directions even by one pixel, the projection images becomes discontinuous at the portion, and the portion may provide a feeling of strangeness.

The multi-projector system 1 according to the first embodiment determines the positions of the projection images $20_1$ and $20_2$ so that the projection images $20_1$ and $20_2$ have the overlapped region 21, when the projector devices $10_1$ and $10_2$ project the projection images $20_1$ and $20_2$ on the screen 14. Then, the camera 13 included in the multi-projector system 1 captures an image including the overlapped region 21 on the screen 14, and the multi-projector system 1 adjusts emission positions of projected light by the projector devices $10_1$ and $10_2$ so that the projection images $20_1$ and $20_2$ can be projected at correct positions, based on a result of an analysis of captured image data by the adjustment device 12. By adjustment of the emission positions of the projected light, the projection positions of the projection images are adjusted.

Figure 2B:
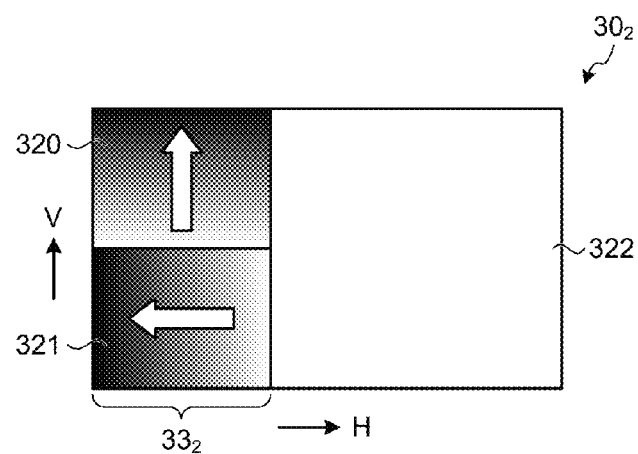
FIG. 2B is a diagram for describing a method of adjusting an emission position of projected light according to the first embodiment.
Figure 2C:
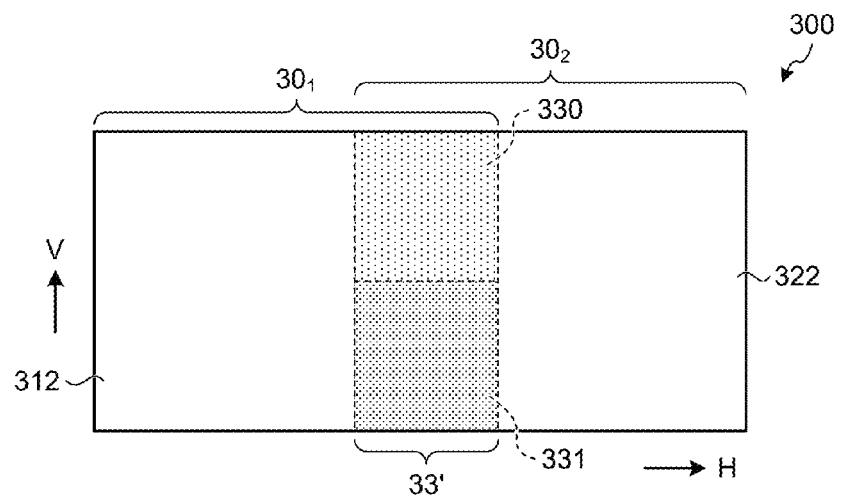
FIG. 2C is a diagram for describing a method of adjusting an emission position of projected light according to the first embodiment.

A method of adjusting emission positions of projected light according to the first embodiment will be schematically described using FIGS. 2A to 2C. Hereinafter, the projector devices $10_1$ and $10_2$ project the respective projection images on the screen 14 side by side in the horizontal direction. Further, for convenience, the projector device $10_1$ projects a first projection image on the left side of the screen 14, and the projector device $10_2$ projects a second projection image on the right side of the screen 14. Therefore, the overlapped region is configured such that a part of a right end of the first projection image by the projector device $10_1$ and a part of a left end of the second projection image by the projector device $10_2$ are overlapped on the screen 14.

In the multi-projector system 1 according to the first embodiment, the image output device 11 outputs image data for positioning, for each of the projector devices $10_1$ and $10_2$. FIGS. 2A and 2B illustrate examples of projection images with the image data for positioning. FIG. 2A illustrates an example of a projection image $30_1$ (adjustment projection image $30d$ with the image data for positioning output for the projector device $10_1$. FIG. 2B illustrates an example of a projection image $30_2$ (adjustment projection image $30_2$) with the image data for positioning output for the projector device $10_2$.

Note that, in FIGS. 2A and 2B and similar drawings below, the vertical direction is a vertical direction (V) of an image, and a lateral direction is a horizontal direction (H) of the image.

A right-end portion of the adjustment projection image $30_1$ illustrated in FIG. 2A and a left-end portion of the adjustment projection image $30_2$ illustrated in FIG. 2B are overlapped, and the adjustment projection images $30_1$ and $30_2$ are projected on the screen 14. FIG. 2C illustrates an example of overlapped and projected adjustment projection images $30_1$ and $30_2$. In FIG. 2C, a portion where the adjustment projection images $30_1$ and $30_2$ are overlapped is illustrated as an overlapped region 33'. Further, a projection image including a left end of the adjustment projection image $30_1$ to a right end of the adjustment projection image $30_2$ projected on the screen 14 is called an entire projection image 300.

A region $33_1$ corresponding to the overlapped region 33' in the adjustment projection image $30_1$ exemplarily illustrated in FIG. 2A includes two regions 310 and 311. The region 310 is an image with a gradation in which luminance is decreased from an upper side to a lower side in the vertical direction at a fixed gradient, as illustrated by the arrow in the drawing. Further, the region 311 is an image with a gradation in which the luminance is decreased from a left side to a right side in the drawing at a fixed gradient, in a direction intersecting with the direction of the luminance gradient of the gradation of the region 310 (see the arrow in the drawing).

Here, maximum luminance and minimum luminance by the gradation are maximum luminance and minimum luminance in image data, respectively. As an example, when a bit depth of each pixel that configures the image data is eight bits, a luminance value of the maximum luminance is 255 and a luminance value of the minimum luminance is 0, and the luminance is decreased from the luminance value 255 to the luminance value 0 by the gradation. Further, the luminance gradient in the gradation is changed in a linear function manner. Hereinafter, the regions 310 and 311 including the gradation with luminance are called a gradation region 310 and a gradation region 311, respectively.

A region 312 other than the gradation regions 310 and 311 in the adjustment projection image $30_1$ has the luminance value that is the maximum luminance of the image data. Although details will be described below, the luminance of the region 312 serves as a reference in performing positioning processing. Therefore, hereinafter, the region 312 is called a reference region 312.

A region $33_2$ corresponding to the overlapped region 33' in the adjustment projection image $30_2$ exemplarily illustrated in FIG. 2B includes two regions 320 and 321. These regions 320 and 321 are gradation regions respectively having luminance gradients in opposite directions to the above-described gradation regions 310 and 311. That is, the gradation region 320 is an image with gradation in which the luminance is decreased from the lower side to the upper side with a fixed gradient, as illustrated by the arrow in the drawing. Further, the gradation region 321 is an image with gradation in which the luminance is decreased from the right side to the left side in the drawing at a fixed gradient, in a direction intersecting with the direction of the luminance gradient of the gradation of the region 320.

Further, a region 322 other than the gradation regions 320 and 321 has the luminance value that is the maximum luminance of the image data. The region 322 is a reference region 322 that serves as a reference in performing the positioning processing.

Note that it is desirable that the direction of the decrease in the luminance in the region 311 and the direction of the decrease in the luminance in the region 310 are perpendicular to each other. Further, the direction of the luminance gradient in the region 310 may not necessarily be the vertical direction. Hereinafter, description will be given on the assumption that the direction of the decrease in the luminance in the region 311 and the direction of the decrease in the luminance in the region 310 are perpendicular to each other, and the direction of the luminance gradient in the region 310 is the vertical direction.

The projector devices $10_1$ and $10_2$ configured as described above project the adjustment projection images $30_1$ and $30_2$ on the screen 14 in a manner that the regions $33_1$ and $33_2$ are overlapped. Then, the image of the gradation region 310 and the image of the gradation region 320 are composited to become an image of a region 330 illustrated in FIG. 2C. Similarly, the image of the gradation region 311 and the image of the gradation region 321 are composited to become an image of the region 331 illustrated in FIG. 2C. That is, in the regions 330 and 331, the gradation images with the luminance inclined in mutually opposite directions are composited.

At this time, when the projection position of the adjustment projection image $30_1$ and the projection position of the adjustment projection image $30_2$ are in a correct positional relationship, the luminance of the regions 330 and 331 becomes the same as the luminance of the regions 312 and 322 around the overlapped region 33', and a projection image with a uniform luminance can be obtained as a whole. Meanwhile, when the projection positions of the adjustment projection images $30_1$ and $30_2$ are not in the correct positional relationship, the luminance of the regions 330 and 331 becomes different from the luminance of the regions 312 and 322 around the overlapped region 33', and the projection image with a uniform luminance cannot be obtained.

In the first embodiment, the emission positions of the projection images by the projector devices $10_1$ and $10_2$ are adjusted based on a difference between the luminance of the regions 330 and 331, and the luminance of the reference region 312 or 322, and positioning of the projection image by the projector device $10_1$ and the projection image by the projector device $10_2$ is performed.

Figure 3A:
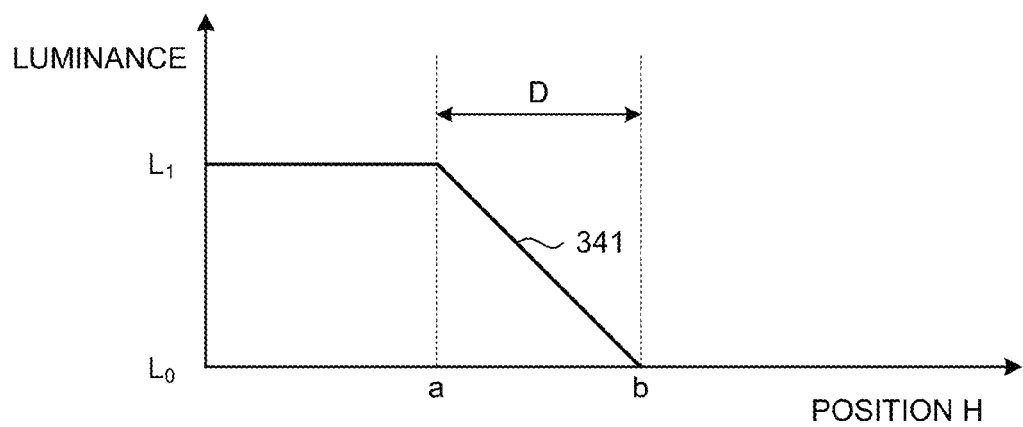
FIG. 3A is a diagram for describing positioning using a gradation image according to the first embodiment.

Positioning using gradation images according to the first embodiment will be schematically described using FIGS. 3A and 3B and 4A to 4C. Note that, in FIGS. 3A and 3B, and 4A to 4C, the vertical axis represents the luminance, and the horizontal axis represents a position (described as position H) in the horizontal direction. FIG. 3A illustrates an example of luminance change of the adjustment projection image $30_1$ illustrated in FIG. 2A in the horizontal direction, including the gradation region 311. In FIG. 3A, a position a illustrates a boundary between the gradation region 311 and the region 312, and a position b illustrates a right end of the gradation region 311, that is, a right end of the adjustment projection image $30_1$. Therefore, a distance D between the position a and the position b illustrates a width of the overlapped region 33' in the horizontal direction. The luminance of the region 312 is luminance $L_1$. As illustrated by a line 341, in the distance D from the position a to the position b, the luminance is decreased from the luminance $L_1$ to luminance $L_0$ at a predetermined gradient.

Figure 3B:
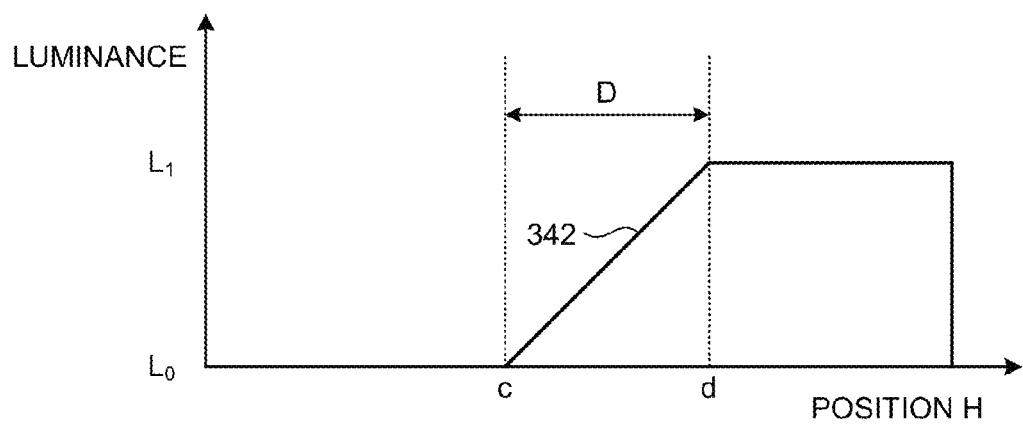
FIG. 3B is a diagram for describing positioning using a gradation image according to the first embodiment.

FIG. 3B illustrates an example of luminance change of the adjustment projection image $30_2$ illustrated in FIG. 2B in the horizontal direction, including gradation region 321. In FIG. 3B, a position c illustrates a left end of the gradation region 321, that is, a left end of the adjustment projection image $30_2$, a position d illustrates a boundary between the gradation region 321 and the region 322. The luminance of the region 322 is luminance $L_1$, similarly to the region 312. In this example, as illustrated by a line 342, in a distance D from the position c to the position d, the luminance is increased from the luminance $L_0$ to the luminance $L_1$ at a predetermined gradient.

Figure 4A:
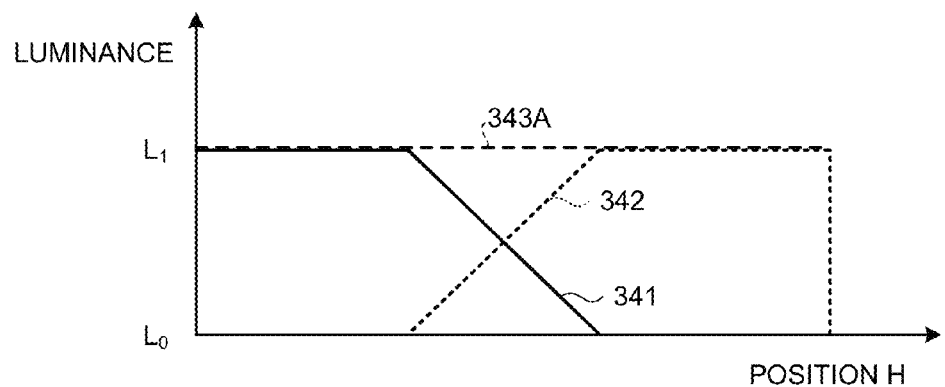
FIG. 4A is a diagram for describing positioning using a gradation image according to the first embodiment.
Figure 4B:
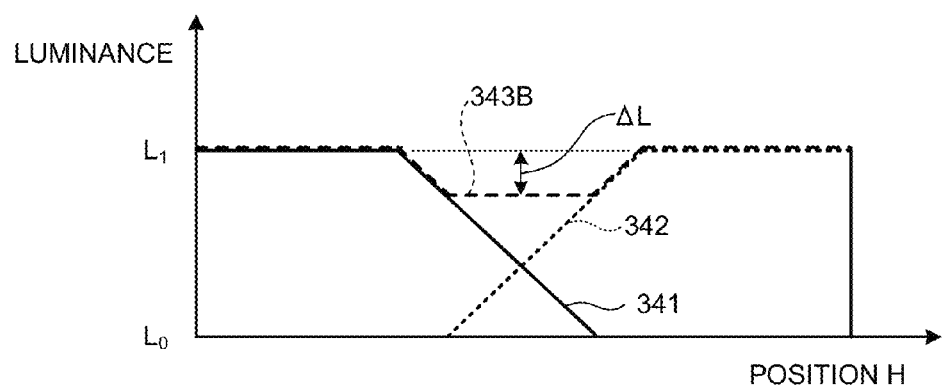
FIG. 4B is a diagram for describing positioning using a gradation image according to the first embodiment.
Figure 4C:
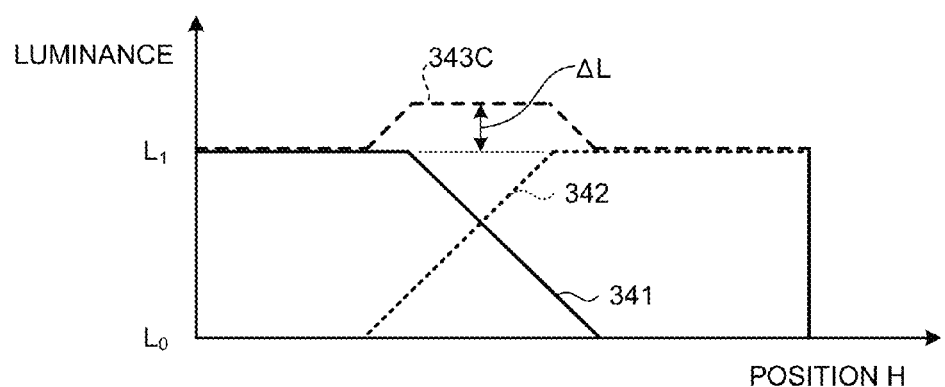
FIG. 4C is a diagram for describing positioning using a gradation image according to the first embodiment.

FIGS. 4A to 4C illustrate luminance change in the horizontal direction of when the regions $33_1$ and $33_2$ of the adjustment projection images $30_1$ and $30_2$ are matched and overlapped. An example of the luminance change of a case where the positions of the regions $33_1$ and $33_2$ are matched in the horizontal direction and overlapped in the correct positional relationship is illustrated by a line 343A in FIG. 4A. When the maximum value and the minimum value of the luminance are the same in the two gradations in which the luminance gradients are in the opposite direction to each other as described above, the adjustment projection images $30_1$ and $30_2$ are overlapped such that the luminance is matched in the center of the mutual gradients, that is, at a position where the luminance is ½ of the maximum value, so that the projection image in which the luminance takes the maximum value (luminance $L_1$) and there is no luminance change, as a whole, can be obtained.

FIG. 4B illustrates an example of luminance change of when the regions $33_1$ and $33_2$ are away from each other with respect to the correct positional relationship and overlapped. In this case, the luminance is matched between the regions $33_1$ and $33_2$ at positions where the luminance is less than ½ of the maximum value on the mutual gradients of the two gradations. Therefore, as exemplarily illustrated by a line 343B, in a portion where gradient portions of the lines 341 and 342 are overlapped with each other, the luminance of the projection image becomes less than the luminance $L_1$, and becomes darker than the surroundings (the regions 312 and 322) by luminance ΔL that is a difference from the luminance $L_1$.

FIG. 4C illustrates an example of luminance change of when the regions $33_1$ and $33_2$ are brought close to each other with respect to the correct positional relationship and overlapped. In this case, the luminance is matched between the regions $33_1$ and $33_2$ at a position where the luminance exceeds ½ of the maximum value on the mutual gradients of the two gradations. Therefore, as exemplarily illustrated by a line 343C, in a portion where the gradient portions of the lines 341 and 342 are overlapped, the luminance of the projection image exceeds the luminance $L_1$, and becomes brighter than the surroundings (the regions 312 and 322) by luminance ΔL that is a difference from the luminance $L_1$.

As described above, according to the first embodiment, the gradation regions where the directions of the luminance gradients are opposite to each other are provided in the regions $33_1$ and $33_2$. Therefore, misregistration of the positions of when the regions $33_1$ and $33_2$ are overlapped appears as the luminance of the overlapped region 33' where the regions $33_1$ and $33_2$ are overlapped. In the first embodiment, the emission positions of the projected light projected by the projector devices $10_1$ and $10_2$ are adjusted by acquisition of the luminance of the overlapped region 33'.

Figure 5:
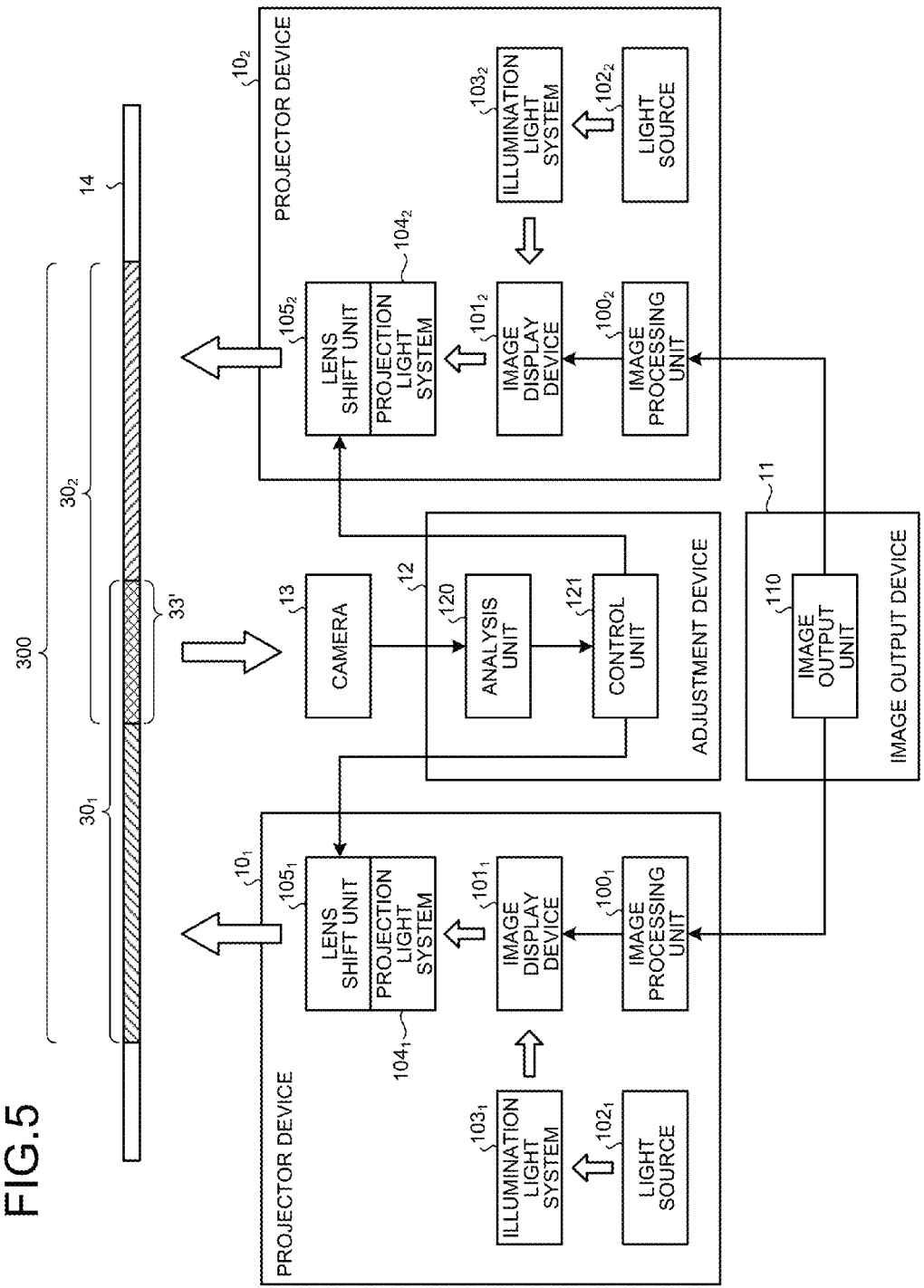
FIG. 5 is a block diagram illustrating a configuration of an example of the multi-projector system according to the first embodiment in more detail.

FIG. 5 illustrates a configuration of an example of the multi-projector system 1 according to the first embodiment in more detail. Note that, in FIG. 5, a portion common to FIG. 1 described above is denoted with the same reference sign, and detailed description is omitted.

The image output device 11 includes an image output unit 110. The image output unit 110 outputs the adjustment image data for projecting the adjustment projection images $30_1$ and $30_2$. The adjustment image data is supplied to the projector devices $10_1$ and $10_2$, as the input image data, respectively.

The image output unit 110 may generate and output the adjustment image data with a predetermined program or the like, or may read and output the projection image data stored in read only memory (ROM) or the like. Further, FIG. 5 illustrates the image output device 11 is a common configuration to the projector devices $10_1$ and $10_2$. However, an embodiment is not limited to this example, and the image output devices 11 may be provided to the projector devices $10_1$ and $10_2$, respectively.

The projector device $10_1$ includes an image processing unit $100_1$, an image display device $101_1$, a light source $102_1$, an illumination light system $103_1$, a projection light system $104_1$, and a lens shift unit $105_1$. Similarly, the projector device $10_2$ includes an image processing unit $100_2$, an image display device $101_2$, a light source $102_2$, an illumination light system $103_2$, a projection light system $104_2$, and a lens shift unit $105_2$. In this way, the projector devices $10_1$ and $10_2$ can be realized with a common configuration. Therefore, hereinafter, the projector device $10_1$ will be exemplarily described.

In the projector device $10_1$, the light emitted from the light source $102_1$ is incident on the image display device $101_1$ through the illumination light system $103_1$. The image processing unit $100_1$ applies predetermined image processing to the input image data input to the projector device $10_1$, and outputs the input image data to the image display device $101_1$, as the projection image data.

The image display device $101_1$ is a liquid crystal on silicon (LCOS), and modulates and emits the incident light according to the image data. The image display device $101_1$ modulates and emits the light incident from the illumination light system $103_1$ according to the projection image data supplied from the image processing unit $100_1$. The light emitted from the image display device $101_1$ is projected on the screen 14 through the projection light system $104_1$ and the lens shift unit $105_1$, as the projection image. When the input image data input to the image processing unit $100_1$ is the image data for projecting the adjustment projection image $30_1$ output from the image output device 11, the adjustment projection image $30_1$ is projected on the screen 14.

Note that the lens shift unit $105_1$ can move an optical axis of the light emitted from the projection light system $104_1$ in the horizontal direction and the vertical direction, according to a control signal from a control unit 121 described below. The optical axis of the light emitted from the projection light system 104$_1$ is moved by the lens shift unit 105$_1$, so that the position of the projection image projected on the screen 14 can be adjusted.

The adjustment projection image 30$_2$ is similarly projected on the screen 14 from the projector device 10$_2$. At this time, the adjustment projection images 30$_1$ and 30$_2$ are projected on the screen 14 to form the overlapped region 33'.

The adjustment device 12 includes an analysis unit 120 and the control unit 121. The analysis unit 120 analyzes the captured image data captured by the camera 13 to include the entire projection image 300 on the screen 14, for example, and obtains the luminance change in the regions 330 and 331 as described above. The analysis unit 120 supplies information that indicates the obtained luminance change, to the control unit 121.

The control unit 121 generates a control signal for adjusting the projection positions of the adjustment projection images 30$_1$ and 30$_2$, that is, the emission positions of the projection images by the projector devices 10$_1$ and 10$_2$, based on the information that indicates the luminance change supplied from the analysis unit 120. The control signal for adjusting the emission position of the projector device 10$_1$ is supplied to the lens shift unit 105$_1$ of the projector device 10$_1$. Further, the control signal for adjusting the emission position of the projector device 10$_2$ is supplied to the lens shift unit 105$_2$ of the projector device 10$_2$.

Next, positioning processing executed by the above-described configuration will be described. FIG. 6 is a flowchart illustrating an example of positioning processing according to the first embodiment. Note that, hereinafter, the projector devices 10$_1$ and 10$_2$ project the projection image 20$_1$ and 20$_2$ on the screen 14 side by side in the horizontal direction, and the projection image 20$_1$ is arranged on the left side and the projection image 20$_2$ is arranged on the right side. Further, the adjustment projection images 30$_1$ and 30$_2$ described in FIGS. 2A and 2B are used in the positioning processing.

In FIG. 6, in step S10, the two projector devices 10$_1$ and 10$_2$ (respectively described as projectors PJ#1 and PJ#2 in FIG. 6) project the adjustment projection images 30$_1$ and 30$_2$ on the screen 14, respectively. At this time, the positions of the projector device 10$_1$ and 10$_2$, and the like are adjusted while the projection images on the screen 14 are checked by visual observation so that the images on the screen 14 by the adjustment projection images 30$_1$ and 30$_2$ have the overlapped region 33'. Therefore, the adjustment projection images 30$_1$ and 30$_2$ may be projected, including misregistration with respect to the correct positional relationship.

In next step S11, the camera 13 captures the projection image on the screen 14. The camera 13 captures the projection image such that a captured image includes at least the entire adjustment projection images 30$_1$ and 30$_2$ on the screen 14, and distortion of a subject image due to a tilt angle is not caused. The captured image is supplied to the adjustment device 12, and is input to the analysis unit 120.

In next step S12, the analysis unit 120 analyzes the input captured image, and obtains the luminance in the region 330 where the gradation regions 310 and 320 are overlapped, and the luminance in the region 331 where the gradation regions 311 and 321 are overlapped, as illustrated in FIG. 2C. Further, the analysis unit 120 obtains the luminance of at least one of the regions 312 and 322 outside the overlapped region 33'. The analysis unit 120 supplies information that indicates the obtained luminance to the control unit 121.

The control unit 121 generates the control signal for adjusting the emission positions of the projection images by the projector devices 10$_1$ and 10$_2$ so that the luminance in the regions 330 and 331 becomes equal to the luminance in the region outside the overlapped region 33', based on the luminance supplied from the analysis unit 120. The control unit 121 supplies the generated control signal to the lens shift unit 105$_1$ of the projector device 10$_1$, for example.

An embodiment is not limited to the above example, and the control unit 121 may supply the control signal to the lens shift unit 105$_2$ of the projector device 10$_2$, or may supply the control signal to each of the lens shift units 105$_1$ and 105$_2$.

The lens shift unit 105$_1$ moves the optical axis of the light to be emitted in the horizontal direction and in the vertical direction, according to the supplied control signal, and adjusts the emission position of the projection image. Accordingly, the positional relationship between the adjustment projection images 30$_1$ and 30$_2$ projected on the screen 14 is modified to the correct positional relationship.

Figure 8:
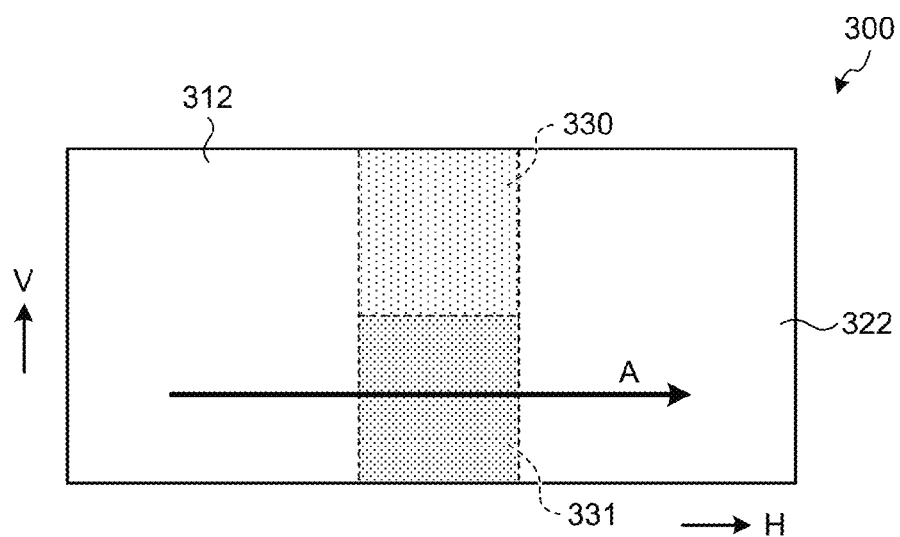
FIG. 8 is a diagram for describing a method of acquiring a luminance change in a horizontal direction according to the first embodiment.

FIG. 7 is a flowchart illustrating the processing of step S12 of FIG. 6 in more detail. In step S100, the analysis unit 120 acquires the luminance change in the horizontal direction, including the region 331, and obtains the luminance of the region 331. As an example, as exemplarily illustrated in FIG. 8, the analysis unit 120 scans pixels in the horizontal direction to include the region 331, and at least one of the regions 312 and 322, as illustrated by the arrow A, in the entire projection image 300 included in the captured image supplied from the camera 13, and obtains the luminance values of the respective pixels.

At this time, the analysis unit 120 may scan only one line, or may scan several lines and average and use the luminance values of respective pixels of corresponding positions in the vertical direction. The analysis unit 120 supplies the luminance values of the respective pixels obtained through the scan, to the control unit 121.

In next step S101, the control unit 121 calculates a position adjustment amount in the horizontal direction for the emission position of the projection image, based on the luminance values of the respective pixels supplied from the analysis unit 120. Then, the control unit 121 generates the control signal for moving the optical axis in the horizontal direction in the lens shift unit 105$_1$, based on the calculated position adjustment amount. The control unit 121 supplies the generated control signal to the lens shift unit 105$_1$. Accordingly, the optical axis is moved in the horizontal direction and the projection position in the horizontal direction is adjusted in the lens shift unit 105$_1$.

Note that the control unit 121 stores the luminance value acquired from the region 312 or 322 to a register or the like.

Figure 9:
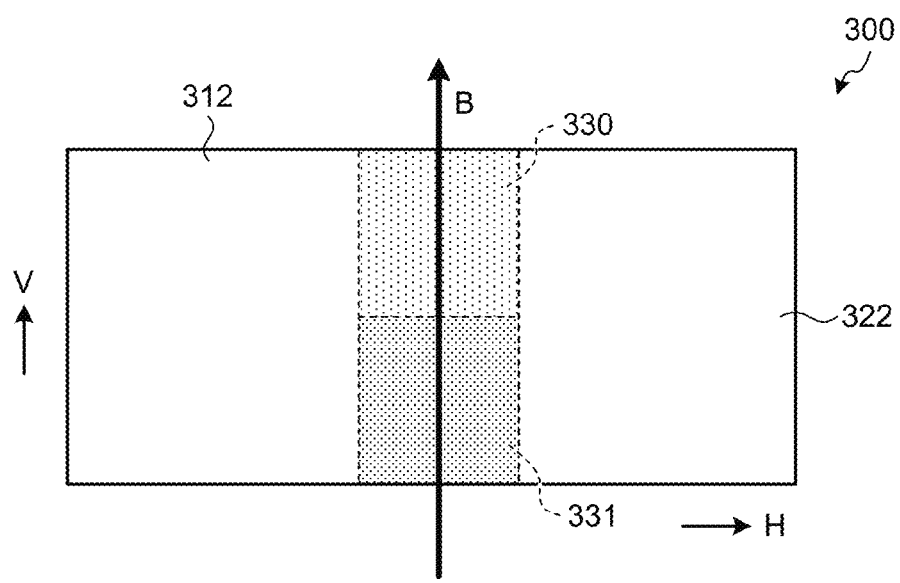
FIG. 9 is a diagram for describing a method of acquiring a luminance change in a vertical direction according to the first embodiment.

In next step S102, the analysis unit 120 acquires the luminance change in the vertical direction, including the region 330, and obtains the luminance of the region 330. To be more specific, as exemplarily illustrated in FIG. 9, the analysis unit 120 scans the pixels in the vertical direction to include the region 330, as illustrated by the arrow B, in the entire projection image 300 included in the captured image supplied from the camera 13, and obtains the luminance values of the respective pixels.

At this time, the analysis unit 120 may scan one line, or may scan several lines and average and use the luminance values of the respective pixels of corresponding positions in the horizontal direction. The analysis unit 120 supplies the luminance values of the respective pixels obtained through the scan, to the control unit 121.

In next step S103, the control unit 121 calculates a position adjustment amount in the vertical direction for the emission position of the projection image, based on the luminance values of the respective pixels supplied from the analysis unit 120, and the luminance values of the pixels of the region 312 or 322 stored in step S101 The control unit 121 then generates the control signal for moving the optical axis in the vertical direction in the lens shift unit $105_1$, based on the calculated position adjustment amount. The control unit 121 supplies the generated control signal to the lens shift unit $105_1$. Accordingly, the optical axis is moved in the vertical direction and the projection position in the vertical direction is adjusted in the lens shift unit $105_1$.

Note that the above description has been given, in which the adjustment of the emission position in the horizontal direction and the adjustment of the emission position of the vertical direction are separately performed in steps S101 and S103. However, an embodiment is not limited to this example. For example, the control unit 121 may acquire the luminance change in the vertical direction by the processing of step S102, after acquiring the luminance change in the horizontal direction by the processing of step S100, and generate the control signal for moving the optical axis in the horizontal and vertical directions in the lens shift unit $105_1$, based on the obtained luminance change in the horizontal and vertical directions. Alternatively, the camera 13 may capture the projection image again after the processing of step S101, and the control unit 121 may perform the processing of step S102 and the subsequent steps based on the re-captured image.

The processing of the control unit 121 in step S101 will be described in more detail, using FIGS. 10, and 11A to 11C. FIGS. 11A to 11C are diagrams corresponding to the above-descried FIGS. 4A to 4C. Portions corresponding to FIGS. 4A to 4C are denoted with the same reference signs, and detailed description is omitted.

Figure 10:
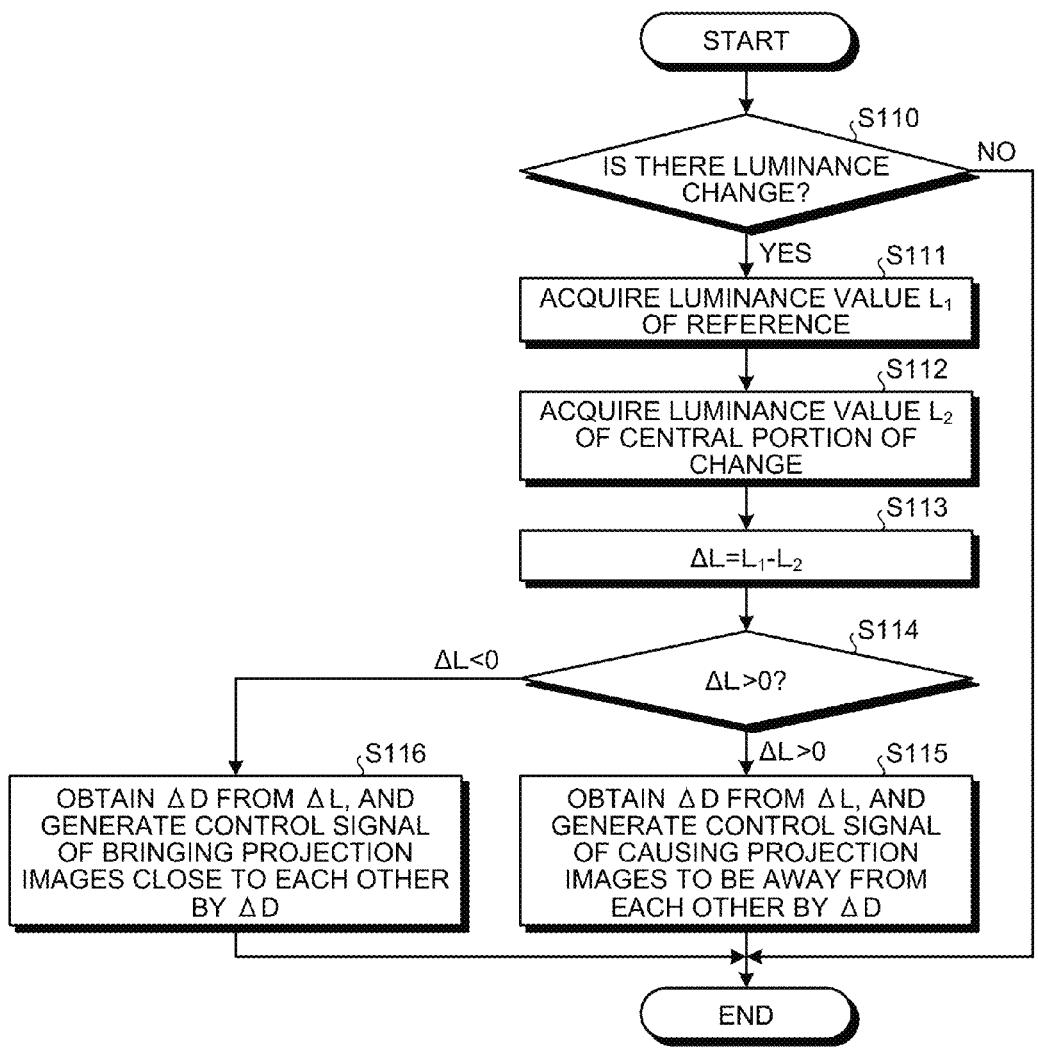
FIG. 10 is a flowchart illustrating an example of processing of moving an emission position in the horizontal direction according to the first embodiment.
Figure 11A:
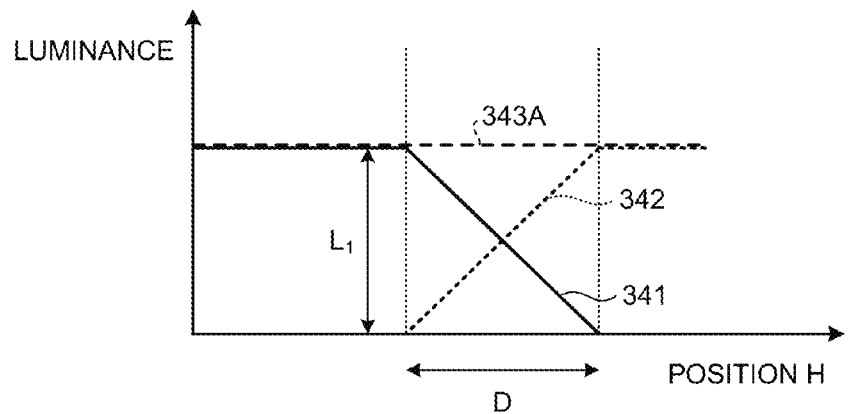
FIG. 11A is a diagram for describing the processing of moving an emission position in the horizontal direction according to the first embodiment.
Figure 11B:
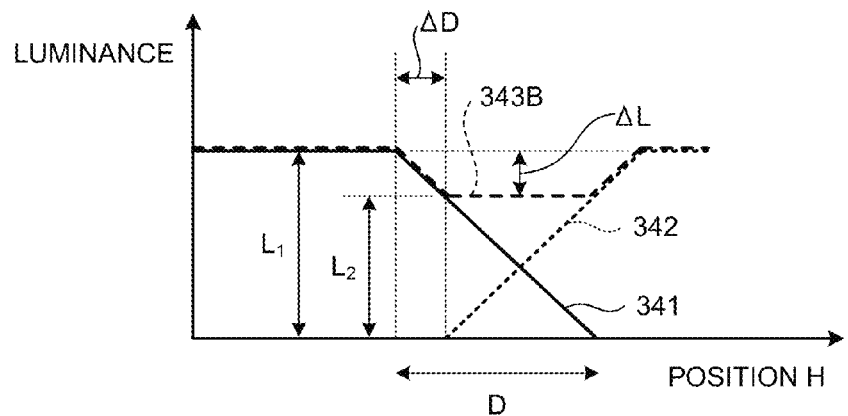
FIG. 11B is a diagram for describing the processing of moving an emission position in the horizontal direction according to the first embodiment.
Figure 11C:
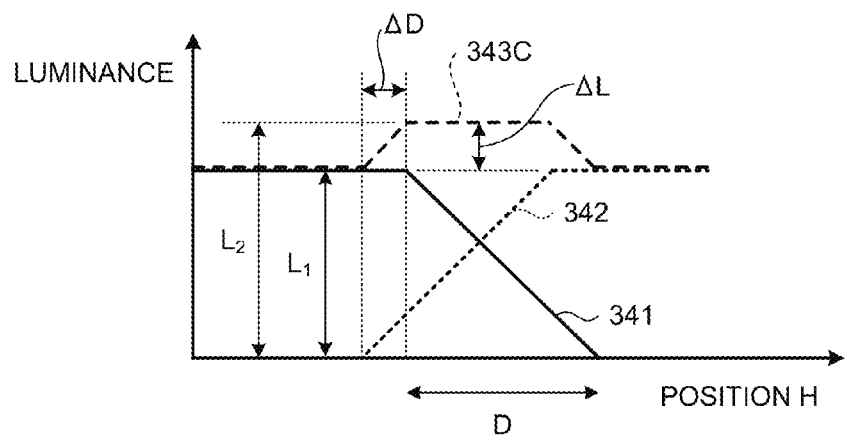
FIG. 11C is a diagram for describing the processing of moving an emission position in the horizontal direction according to the first embodiment.

In the flowchart of FIG. 10, in step S110, the control unit 121 determines whether the luminance values of the respective pixels supplied from the analysis unit 120 have been changed in the horizontal direction. When all of the luminance values of the respective pixels supplied from the analysis unit 120 fall within a predetermined range, the control unit 121 determines that there is no change in the luminance values. In this case, as illustrated by a line 343A of FIG. 11A, it can be determined that the luminance value is constant as a whole, and the adjustment projection images $30_1$ and $30_2$ are projected in the correct positional relationship. Therefore, the control unit 121 terminates a series of processing with the flowchart of FIG. 10 without generating the control signal for moving the optical axis for the lens shift unit $105_1$.

Meanwhile, in step S110, when the control unit 121 determines that the luminance values of the respective pixels supplied from the analysis unit 120 have been changed, the control unit 121 moves the processing onto step S111. In step S111, the control unit 121 acquires the luminance value $L_1$ as the reference, from the luminance values of the respective pixels supplied from the analysis unit 120. For example, the control unit 121 acquires, a pixel value of a pixel in a position determined in the reference region 312 or 322 in advance, in the horizontal direction, as the luminance value $L_1$ as the reference. The control unit 121 stores the acquired luminance value $L_1$ in the register.

In next step S112, the control unit 121 acquires a luminance value $L_2$ of a central portion of the change of the luminance values. The control unit 121 may acquire a pixel value of a pixel of the central portion in the horizontal direction, as the luminance value $L_2$ of the central portion of the change of the luminance values, or may detect change of the luminance value of each pixel and acquire the luminance value $L_2$ of the central portion of the change.

In next step S113, the control unit 121 subtracts the luminance value $L_2$ from the luminance value $L_1$ to obtain a difference luminance $\Delta L$ of the luminance value $L_1$ and the luminance value $L_2$. Here, the control unit 121 subtracts the luminance value $L_2$ from the luminance value $L_1$ to obtain the difference luminance $\Delta L$.

In next step S114, the control unit 121 determines whether the difference luminance $\Delta L$ exceeds 0. If the control unit 121 determines that the difference luminance $\Delta L$ exceeds 0, the control unit 121 moves the processing onto step S115.

In step S115, the control unit 121 calculates a misregistration amount $\Delta D$ of the projection positions of the adjustment projection image $30_1$ and $30_2$ with respect to the correct positional relationship, from the difference luminance $\Delta L$ obtained in step S113. The control unit 121 then generates the control signal for the lens shift unit $105_1$ for causing the projection positions of the adjustment projection images $30_1$ and $30_2$ to be away by the misregistration amount $\Delta D$, based on the calculated misregistration amount $\Delta D$. The control unit 121 supplies the generated control signal to the lens shift unit $105_1$, and terminates the series of processing with the flowchart of FIG. 10.

Meanwhile, in step S114, when the control unit 121 determines that the difference luminance $\Delta L$ is less than 0, the control unit 121 moves the processing onto step S116. In step S116, the control unit 121 calculates the misregistration amount $\Delta D$ of the projection positions of the adjustment projection images $30_1$ and $30_2$ with respect to the correct positional relationship, from the difference luminance $\Delta L$ obtained in step S113. The control unit 121 then generates the control signal for the lens shift unit $105_1$ for bringing the projection positions of the adjustment projection images $30_1$ and $30_2$ close to each other by the misregistration amount $\Delta D$, based on the calculated misregistration amount $\Delta D$. The control unit 121 supplies the generated control signal to the lens shift unit $105_1$, and terminates the series of processing with the flowchart of FIG. 10.

Note that, in step S110, the case where it has been determined that there is no luminance change corresponds to the example where the difference luminance $\Delta L$ is 0.

The above-described processing of steps S115 and S116 will be described in more detail with reference to FIGS. 11A, 11B and 11C. The case where the difference luminance $\Delta L$ exceeds 0 corresponds to the example of FIG. 11C, and FIG. 11C illustrates that the projection positions of the adjustment projection images $30_1$ and $30_2$ are shifted in a direction of being further brought close with respect to the correct positional relationship by the misregistration amount $\Delta D$. Further, the case where the difference luminance $\Delta L$ is less than 0 corresponds to the example of FIG. 11B, and FIG. 11B illustrates that the projection positions of the adjustment projection images $30_1$ and $30_2$ are shifted in a direction of being away with respect to the correct positional relationship by the misregistration amount $\Delta D$.

The misregistration amount $\Delta D$ can be obtained as follows.

Two gradations having equal luminance $L_1$, luminance $L_0$, and distance D, and opposite gradients are overlapped such that the respective positions of the luminance $L_1$ and the luminance $L_0$ are matched, where a distance in which the luminance is changed from the maximum luminance $L_1$ to the minimum luminance $L_0$ ($=0$) in gradation is the distance D. At this time, assume that the position of the overlapped two gradations is shifted by the misregistration amount AD. In this case, a composite luminance obtained by compositing the luminance of two gradations, in a range where the position of luminance $L_1$ of one gradation or the position of luminance $L_0$ is included in a range of a gradient of the other gradation, is the luminance $L_2$. Further, the difference between the luminance $L_1$ and the luminance $L_2$ is the difference luminance $\Delta L$.

In this case, when the luminance gradient by gradation is in a linear function manner, as can be seen from FIGS. 11B and 11C, a ratio of the misregistration amount $\Delta D$ and the distance D, and a ratio of the difference luminance $\Delta L$ and the luminance $L_1$ becomes equal. A relationship of the values based on this ratio is shown in the equation (1) below:

$$\Delta D/D = \Delta L/L_1 \tag{1}$$

When the equation (1) is solved for the misregistration amount $\Delta D$, the following equation (2) is obtained, and it is found that, when the distance D and the luminance $L_1$ are known values, the misregistration amount $\Delta D$ can be calculated based on the difference luminance $\Delta L$.

$$\Delta D = (\Delta L/L_1) \times D \tag{2}$$

Note that the distance D corresponds to the width of the luminance gradients in the gradation regions 311 and 321, as described above. Further, in this example, the distance D is equal to the width of the overlapped region 33' of when the projection positions of the adjustment projection images $30_1$ and $30_2$ are in the correct positional relationship.

Here, when the distance D is expressed by the number of pixels, if resolution of the luminance in the camera 13 is 1/D or more, the misregistration amount $\Delta D$ can be obtained in units of pixels. This point will be described. When the equation (1) is solved for the difference luminance $\Delta L$, the equation (3) below can be obtained:

$$\Delta L = (\Delta D/D) \times L_1 \tag{3}$$

In the equation (3), if the misregistration amount AD is one pixel, the equation (4) below can be obtained, and the change of the luminance with respect to a misregistration of one pixel becomes a value obtained by dividing of the luminance $L_1$ by the distance D. Therefore, if the resolution to the luminance $L_1$ is 1/D or more, the misregistration of one pixel can be recognized.

$$\Delta L = L_1/D \tag{4}$$

The resolution of the luminance of the camera 13 corresponds to the bit depth of a pixel handled by the camera 13. When the bit depth of a pixel is eight bits, the resolution becomes 1/256. Similarly, the bit depth of a pixel is 10 bits, 12 bits, or the like, the resolution becomes 1/1024, 1/4096, or the like.

For example, if the width of the overlapped region 33' in the horizontal direction is 64 pixels, that is, the distance D=64 pixels, when the projection positions of the adjustment projection images $30_1$ and $30_2$ are shifted from the correct positional relationship by one pixel ($\Delta D=1$), the misregistration can be recognized if the resolution of the luminance of the camera 13 is 1/64 or more, according to the equation (4). As described above, even the camera with the bit depth of a handled pixel of eight bits has the resolution of 1/256 for the luminance. Therefore, even if a general camera is used, the misregistration of one pixel can be sufficiently recognized.

Further, when the overlapped region 33' needs to be widened due to system restrictions, or the like, a camera with the bit depth of 10 bits or 12 bits, which is a camera with larger bits, may just be selected as the camera 13.

Note that, in the above description, a dynamic range of the camera 13 is appropriately controlled by an automatic exposure function generally included in many cameras.

Next, position adjustment in the vertical direction of step S103 of the flowchart of FIG. 7 will be described. In the above-described configuration of FIG. 2C, in the region 330 where the gradation regions 310 and 320 having the luminance inclined in the vertical direction are overlapped, one end of the luminance gradient is matched with an upper end of the adjustment projection image $30_1$, and the other end of the luminance gradient is matched with an upper end of the region 331 where the gradation regions 311 and 321 are overlapped. Therefore, the luminance change of when the pixels of the region 331 are scanned in the vertical direction is different from the luminance change of when the pixels of the region 331 are scanned in the horizontal direction. For example, in the scan in the vertical direction of FIG. 2C, the information of the pixels of the reference region 312 or 322 cannot be obtained, and the luminance $L_1$ that serves as the reference cannot be obtained.

Figure 12A:
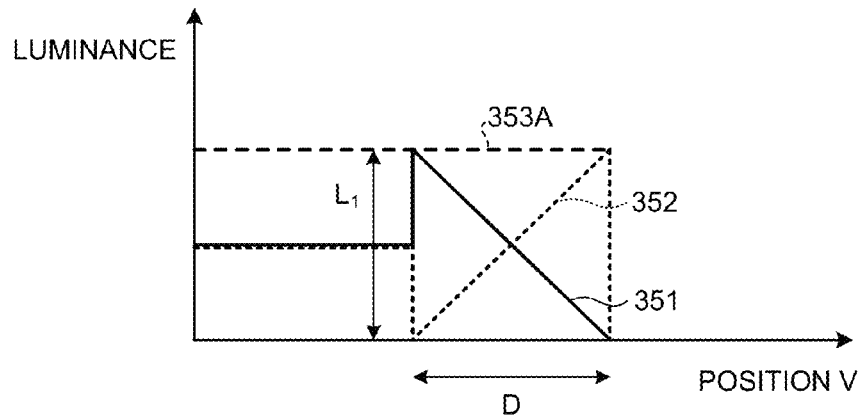
FIG. 12A is a diagram illustrating an example of luminance change of when a region in which gradation regions having luminance inclined in a vertical direction are overlapped is scanned in the vertical direction.
Figure 12B:
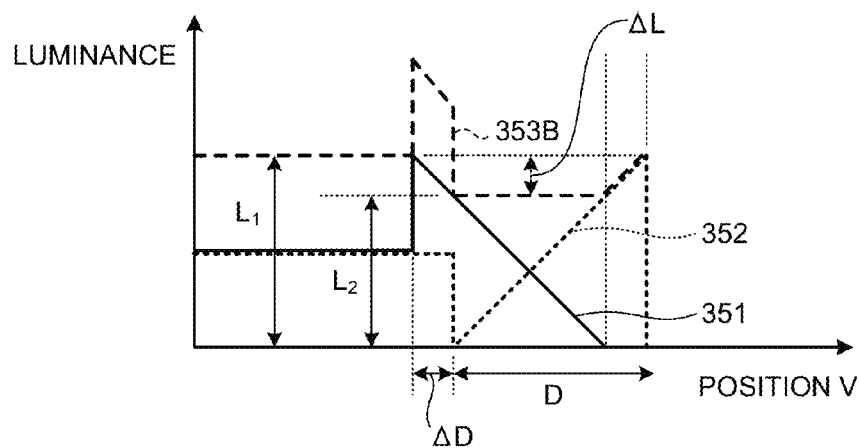
FIG. 12B is a diagram illustrating an example of luminance change of when a region in which gradation regions having luminance inclined in a vertical direction are overlapped is scanned in the vertical direction.
Figure 12C:
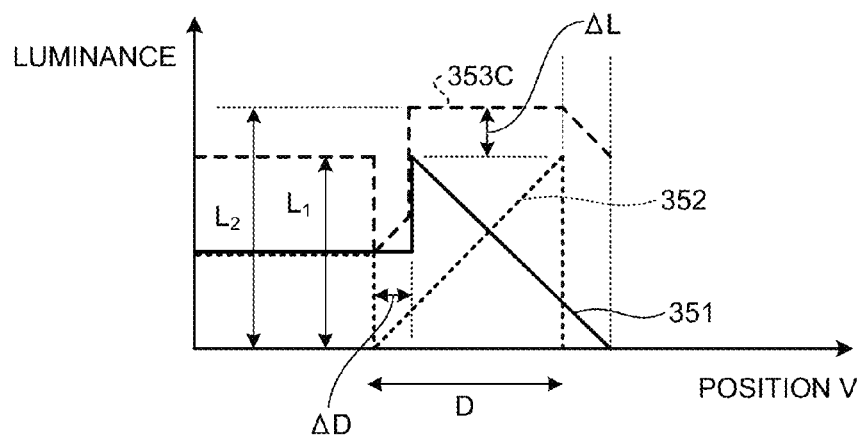
FIG. 12C is a diagram illustrating an example of luminance change of when a region in which gradation regions having luminance inclined in a vertical direction are overlapped is scanned in the vertical direction.

FIGS. 12A to 12C illustrate examples of the luminance change of when the region 330 where the gradation regions 310 and 320 having the luminance inclined in the vertical direction are overlapped are scanned in the vertical direction. In FIGS. 12A to 12C, the vertical axis represents the luminance, and the horizontal axis represents a position (described as position V) in the vertical direction. Note that it is assumed here that the positioning in the horizontal direction has been completed by the above-described processing, and the center of the overlapped region 33' in the horizontal direction is scanned in the vertical direction. Therefore, in the region $33_1$, each luminance of the adjustment projection images $30_1$ and $30_2$ is ½ of the luminance $L_1$ as the reference.

An example of the luminance change in the overlapped region 33' of when the positions of the regions $33_1$ and $33_2$ are matched in the vertical direction, and overlapped in the correct positional relationship by reference to FIGS. 2A to 2C is illustrated by a line 353A of FIG. 12A. In this case, as illustrated by a line 351 in the drawing, the luminance in the adjustment projection image $30_2$ is ½ of the luminance $L_1$ in the gradation region 321, and when the position enters the gradation region 320, the luminance becomes the luminance $L_1$. After that, the luminance is decreased toward the end of the gradation region 320 at a predetermined gradient. Further, as illustrated by a line 352 in the drawing, the luminance in the adjustment projection image $30_1$ is ½ of the luminance $L_1$ in the gradation region 311, and when the position enters the gradation region 310, the luminance becomes 0. After that, the luminance is increased toward the end of the gradation region 310 at a predetermined gradient, and becomes the luminance $L_1$ at the position of the end.

FIG. 12B illustrates an example of the luminance change in the overlapped region 33' of when the regions $33_1$ and $33_2$ are away with respect to the correct positional relationship and overlapped. In this case, a portion of the luminance $L_1/2$ in the gradation region 311 of the adjustment projection image $30_1$, which is illustrated by a line 352, enters the gradation region 320 of the adjustment projection image $30_2$. Therefore, as exemplarily illustrated by a line 353B, a luminance projecting point where the luminance exceeds the luminance $L_1$ occurs. Even in this case, the scanned position is moved from the gradation region 311 to the gradation region 310 in the adjustment projection image $30_1$, the difference luminance $\Delta L$ (<0) can be obtained, similarly to the case of FIG. 11B.

FIG. 12C illustrates an example of the luminance change in the overlapped region 33' of when the regions $33_1$ and $33_2$ are brought close with respect to the correct positional relationship and overlapped. In this case, a portion where the luminance is increased from 0, in the gradation region 310 of the adjustment projection image $30_1$, which is illustrated by a line 352, enters the gradation region 321 of the adjustment projection image $30_2$. Therefore, as exemplarily illustrated by a line 353C, a luminance depressed point where the luminance is decreased to the luminance $L_1/2$ occurs. Even in this case, after the scanned position is moved from the gradation region 321 to the gradation region 320 in the adjustment projection image $30_2$, the difference luminance $\Delta L$ (>0) can be obtained, similarly to the case of FIG. 11C.

As described above, in the case where the positioning is performed by arranging the adjustment projection images $30_1$ and $30_2$ in the horizontal direction side by side, when the adjustment projection images $30_1$ and $30_2$ are configured such that the gradation region having the luminance inclined in the horizontal direction and the gradation region having the luminance inclined in the vertical direction are brought in contact with each other, a luminance projecting point or a luminance depressed point is detected depending on the direction of the scan of the luminance. Therefore, it is favorable that the analysis unit 120 or the control unit 121 detects the luminance projecting point or the luminance depressed point of the luminance obtained by the scan, by a threshold determination or an edge determination, and performs the processing of calculating the misregistration amount $\Delta D$ in consideration of the detected luminance projecting point or luminance depressed point.

Further, in this example, in the luminance scan in the vertical direction, the luminance $L_1$ as the reference cannot be obtained. Therefore, the control unit 121 calculates the misregistration amount $\Delta D$ according to the above-described equation (2), using the luminance $L_1$ stored in the scan in the horizontal direction in step S101 of the flowchart of FIG. 7. Processing by the control unit 121 of this time is similar to the processing described using step S10.

Further, in this case, the gradation region 311 with the luminance inclined in the horizontal direction and the gradation region 310 with the luminance inclined in the vertical direction are configured to come in contact with each other in the adjustment projection image $30_1$. However, an embodiment is not limited to this example. That is, the portion of the luminance $L_1$ is provided between the gradation region 311 and the gradation region 310, so that the above-described luminance projecting point or luminance depressed point does not occur, and the position adjustment can be executed similarly to the position adjustment in the horizontal direction.

Further, in the above description, in the adjustment projection image $30_1$, for example, the gradation regions 310 and 311 are provided to the entire right end portion of the adjustment projection image $30_1$. However, an embodiment is not limited to this example. That is, the gradation regions 310 and 311 may be provided in a part of the right end portion of the adjustment projection image $30_1$, or may be provided in the overlapped region 33' in an island manner without being in contact with the right end. Obviously, even in these cases, the gradation regions 320 and 321 in the adjustment projection image $30_2$ are provided such that the positions correspond to the positions of the gradation regions 310 and 311 in the adjustment projection image $30_1$ when the adjustment projection image $30_1$ and the adjustment projection image $30_2$ are overlapped with the overlapped region 33'.

Note that, when one projection image has the resolution of 1,920 pixels×1,080 pixels (approximately 2,000,000 pixels) in the conventional method of capturing the projection image, recognizing the position of the projection image in units of pixels, based on the captured image, and performing positioning, it has been necessary to use a camera having the resolution of 64,000,000 pixels, which is 32 times the 2,000,000 pixels.

That is, to capture the projection image having the resolution of approximately 2,000,000 pixels and correctly sample the projection image, twofold resolution in the horizontal direction and in the vertical direction is required according to the sampling theorem. Therefore, at this point of time, a camera having the resolution of 2,000,000 pixels× 2×2=8,000,000 pixels is necessary. Further, to adjust the projection position while moving the projection image, a margin is required for a capturing range of the camera. If the capturing ranges of the camera is $\sqrt{2}$ times the range of the projection image, in the horizontal and vertical directions, 8,000,000 pixels×$\sqrt{2}$×$\sqrt{2}$=16,000,000 pixels is required as the resolution.

Further, to capture the two projection image at the same time to arrange and project the two projection images, twofold resolution is required in the horizontal direction. Here, typically, an aspect ratio of the camera is fixed. Therefore, when the resolution in the horizontal direction is twofold, the resolution in the vertical direction is also twofold. Therefore, it is concluded that the resolution of about 16,000,000 pixels×2×2=64,000,000 pixels is required. This means the resolution becomes 10,667 pixels×6,000 pixels, and this is a distant idea.

Meanwhile, according to the first embodiment, the position adjustment is performed based on the luminance of the overlapped region 33' in which the adjustment projection images $30_1$ and $30_2$ are overlapped. Therefore, according to the first embodiment, only the luminance of the pixel region of the width (D pixels) of the luminance gradient in the gradation regions 310 and 311 needs to be checked. Therefore, the resolution of the camera may just be 1/D, compared with the conventional technology of performing recognition in units of pixels. Therefore, the resolution of the camera may just be 32/D times or more the resolution of one projection image, and the resolution required for the camera can be substantially decreased, compared with the conventional technology.

Note that the description has been given in which the lens shift unit $105_1$ is included in the configuration of the projector device $10_1$. However, an embodiment is not limited to this example. For example, the lens shift unit $105_1$ may be attached to the projection light system $104_1$ as an option of the projector device $10_1$, and used. Further, when two projector devices $10_1$ and $10_2$ are used, the adjustment of the emission position may just be performed for either one of the projector devices. In this case, in the projector device for which the emission adjustment is not performed, the lens shift unit can be omitted.

First Modification of First Embodiment

Next, a first modification of the first embodiment will be described. In the first embodiment, only one pair of two gradation regions in which the directions of the luminance gradients are perpendicular to each other is provided for one adjustment projection image. However, an embodiment is not limited to the example. The present first modification is an example provided with two pairs of two gradation regions in which directions of luminance gradients are perpendicular to each other for one adjustment projection image. Hereinafter, the "pair of two gradation regions in which directions of luminance gradients are perpendicular to each other" is called a "pair of perpendicular gradation region regions".

Figure 13:
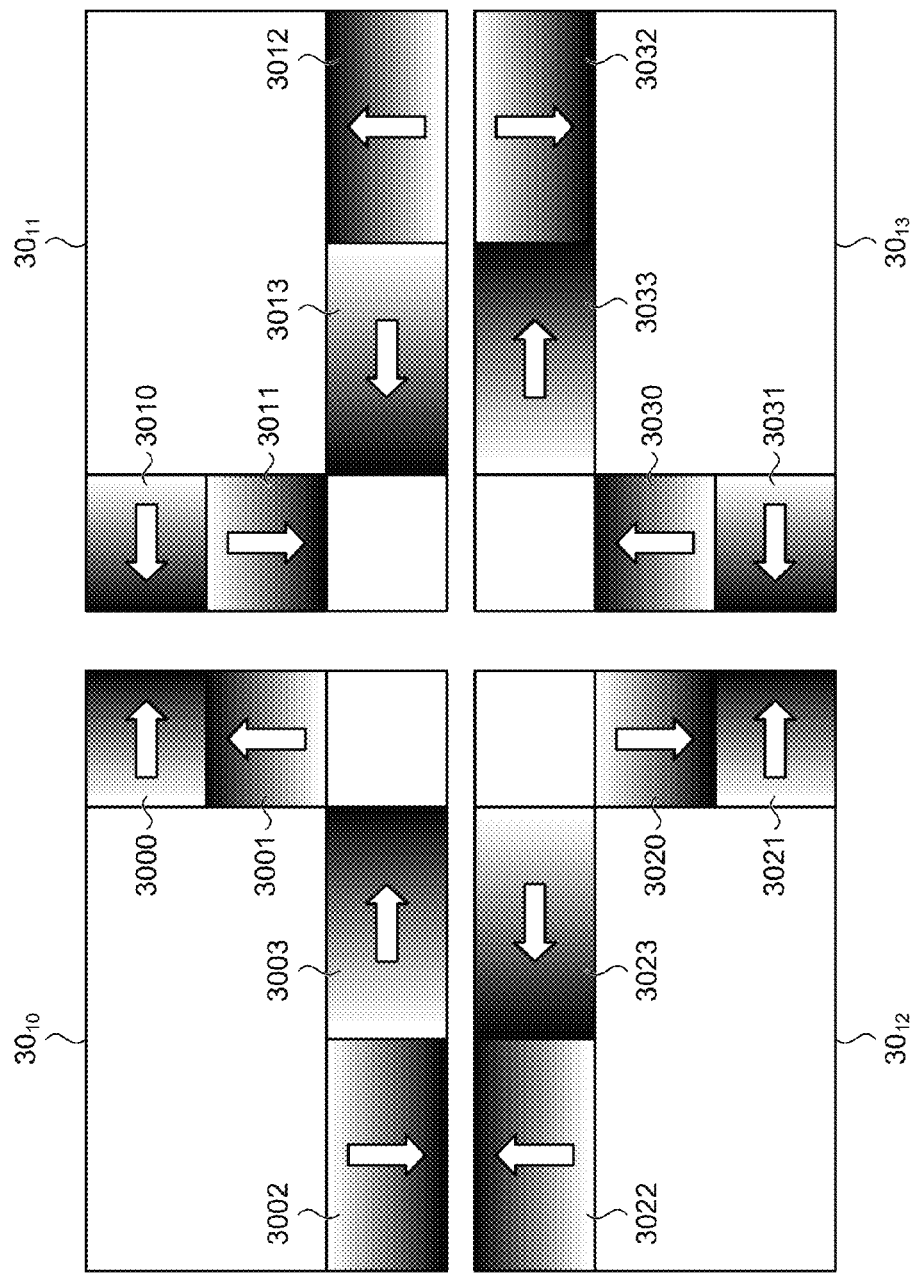
FIG. 13 is a diagram illustrating examples of adjustment projection images in a first modification of the first embodiment.

FIG. 13 illustrates examples of adjustment projection images in the first modification of the first embodiment. In FIG. 13, the respective adjustment projection images $30_{10}$, $30_{11}$, $30_{12}$ and $30_{13}$ have pairs of perpendicular gradations on two sides that share a vertex, respectively. By providing the two pairs of perpendicular gradations in the adjustment projection image, the method of adjusting emission positions according to the first embodiment can be applied to a case where four projection images are projected on a common screen.

To be more specific, the adjustment projection image $30_{10}$ projected on an upper left part, of the four adjustment projection images $30_{10}$, $30_{11}$, $30_{12}$, and $30_{13}$ projected in a lattice manner, has a pair of perpendicular gradation regions including gradation regions 3000 and 3001 arranged in a right end, and a pair of perpendicular gradation regions including gradation regions 3002 and 3003 arranged in a lower end.

Further, the adjustment projection image $30_{11}$ projected on an upper right part has a pair of perpendicular gradation regions including gradation regions 3010 and 3011 arranged in a left end, in which directions of luminance gradients are respectively reversed to the gradation regions 3000 and 3001, and a pair of perpendicular gradation regions including gradation regions 3012 and 3013 arranged in a lower end.

Further, the adjustment projection image $30_{13}$ projected on a lower right part has a pair of perpendicular gradation regions including gradation regions 3032 and 3033 arranged in an upper end, in which directions of luminance gradients are respectively reversed to the gradation regions 3012 and 3013, and a pair of perpendicular gradation regions including gradation regions 3030 and 3031 arranged in a left end.

Still further, the adjustment projection image $30_{12}$ projected on a lower left part has a pair of perpendicular gradation regions including a gradation regions 3022 and 3023 arranged in an upper end, in which directions of luminance gradients are respectively reversed to the gradation regions 3002 and 3003, and a pair of perpendicular gradation regions including gradation regions 3020 and 3021 arranged in a right end, in which directions of luminance gradients are respectively reversed to the gradation regions 3030 and 3031.

The four adjustment projection images $30_{10}$, $30_{11}$, $30_{12}$, and $30_{13}$ are projected on a screen 14 such that the pairs of perpendicular gradations arranged on facing sides are overlapped to form overlapped regions, respectively. Then, for example, adjustment of emission positions of the adjustment projection image $30_{11}$ and the adjustment projection image $30_{12}$ adjacent to the adjustment projection image $30_{10}$ is performed based on a projection position of the adjustment projection image $30_{10}$. After the adjustment of the emission positions of the adjustment projection images $30_{11}$ and the $30_{12}$ is completed, the adjustment of the emission position of the adjustment projection image $30_{13}$ is performed based on one of the adjustment projection images $30_{11}$ and $30_{12}$.

After the adjustment of the emission positions of the adjustment projection images $30_{10}$, $30_{11}$, $30_{12}$ and $30_{13}$ is completed, the adjustment of emission positions may be executed again, as needed, based on the adjustment projection image other than the adjustment projection image $30_{10}$, which has first served as the reference.

Second Modification of First Embodiment

Next, a second modification of the first embodiment will be described. In the second modification, two patterns of adjustment projection images in which pairs of perpendicular gradations are arranged in respective sides, and arrangement of gradation regions are different from each other are prepared. Then, the gradation regions arranged in the adjustment projection images of these two patterns are configured such that directions of luminance gradients in the gradation regions in corresponding positions between the adjustment projection images are perpendicular to each other. In the second modification, these two patterns of adjustment projection images are projected such that the adjustment projection images having a different pattern are adjacent to each other, so that adjustment of emission positions according to an embodiment can be applied without an upper limit of the number of projection images.

FIGS. 14A to 14C illustrate examples of adjustment projection images according to the second modification of the first embodiment. FIGS. 14A and 14B illustrate examples of first pattern (pattern A) and a second pattern (pattern B), of the two patterns of the adjustment projection images, respectively.

An adjustment projection image $30_{20}$ of the pattern A exemplarily illustrated in FIG. 14A has a pair of perpendicular gradation regions including gradation regions 3041 and 3042 arranged in a right end, and a pair of perpendicular gradation regions including gradation regions 3043 and 3044 arranged in a lower end. The adjustment projection image $30_{20}$ further has a pair of perpendicular gradation regions including gradation regions 3045 and 3046 in a left end, and a pair of perpendicular gradation regions including gradation regions 3047 and 3048 arranged in an upper end.

An adjustment projection image $30_{21}$ of the pattern B exemplarily illustrated in FIG. 14B has a pair of perpendicular gradation regions including gradation regions 3056 and 3055 arranged in a left end, in which directions of luminance gradients are respectively reversed to the gradation regions 3041 and 3042. The adjustment projection image $30_{21}$ further has a pair of perpendicular gradation regions including gradation regions 3057 and 3058 arranged in an upper end, in which directions of luminance gradients are respectively reversed to the gradation regions 3044 and 3043. The adjustment projection image $30_{21}$ further has a pair of perpendicular gradation regions including gradation regions 3051 and 3052 arranged in a right end, in which directions of luminance gradients are respectively reversed to the gradation regions 3046 and 3045. The adjustment projection image $30_{21}$ further has a pair of perpendicular gradation regions including gradation regions 3054 and 3053 arranged in a lower end, in which directions of luminance gradients are respectively reversed to the gradation regions 3047 and 3048.

By arranging the gradation regions 3041 to 3048, and the gradation regions 3051 to 3058, by the combinations of FIGS. 14A and 14B, respectively, for example, even if the adjustment projection image $30_{20}$ and the adjustment projection image $30_{21}$ are arranged in any direction and projected, the method of adjusting emission positions according to the first embodiment can be applied.

The adjustment projection image $30_{20}$ of the pattern A and the adjustment projection image $30_{21}$ of the pattern B are arranged so that the same patterns are not adjacent to each other, and projected, as exemplarily illustrated in FIG. 14C. In the example of FIG. 14C, the adjustment projection image $30_{20}$ of the pattern A and the adjustment projection image $30_{21}$ of the pattern B are alternately projected in a horizontal direction and in a vertical direction, so that an arrangement in which the same patterns are not adjacent is realized.

In the case of the arrangement of FIG. 14C, a center point $C_0$ of an entire projection image made by all of adjustment projection images is obtained. Then, each adjustment projection image is projected in ascending order of a distance between a center point $C_n$ (n=1, 2, 3, . . . ) of each adjustment projection image and the center point $C_0$, and an emission position is adjusted successively.

In the example of FIG. 14C, in the adjustment projection images, the central adjustment projection image including the center point $C_0$ is projected, then the two adjustment projection images vertically adjacent to the central adjustment projection image are sequentially projected, and the emission position is adjusted in the order of projection, based on the central adjustment projection image. Next, in the adjustment projection images, the two adjustment projection images horizontally adjacent to the central adjustment projection image are sequentially projected, and the emission position is adjusted in the order of projection, based on the central adjustment projection image. Further, in the adjustment projection images, the four adjustment projection images having vertexes being in contact with vertexes of the central adjustment projection image are sequentially projected, and the emission position is adjusted in the order of projection, based on the adjustment projection images vertically or horizontally adjacent to the central adjustment projection image, and the emission position of which has already been adjusted.

According to this method, the emission position of each projector device can be adjusted without shifting the center of the entire projection image made of a plurality of projection images. This method is especially suitable when the entire projection image is projected on the center of a screen.

Further, in the case of the arrangement of FIG. 14C, in the adjustment projection images, one point of four corners of the entire projection image made by all of the adjustment projection images is determined as a reference point P, and each adjustment projection image is projected in ascending order of a distance between a center point $C_m$ (m=0, 1, 2, 3, . . . ) of each adjustment projection image and the reference point P, and the emission position is adjusted successively.

In the example of FIG. 14C, the upper left corner is determined as the reference point P. In the adjustment projection images, a first adjustment projection image including the reference point P, and a second adjustment projection image immediately under the first adjustment projection image, and having the center point closest to the reference point P, are projected, and the emission position of the second adjustment projection image is adjusted based on the first adjustment projection image. Next, in the adjustment projection images, a third adjustment projection image adjacent to the right side of the first adjustment projection image, and having the center point second closest to the reference point P is projected, and the emission position of the third adjustment projection image is adjusted based on the first adjustment projection image. Further, next, in the adjustment projection images, the emission position of a fourth adjustment projection image having a vertex facing and being in contact with the reference point P of the first adjustment projection image, and having the center point third closest to the reference point P is adjusted based on the second or third adjustment projection image adjacent to the fourth adjustment projection image, and the emission position of which has already been adjusted. Hereinafter, the adjustment projection images are sequentially projected in ascending order of the distance, according to the distance from the center point to the reference point P, and the emission position is adjusted based on the adjacent adjustment projection image, the emission position of which has already been adjusted.

According to this method, the emission position of each projector device can be adjusted without shifting the reference point. This method is especially favorable when the position of an end of an entire projection image made of a plurality of projection images is determined and the projection is performed.

Note that the order of adjustment of the projection positions of the projection images of when a large number of projection images is simultaneously projected by a large number of projector devices is not limited to the above-described example.

Second Embodiment

Next, a second embodiment will be described. In the above-described first embodiment, adjustment of the emission positions of the projected light by the projector devices $10_1$ and $10_2$ has been performed by adjustment of lens shift amounts of the lens shift units $105_1$ and $105_2$. In contrast, in the second embodiment, emission positions of projected light are adjusted by movement of stands of respective projector devices.

Figure 15:
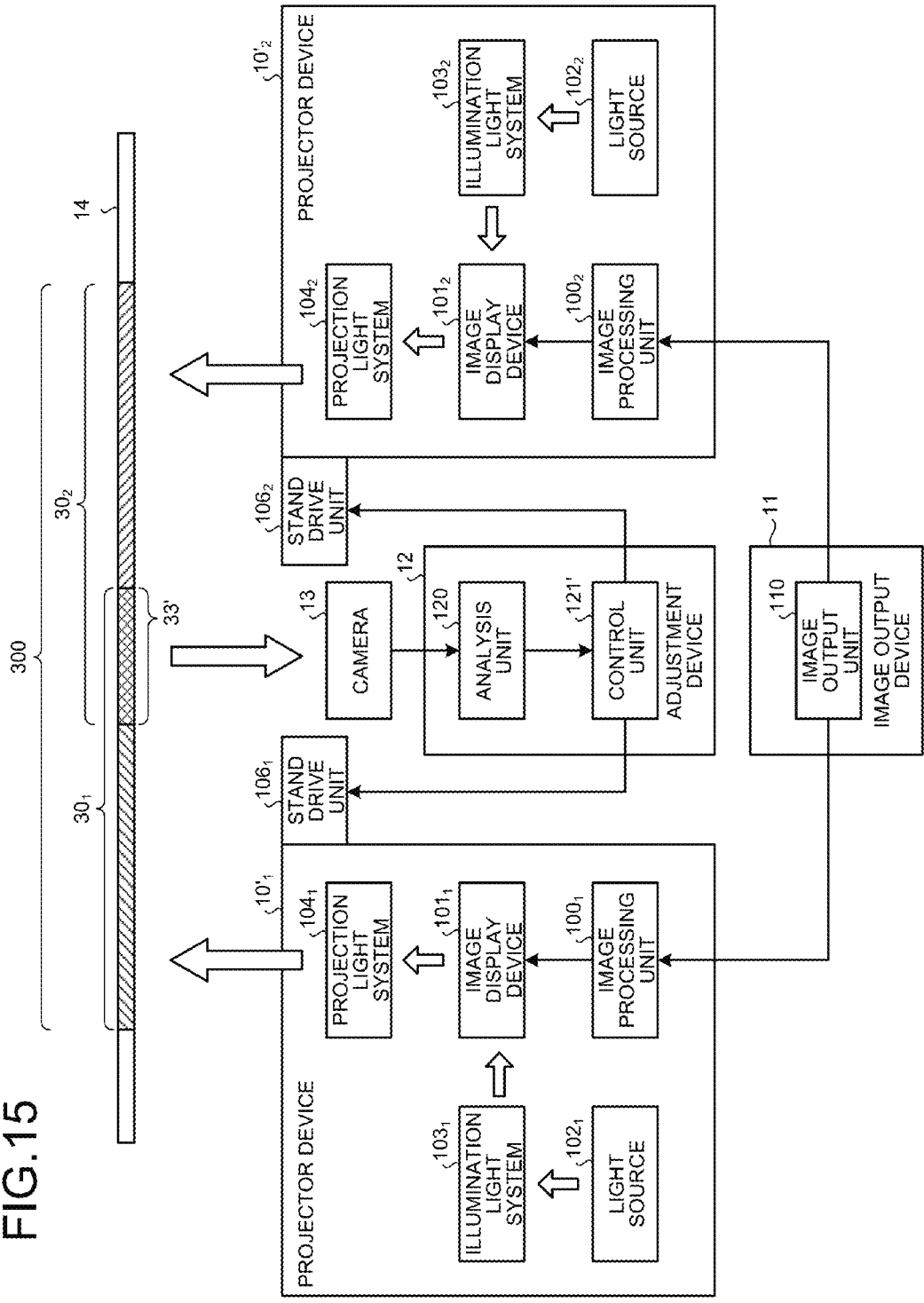
FIG. 15 is a block diagram illustrating a configuration of an example of a multi-projector system according to a second embodiment.

FIG. 15 illustrates a configuration of an example of a multi-projector system 1 according to the second embodiment. Note that, in FIG. 15, a portion common to FIG. 5 is denoted with the same reference sign, and detailed description is omitted.

The configuration illustrated in FIG. 15 is different from the configuration illustrated in FIG. 5 in that projector devices $10_1'$ and $10_2'$ include stand drive units $106_1$ and $106_2$, in place of the lens shift units $105_1$ and $105_2$. A control signal output from a control unit 121' is supplied to each of the stand drive units $106_1$ and $106_2$.

The projector devices $10_1'$ and $10_2'$ can be realized with a common configuration. Therefore, hereinafter, the projector device $10_1'$ will be exemplarily described. The projector device $10_1'$ is installed on a stand that can move the projector device $10_1'$ in a horizontal direction and in a vertical direction by a mechanical mechanism. The stand drive unit $106_1$ controls the mechanical mechanism of the stand according to the control signal supplied from the control unit 121' to move the projector device $10_1'$ in the horizontal direction and in the vertical direction. Accordingly, the emission position of the projected light by the projector device $10_1'$ can be adjusted. As processing of adjusting an emission position of projected light according to the second embodiment, the processing of the above-described first embodiment can be applied as it is.

Note that, in the above description, a configuration in which the stand drive unit $106_1$ is included in the projector device $10_1'$ has been described. However, an embodiment is not limited to the example. For example, the stand may be an option of the projector device $10_1'$, and the stand drive unit $106_1$ may be included in the configuration of the stand. When two projector devices $10_1'$ and $10_2'$ are used, adjustment of the emission position may just be performed for either one of the projector devices, and in that case, the stand drive unit can be omitted from the projector device not subjected to the emission adjustment.

Third Embodiment

Next, a third embodiment will be described. In the above-described first and second embodiments, positioning of the adjustment projection images $30_1$ and $30_2$ has been performed by adjustment of the emission positions of the projected light by the projector devices $10_1$ and $10_2$. In contrast, in the third embodiment, in one of projector devices $10_1$ and $10_2$, for example, in the projector device $10_2$, an emission position of projected light is fixed, and a position of an adjustment projection image $30_2$ on an image display device $101_2$ is shifted, and positioning of adjustment projection images $30_1$ and $30_2$ is performed.

An embodiment is not limited to the above example, and in the third embodiment, in the projector devices $10_1$ and $10_2$, the positions of the adjustment projection images $30_1$ and $30_2$ on the image display devices $101_1$ and $101_2$ may be respectively shifted.

Figure 16:
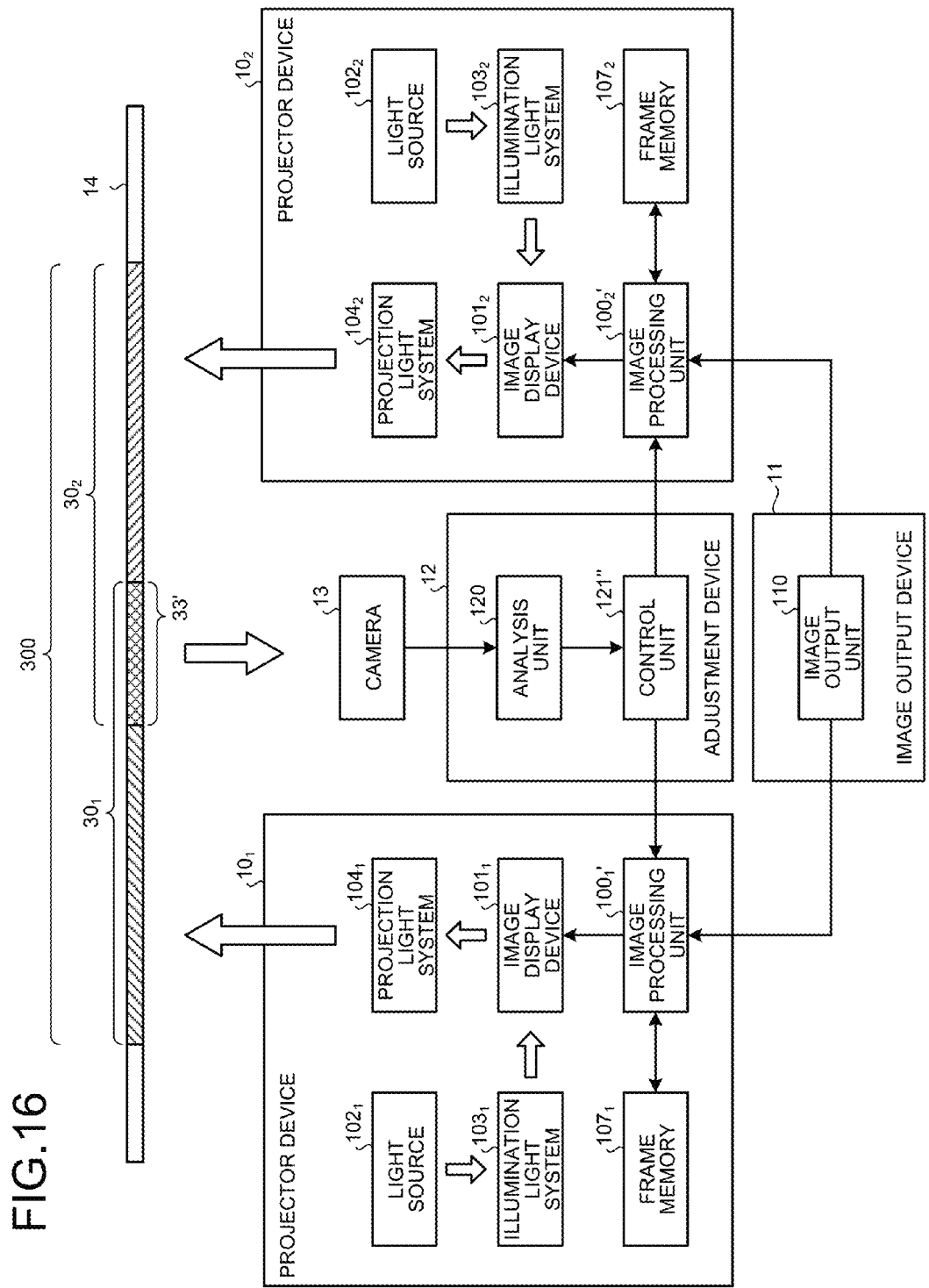
FIG. 16 is a block diagram illustrating a configuration of an example of a multi-projector system according to a third embodiment.

FIG. 16 illustrates a configuration of an example of a multi-projector system 1 according to the third embodiment. Note that, in FIG. 16, a portion common to FIG. 5 is denoted with the same reference sign, and detailed description is omitted. The configuration illustrated in FIG. 16 is different from the configurations of FIGS. 5 and 15 in that projector devices $10_1$ and $10_2$ do not include means to mechanically change emission positions of projected light, such as the lens shift units $105_1$ and $105_2$ and the stand drive units $106_1$ and $106_2$.

In the projector device $10_2$ illustrated in FIG. 16, for example, an image processing unit $100_2'$ writes input image data to a frame memory $107_2$, once. The image processing unit $100_2'$ applies predetermined image processing to the image data written to the frame memory $107_2$, and writes finally obtained projection image data to the frame memory $107_2$, again. The image processing unit $100_2'$ then reads projection image data from the frame memory $107_2$, and transfers the projection image data to an image display device $101_2$.

At this time, the image processing unit $100_2'$ changes timing to read the projection image data from the frame memory $107_2$, according to a control signal supplied from a control unit $121''$ of an adjustment device 12. When update timing of image data in the image display device $101_2$ is constant, the position of the projection image data on the image display device $101_2$ can be shifted.

Note that control of an image processing unit $100_1'$ and a frame memory $107_1$ in the projector device $10_1$ is similar to the control of the image processing unit $100_2'$ and the frame memory $107_2$ in the projector device $10_2$. Therefore, hereinafter, the image processing unit $100_2'$ and the frame memory $107_2$ in the projector device $10_2$ will be exemplarily described.

A method of positioning projection images of the projector devices $10_1$ and $10_2$ according to the third embodiment will be described using FIGS. 17A to 17D. Note that, in FIG. 17A to FIG. 17D, a portion common to FIG. 2 is denoted with the same reference sign, and detailed description is omitted. Further, in FIGS. 17A to 17D, for description, an arrow-shaped image is displayed in a portion according to an overlapped region 33'. However, in practice, a pair of gradation images with a luminance inclined in a predetermined manner is arranged in the overlapped region 33', as illustrated in FIGS. 2A to 2C.

Figure 17A:
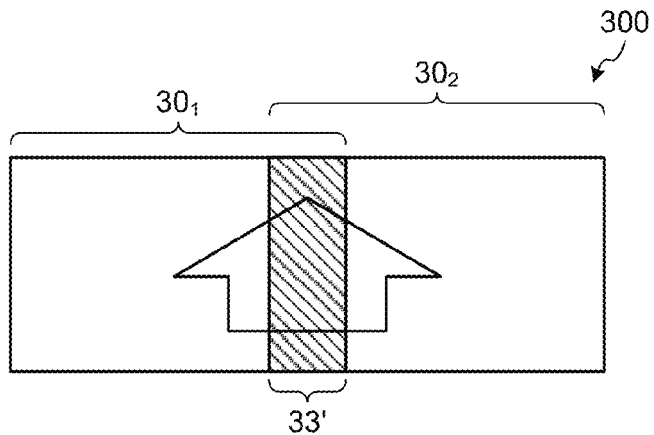
FIG. 17A is a diagram illustrating an example of a shift of a projection image of the multi-projector system according to the third embodiment.

FIG. 17A illustrates an example of a state in which an adjustment projection images $30_1$ and $30_2$ are projected in a correct positional relationship, and projection positions of the adjustment projection images $30_1$ and $30_2$ have no misregistration in the vertical and horizontal directions. In this case, it can be seen that an entire projection image 300 has linear upper and lower sides, and is formed into a rectangular shape. Further, the overlapped region 33' with uniform luminance is formed in the overlapped portion of the adjustment projection images $30_1$ and $30_2$.

Figure 17B:
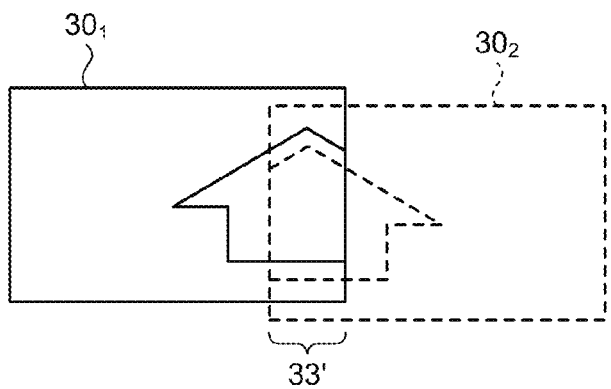
FIG. 17B is a diagram illustrating an example of a shift of a projection image of the multi-projector system according to the third embodiment.

FIG. 17B illustrates an example of a state in which the projection positions of the adjustment projection images $30_1$ and $30_2$ are shifted in the vertical direction. In this case, by performing of at least one of downward movement of the projection position of the adjustment projection image $30_1$, and upward movement of the projection position of the adjustment projection image $30_2$, positioning of the projection position of the adjustment projection image $30_1$ and $30_2$ is performed. Here, the positioning is performed by upward movement of projection content of the adjustment projection image $30_2$, based on the adjustment projection image $30_2$.

That is, the adjustment projection images $30_1$ and $30_2$ are projected on a screen by the projector devices $10_1$ and $10_2$, and projection images are captured by a camera 13. The captured image is supplied to an adjustment device 12, and is input to an analysis unit 120. The analysis unit 120 obtains luminance of each place, as described above, and inputs information that indicates the luminance to the control unit $121''$. The control unit $121''$ calculates a misregistration amount $\Delta D$, based on the luminance supplied from the analysis unit 120, and generates control signals for correcting the misregistration amount $\Delta D$ to the respective projector devices $10_1$ and $10_2$.

Figure 17C:
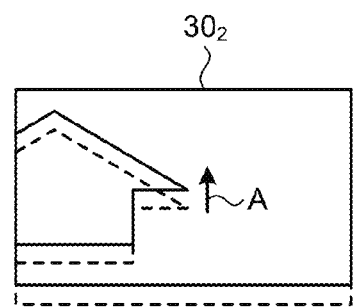
FIG. 17C is a diagram illustrating an example of a shift of a projection image of the multi-projector system according to the third embodiment.

In the third embodiment, as illustrated in FIG. 17C, the control unit $121''$ shifts an image to be projected in units of pixels, without changing the projection position of the adjustment projection image $30_2$. In other words, the control unit $121''$ shifts content of the projection image to be emitted in units of pixels, without changing the emission position of the projection image by the projector device $10_2$.

In this example, when reading the projection image data from the frame memory $107_2$ and transferring the projection image data to the image display device $101_2$, the control unit $121''$ generates a control signal that controls the timing to read the projection image data from the frame memory $107_2$ according to the misregistration amount AD, and supplies the control signal to the image processing unit $100_2'$. The image processing unit $100_2'$ shifts the timing to read the projection image data from the frame memory $107_2$, with respect to the update timing of the image data in the image display device $101_2$, according to the control signal. Accordingly, the content of the projection image by the projection image data is shifted in the direction illustrated by the arrow A in FIG. 17C, and positioning of the image is performed.

As an example, when the control based on the above-descried positioning is not performed, update of the image data in the image display device $101_2$, and reading of the projection image data from the frame memory $107_2$ are performed in synchronization with a predetermined vertical synchronization signal. Further, reading of the projection image data from the frame memory $107_2$ is performed from an upper end line to a lower end line of the image. For example, as illustrated in FIG. 17C, when the content of the projection image based on the projection image data is shifted in the upward direction, the control unit $121''$ of the adjustment device 12 outputs the control signal that delays the timing of reading from the frame memory $107_2$ by timing corresponding to the misregistration amount $\Delta D$, with respect to the timing of reading of the image display device $101_2$.

Figure 17D:
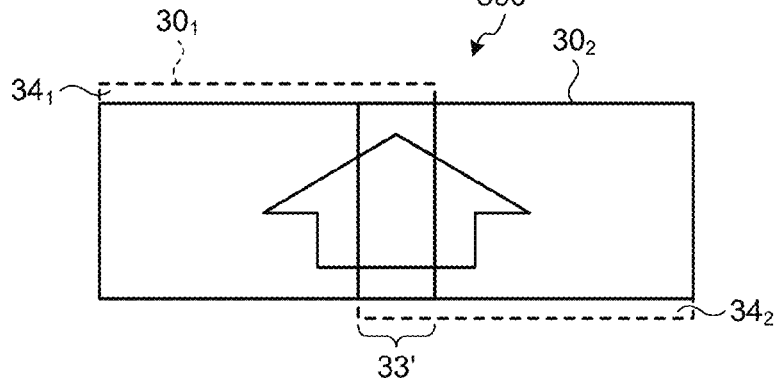
FIG. 17D is a diagram illustrating an example of a shift of a projection image of the multi-projector system according to the third embodiment.

FIG. 17D illustrates an example of an entire projection image 300' after a shift. According to this method, the content of the projection image is shifted. Therefore, the projection position of the projected light emitted from the projector device $10_2$ is the same as before the positioning of the image. That is, the projection positions of the projection images by the projector devices $10_1$ and $10_2$ are unchanged from before the positioning of the image illustrated in FIG. 17B, and a range of the entire projection image 300' immediately after the positioning in the vertical direction is performed does not become a rectangular. In this case, images of regions $34_1$ and $34_2$ that protrude from the rectangular are replaced with black images, so that the entire projection image 300' can be made to a rectangular.

For example, the image processing unit $100_2$' converts lines of a difference obtained by shifting the timing of reading from the frame memory $107_2$ with respect to the timing of reading of the image display device $101_2$, that is, lines of the number of lines corresponding to the misregistration amount AD, into lines of the black image, according to the control signal. Further, the control unit 121" of the adjustment device 12 also supplies the control signal according to the misregistration amount AD, to the image processing unit $100_1$' of the projector device $10_1$. The image processing unit $100_1$' converts lines of the number of lines corresponding to the misregistration amount ΔD into lines of the black image, according to the control signal.

Here, consider a case in which the misregistration amount ΔD of another adjustment projection image is calculated based on one adjustment projection image. In this case, when the misregistration amount ΔD is a positive value (in the state of FIG. 12B), the image processing unit $100_2$' arranges lines of the black image of the number of lines corresponding to the misregistration amount ΔD, to a lower end of the one adjustment projection image and to an upper end of the other adjustment projection image, according to the control signal from the control unit 121". Further, when the misregistration amount ΔD is a negative value (in the states of FIGS. 12C and 17B), the image processing unit $100_2$' arranges lines of the black image of the number of lines corresponding to the misregistration amount ΔD, to an upper end of the one adjustment projection image and to a lower end of the other adjustment projection image, according to the control signal from the control unit 121".

In the above description, positioning in the vertical direction has been described. However, in the third embodiment, a similar method can be applied to positioning in the horizontal direction. The positioning in the horizontal direction can be realized by shifting of the position of the projection image data on the image display device in the horizontal direction in units of pixels based on the misregistration amount ΔD, for each line.

In the case of the positioning in the horizontal direction, when the misregistration amount ΔD is a negative value (see FIG. 11C), and the adjustment projection image $30_2$ is moved in a direction of being away, based on the adjustment projection image $30_1$, an image in a range according to the misregistration amount ΔD of mutually facing ends at an opposite side to the moving direction remains outside the overlapped region 33', and affects the adjustment projection image $30_1$. In this case, in the image in this range, each line includes a rear end portion of a previous line according to the misregistration amount ΔD. Further, when the misregistration amount ΔD is a positive value (see FIG. 11B), and the adjustment projection image $30_2$ is moved in a direction of coming close, in a range according to the misregistration amount ΔD, of an end of the moved adjustment projection image in the moving direction, each line includes a tip end portion of a next line according to the misregistration amount AD.

Therefore, in the case of the positioning in the horizontal direction, when the misregistration amount ΔD is a negative value, the image processing unit $100_2$' arranges pixels of the black image, in the range according to the misregistration amount ΔD of the end at the opposite side to the moving direction, of the moved adjustment projection image, according to the control signal from the control unit 121". Further, when the misregistration amount ΔD is a positive value, the image processing unit $100_2$' arranges pixels of the black image, in the range according to the misregistration amount ΔD of the end in the moving direction, of the moved adjustment projection image, according to the control signal from the control unit 121".

As described above, according to the third embodiment, positioning of a plurality of projection images can be executed without optical or mechanical control.

Fourth Embodiment

Next, a fourth embodiment will be described. The first to third embodiments have been described on the assumption that the projector devices $10_1$ and $10_2$ (in the case of the first embodiment) are horizontally installed, and the projection images $20_1$ and $20_2$ by the projector devices $10_1$ and $10_2$ are projected in parallel.

However, in reality, one of the projection images $20_1$ and $20_2$ may be rotated and projected by a given angle with respect to the other projection image. In the first to third embodiments, the positioning processing of the projection images $20_1$ and $20_2$ is performed by movement of the projection images $20_1$ and $20_2$ (the adjustment projection images $30_1$ and $30_2$) in the horizontal and vertical directions. Therefore, the positioning processing in the first to third embodiments cannot handle misregistration due to rotation of the projection images $20_1$ and $20_2$.

Therefore, in the fourth embodiment, for example, gradation regions in which luminance gradients are in opposite directions to each other are provided to each of adjustment projection images projected from two projector devices. Then, in an overlapped region where the gradation regions are overlapped between the adjustment projection images, luminance change is detected in a direction perpendicular to the luminance gradient, existence/non-existence of misregistration of a projection image by each projector device in a rotating direction is determined, using a detection result, an angle of the projection image is adjusted, based on a determination result, and positioning of the rotating direction is performed.

After the positioning processing of rotating direction by the fourth embodiment is performed, the positioning processing in the horizontal and vertical directions by the first to third embodiments is performed. Accordingly, even when the projection image is rotated at a given angle θ, positioning of projection images among a plurality of projector devices can be highly accurately performed.

Figure 18:
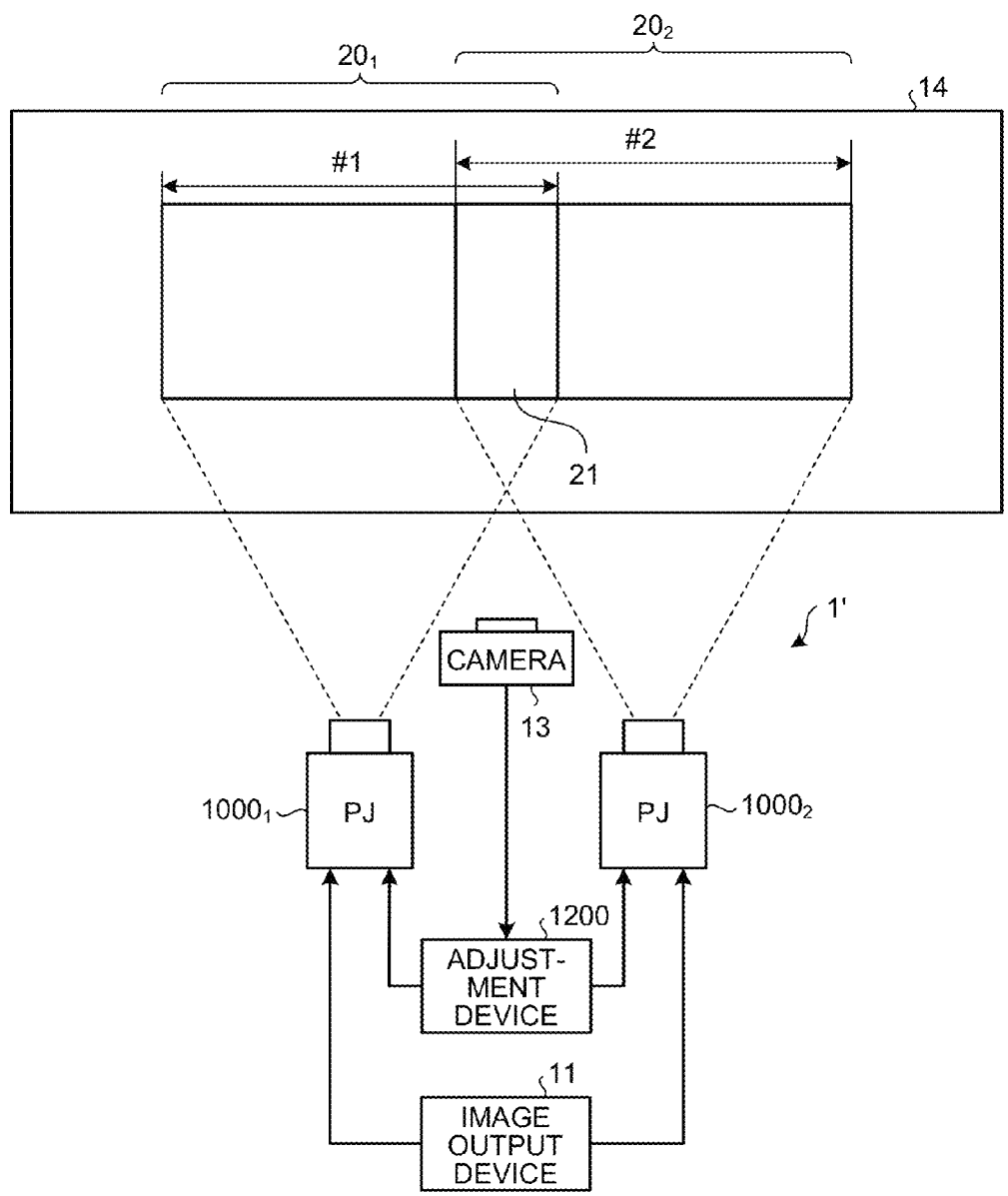
FIG. 18 is a block diagram schematically illustrating a multi-projector system according to a fourth embodiment.

FIG. 18 schematically illustrates a multi-projector system according to the fourth embodiment. Note that, in FIG. 18, a portion common to FIG. 1 is denoted with the same reference sign, and detailed description is omitted. A multi-projector system 1' illustrated in FIG. 18 includes, similarly to the multi-projector system of FIG. 1, a plurality of projector devices $1000_1$ and $1000_2$, an image output device 11, an adjustment device 1200, and a camera 13.

The image output device 11 outputs image data to each of the projector devices $1000_1$ and $1000_2$. The projector devices $1000_1$ and $1000_2$ input the image data output from the image output device 11, as input image data, apply predetermined image processing to the input image data to generate projection image data, modulate light from a light source with an optical modulator, based on the projection image data, and project the modulated light on a screen 14, as projection images $20_1$ and $20_2$, respectively. The two projector devices $1000_1$ and $1000_2$ project the projection images $20_1$ and $20_2$ on the common screen 14 to form an overlapped region 21.

Figure 19A:
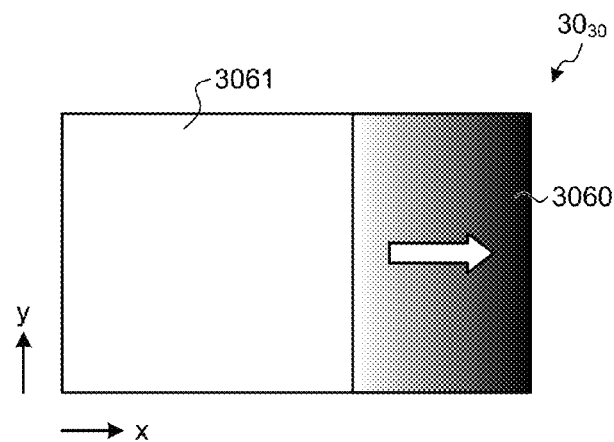
FIG. 19A is a diagram for describing a method of adjusting an angle of a projection image according to the fourth embodiment.
Figure 19B:
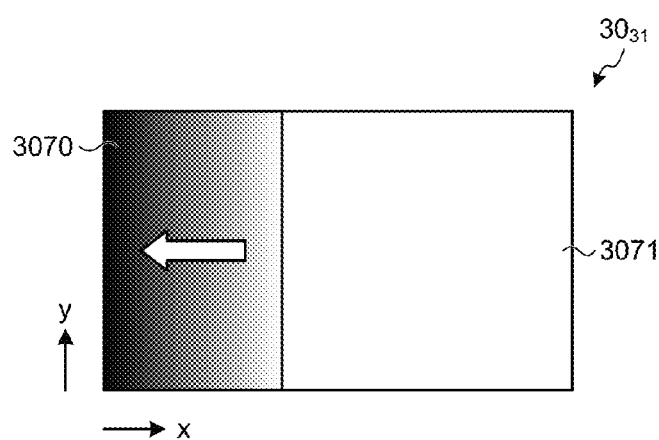
FIG. 19B is a diagram for describing a method of adjusting an angle of a projection image according to the fourth embodiment.
Figure 19C:
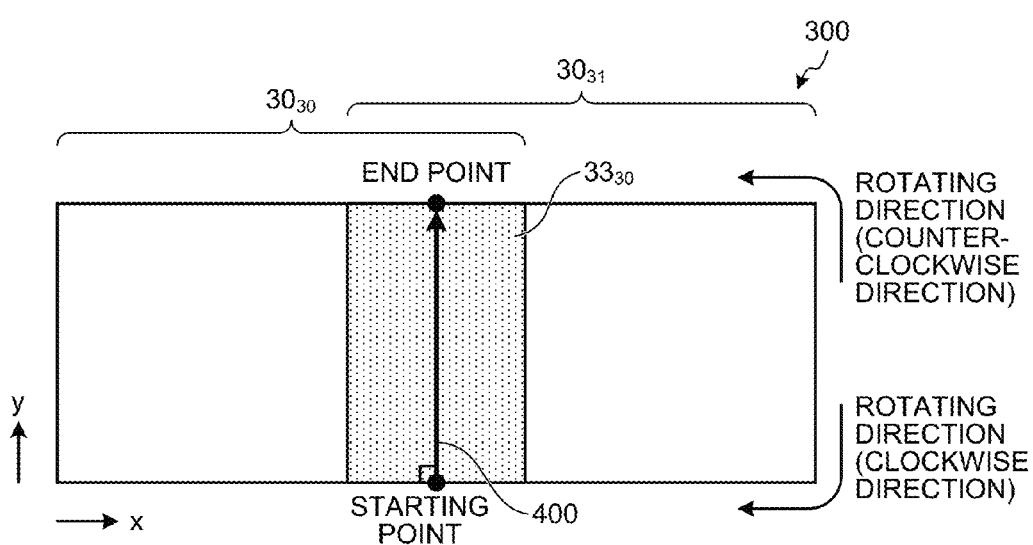
FIG. 19C is a diagram for describing a method of adjusting an angle of a projection image according to the fourth embodiment.

A method of adjusting an angle of a projection image according to the fourth embodiment will be schematically described using FIGS. 19A to 19C. FIGS. 19A and 19B illustrate examples of projection images according to the fourth embodiment, based on image data output from the image output device 11. FIG. 19A illustrates an example of an adjustment projection image $30_{30}$ based on image data of angle adjustment output from the projector device $1000_1$ arranged on the left side. FIG. 19B illustrates an example of an adjustment projection image $30_{31}$ based on image data of angle adjustment output from the projector device $1000_2$ arranged on the right side.

As exemplarily illustrated in FIG. 19C, a right end portion and a left end portion of the adjustment projection images $30_{30}$ and $30_{31}$ are overlapped, and the adjustment projection images $30_{30}$ and $30_{31}$ are projected on the screen 14. In FIG. 19C, a portion where the adjustment projection images $30_{30}$ and $30_{31}$ are overlapped is illustrated as an overlapped region $33_{30}$, and a projection image including a left end of the adjustment projection image $30_{30}$ to a right end of the adjustment projection image $30_{31}$ projected on the screen 14 is illustrated as an entire projection image 300. Further, in FIGS. 19A to 19C, the vertical direction is illustrated as a coordinate y, and the horizontal direction is illustrated as a coordinate x. In this case, coordinates (x, y) represent coordinates based on one adjustment projection image (adjustment projection image $30_{30}$) of when the adjustment projection images $30_{30}$ and $30_{31}$ are projected on the screen 14.

The adjustment projection image $30_{30}$ exemplarily illustrated in FIG. 19A includes an adjustment region 3060 corresponding to the overlapped region $33_{30}$, and a region 3061 other than the adjustment region 3060. The adjustment region 3060 is an image with a gradation in which luminance is decreased in one direction at a fixed gradient. In the example of FIG. 19A, in the gradation image of the adjustment region 3060, the luminance is decreased from the left end to the right end, as illustrated by the arrow in the drawing.

The adjustment projection image $30_{31}$ exemplarily illustrated in FIG. 19B includes an adjustment region 3070 corresponding to the overlapped region $33_{30}$, and a region 3071 other than the adjustment region 3070. The adjustment region 3070 is a gradation image having a luminance gradient in an opposite direction to the adjustment region 3060. That is, in the gradation image of the adjustment region 3070, the luminance is decreased from the right end to the left end, as illustrated by the arrow in the drawing.

Maximum luminance and minimum luminance by gradation in the adjustment regions 3060 and 3070 in the fourth embodiment can be maximum luminance and minimum luminance in the image data respectively. The gradations in the adjustment regions 3060 and 3070 applicable to the fourth embodiment are not limited to the examples, and any gradations may be applied as long as the maximum luminance and the minimum luminance are matched with each other between the adjustment regions 3060 and 3070. Further, in the fourth embodiment, luminance of the regions 3061 and 3071 can be an arbitrary luminance.

Note that directions of the gradients of the luminance in the adjustment regions 3060 and 3070 are favorably parallel to sides of the adjustment projection images $30_{30}$ and $30_{31}$, respectively. Further, in the example of FIGS. 19A and 19B, the directions of the gradients of luminance are the horizontal directions of the adjustment projection images $30_{30}$ and $30_{31}$, respectively. However, an embodiment is not limited to the example, and the directions of the gradients of the luminance may be the vertical direction or a diagonal direction.

The projector devices $1000_1$ and $1000_2$ overlap the regions 3060 and 3070 and project the adjustment projection images $30_{30}$ and $30_{31}$ configured as described above on the screen 14. Then, the image of the region 3060 and the image of the region 3070 based on the gradation images having gradients in mutually opposite directions are composited, and the image of the overlapped region $33_{30}$ illustrated in FIG. 19C is obtained. That is, in the overlapped region $33_{30}$, the gradation images with the luminance inclined in mutually opposite directions are composited.

At this time, when the adjustment projection images $30_{30}$ and $30_{31}$ are projected such that the directions of the luminance gradients become parallel in the adjustment regions 3060 and 3070, the luminance in the overlapped region $33_{30}$ becomes uniform. Meanwhile, when one of the adjustment regions 3060 and 3070 is rotated at a given angle θ with respect to the other adjustment region, the luminance in the overlapped region $33_{30}$ is inclined in a direction approximately perpendicular to the directions of the luminance gradients in the adjustment regions 3060 and 3070.

Therefore, in the fourth embodiment, the entire projection image 300 projected on the screen 14 is captured by the camera 13, and the adjustment device 1200 analyzes the captured entire projection image 300, and acquires the luminance change in the overlapped region $33_{30}$. The adjustment device 1200 then determines whether one of the adjustment projection images $30_{30}$ and $30_{31}$ is rotated with respect to the other adjustment projection image, based on the acquired luminance change. When having determined that the one of the adjustment projection images is rotated, the adjustment device 1200 generates a control signal for adjusting an angle of the projection image.

To be more specific, as illustrated by the arrow 400 in FIG. 19C, the adjustment device 1200 uses one of the adjustment projection images $30_{30}$ and $30_{31}$ (here, the adjustment projection image $30_{30}$), as a reference, scans the adjustment region 3060 in the adjustment projection image $30_{30}$ serving as the reference toward a direction perpendicular to the direction of the luminance gradient in the adjustment region 3060, and detects the luminance change. When the detected luminance change is within a predetermined range, the adjustment device 1200 determines that the other adjustment projection image $30_{31}$ is not rotated with respect to the adjustment projection image $30_{30}$ serving as the reference, and the projection image projected by the projector device $1000_1$ and the projection image projected by the projector device $1000_2$ are parallel.

Meanwhile, when the detected luminance change exceeds the above range, the adjustment device 1200 determines that the other adjustment projection image $30_{31}$ is rotated in a rotating direction of either a clockwise direction (right-hand turn) or a counterclockwise direction (left-hand turn) with respect to the adjustment projection image $30_{30}$ serving as the reference, and determine that the projection image projected by the projector device $1000_2$ is rotated with respect to the projection image projected by the projector device $1000_1$. In this case, the adjustment device 1200 generates the control signal for adjusting the angle of the projection image, and supplies the control signal to the projector device $1000_2$ that projects the other adjustment projection image $30_{31}$, for example.

Note that, hereinafter, a state in which the projection image projected by one projector device and the projection image projected by the other projector device are parallel is called a correct angle relationship.

A method of determining existence/non-existence of rotation of a projection image according to the fourth embodiment will be described in more detail using FIGS. 20A and 20B. As exemplarily illustrated in FIG. 20A, consider a case in which the adjustment projection image $30_{31}$ is rotated in the counterclockwise direction (left-hand turn) with respect to the adjustment projection image $30_{30}$ serving as the reference, at an angle θ around a center 410 of the adjustment projection image $30_{31}$.

Figure 20A:
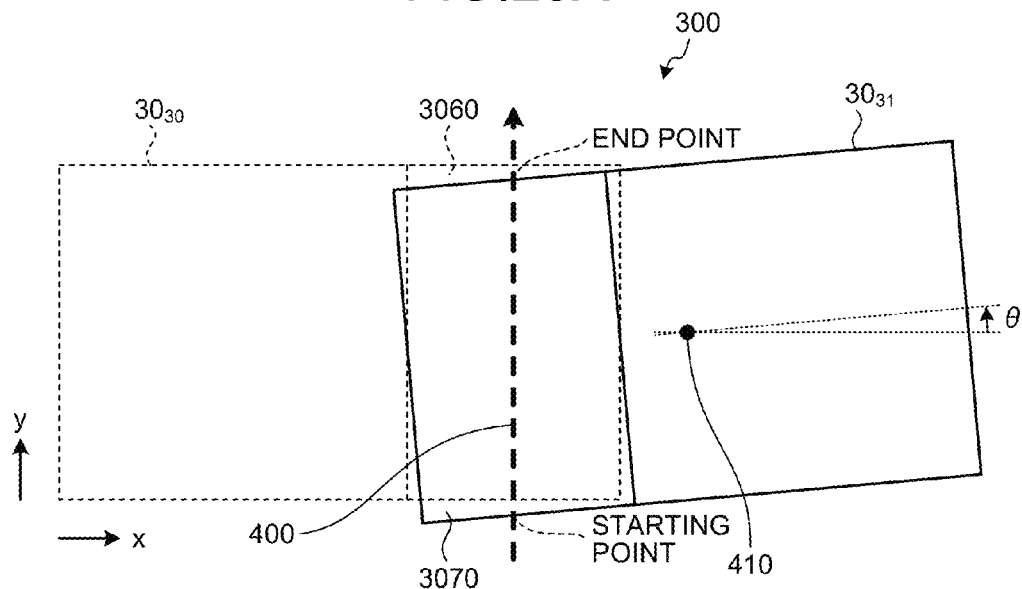
FIG. 20A is a diagram for describing a method of determining existence/non-existence of rotation of a projection image according to the fourth embodiment in more detail.

The adjustment device 1200 captures the adjustment projection images $30_{30}$ and $30_{31}$ projected on the screen 14 as illustrated in FIG. 20A, and analyzes the captured image. The adjustment device 1200 extracts the overlapped region $33_{30}$ from the entire projection image 300 made of the adjustment projection images $30_{30}$ and $30_{31}$, based on an analysis result, and extracts the luminance change in the overlapped region $33_{30}$, in the direction perpendicular to the direction of the luminance gradient of the adjustment region 3060. In the example of FIG. 20A, the adjustment device 1200 scans the image along a line that passes through a middle point of the lower end and the upper end of the adjustment region 3060 serving as the reference, of the adjustment regions 3060 and 3070 that configure the overlapped region $33_{30}$, as illustrated by the arrow 400, and acquires the luminance. Note that the adjustment device 1200 performs the scan, having the lower end side of the adjustment region 3060 as a starting point, and the upper end side of the adjustment region 3060 as an end point.

When the adjustment device 1200 acquires the luminance along the direction perpendicular to the direction of the luminance gradient in the adjustment region 3060 of the adjustment projection image $30_{30}$ serving as the reference, the adjustment device 1200 scans positions of the same tone in the gradation in the adjustment region 3060. Therefore, in the adjustment region 3060, the luminance change is not detected.

Figure 20B:
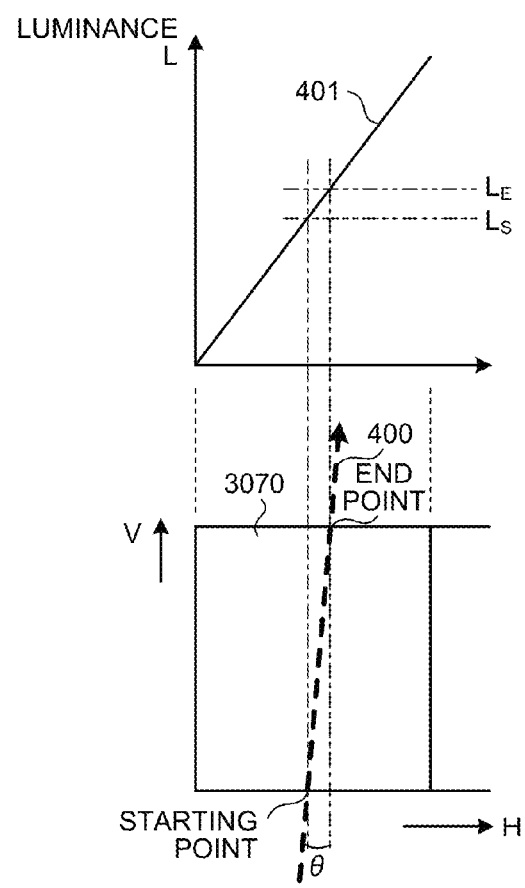
FIG. 20B is a diagram for describing a method of determining existence/non-existence of rotation of a projection image according to the fourth embodiment in more detail.

Meanwhile, in the adjustment region 3070 of the adjustment projection image $30_{31}$ rotated with respect to the adjustment projection image $30_{30}$ at the angle θ, as exemplarily illustrated in the lower drawing of FIG. 20B, the scan direction (the arrow 400) is inclined to the adjustment region 3070 by the angle θ. Note that, in FIG. 20B, the upper drawing illustrates the luminance change L in the adjustment region 3070 by a line 401. Since the scan direction is inclined to the adjustment region 3070 by the angle θ, horizontal positions in the adjustment region 3070 are different in the starting point and the end point of the scan. Therefore, the luminance $L_S$ and luminance $L_E$ in the starting point and the end point of the scan are in positions of different tones in the gradation in the horizontal direction of the adjustment region 3070, and the luminance is changed from the starting point to the end point of the scan.

Figure 21A:
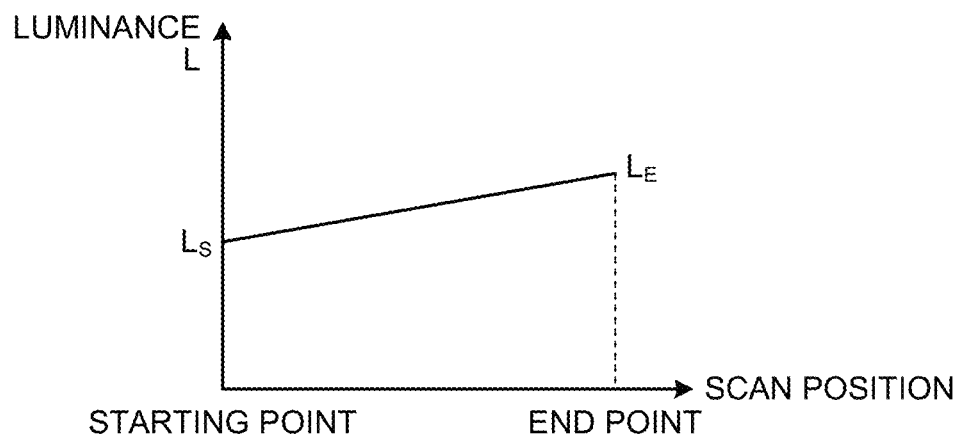
FIG. 21A is a diagram illustrating an example of luminance change detected when an adjustment region is rotated.
Figure 21B:
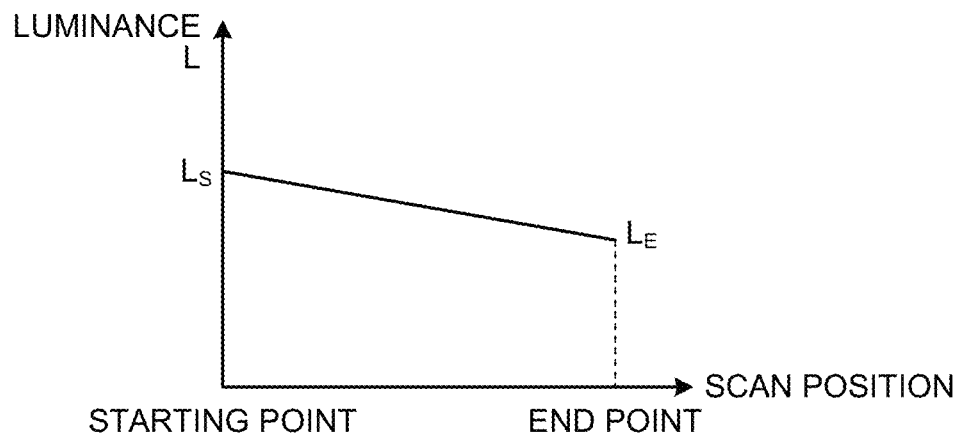
FIG. 21B is a diagram illustrating an example of luminance change detected when an adjustment region is rotated.

FIGS. 21A and 21B illustrate examples of the luminance change detected when the adjustment region 3070 is rotated. FIG. 21A illustrates an example of when the luminance $L_S$ of the starting point of the scan is lower than the luminance $L_E$ of the end point, and the gradient of the luminance change with respect to the scan position becomes positive. In this case, the end point of the scan is positioned at the right side of the starting point in the adjustment region 3070, and this indicates that the adjustment region 3070 is rotated in the counterclockwise direction (left-hand turn) with respect to the adjustment region 3060, corresponding to the example of FIGS. 20A and 20B. Therefore, in the projector device $1000_2$ that projects the adjustment projection image $30_{31}$ including the adjustment region 3070, the projection image is rotated in the clockwise direction, so that the projection images by the projector devices $1000_1$ and $1000_2$ become in the correct angle relationship.

Meanwhile, FIG. 21B illustrates an example of when the luminance $L_S$ of the starting point of the scan is higher than the luminance $L_E$ of the end point, and the gradient of the luminance change with respect to the scan position becomes negative. In this case, contrary to the above case, the end point of the scan is positioned at the left side of the starting point in the adjustment region 3070, and this indicates that the adjustment region 3070 is rotated in the clockwise direction (right-hand turn) with respect to the adjustment region 3060. Therefore, the projection image is rotated in the projector device $1000_2$ in the counterclockwise direction, so that the projection images by the projector devices $1000_1$ and $1000_2$ become in the correct angle relationship.

Note that the luminance exemplarily illustrated in FIGS. 21A and 21B becomes a composite luminance of the luminance acquired in the adjustment region 3060 and the luminance acquired in the adjustment region 3070. In this case, in the adjustment region 3060, the scan is performed in the direction perpendicular to the direction of the luminance gradient, and thus the luminance is a fixed value. Therefore, the luminance exemplarily illustrated in FIGS. 21A and 21B have the luminance change in the adjustment region 3070 in which the luminance in the adjustment region 3060 is offset.

Figure 22:
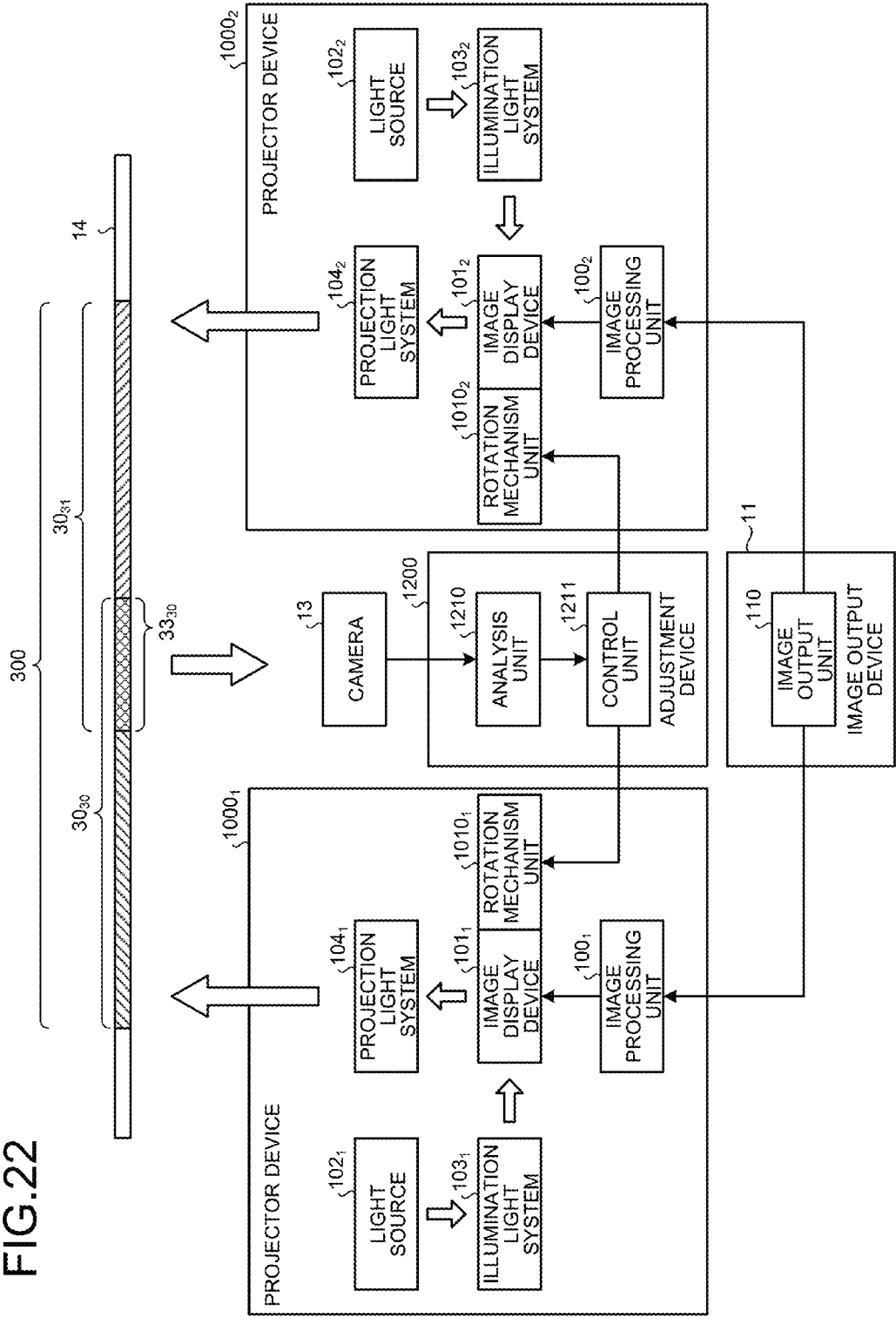
FIG. 22 is a block diagram illustrating a configuration of an example of a multi-projector system according to the fourth embodiment in more detail.

FIG. 22 illustrates a configuration of an example of a multi-projector system 1' according to the fourth embodiment in more detail. Note that, in FIG. 22, a portion common to FIGS. 5 and 18 is denoted with the same reference sign, and detailed description is omitted.

The image output device 11 includes the image output unit 110 that outputs the adjustment image data for projecting the adjustment projection images $30_{30}$ and $30_{31}$. The adjustment image data are supplied to the projector devices $1000_1$ and the $1000_2$, respectively, as the input image data.

The projector device $1000_1$ includes an image processing unit $100_1$, an image display device $101_1$, a light source $102_1$, an illumination light system $103_1$, a projection light system $104_1$, and a rotation mechanism unit $1010_1$. Similarly, the projector device $1000_2$ includes an image processing unit $100_2$, an image display device $101_2$, a light source $102_2$, an illumination light system $103_2$, a projection light system $104_2$, and a rotation mechanism unit $1010_2$. As describe above, the projector devices $1000_1$ and $1000_2$ can be realized by a common configuration, and thus hereinafter, the projector device $1000_1$ will be exemplarily described.

In the projector device $1000_1$, the image processing unit $100_1$, the image display device $101_1$, the light source $102_1$, the illumination light system $103_1$, and the projection light system $104_1$ have approximately the same configurations as the corresponding configurations described using FIG. 5, and thus descriptions are omitted.

In the projector device $1000_1$, the rotation mechanism unit $1010_1$ rotates the image display device $101_1$ on the same plane as an emission surface, having the center of the emission surface as a center of the rotation, according to the control signal from the adjustment device 1200. Accordingly, the angle of the projection image on the screen 14 can be adjusted.

The light emitted from the image display device $101_1$ is projected on the screen 14 through the projection light system $104_1$, as the projection image. When the input image data input to the image processing unit $100_1$ is the image data for projecting the adjustment projection image $30_{30}$ output from the image output device 11, the adjustment projection image $30_{30}$ is projected on the screen 14. On the screen 14, the adjustment projection image $30_{31}$ is similarly projected from the projector device $1000_2$. At this time, the adjustment projection images $30_{30}$ and $30_{31}$ are projected on the screen 14 to form the overlapped region $33_{30}$.

The adjustment device 1200 includes an analysis unit 1210 and a control unit 1211. The analysis unit 1210 analyzes the captured image data captured by the camera 13 to include at least the overlapped region $33_{30}$ on the screen 14, and obtains the luminance change in the overlapped region $33_{30}$. The analysis unit 1210 supplies information that indicate the obtained luminance change to the control unit 1211.

The control unit 1211 generates control signals for adjusting projection angles of the adjustment projection images $30_{30}$ and $30_{31}$, based on the information that indicates the luminance change supplied from the analysis unit 1210. The control signal for adjusting the projection angle by the projector device $1000_1$ is supplied to the rotation mechanism unit $1010_1$ of the projector device $1000_1$. Further, the control signal for adjusting the projection angle by the projector device $1000_2$ is supplied to the rotation mechanism unit $1010_2$ of the projector device $1000_2$.

Figure 23:
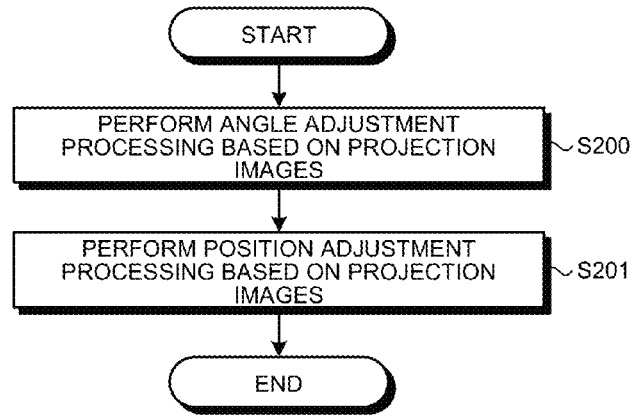
FIG. 23 is a flowchart illustrating an example of positioning processing according to the fourth embodiment.

FIG. 23 is a flowchart illustrating an example of positioning processing according to the fourth embodiment, executed by the above-described configuration. In FIG. 23, in step S200, the adjustment device 1200 performs angle adjustment processing of the projection images by the projector devices $1000_1$ and $1000_2$, based on the captured image obtained by capturing the projection image on the screen 14 by the camera 13, as described below in detail. In next step S201, the adjustment device 1200 performs position adjustment processing of the projection images by the projector devices $1000_1$ and $1000_2$, based on the captured image obtained by capturing the projection image on the screen 14 by the camera 13 again, according to the processing of the flowchart of FIG. 6.

Figure 24:
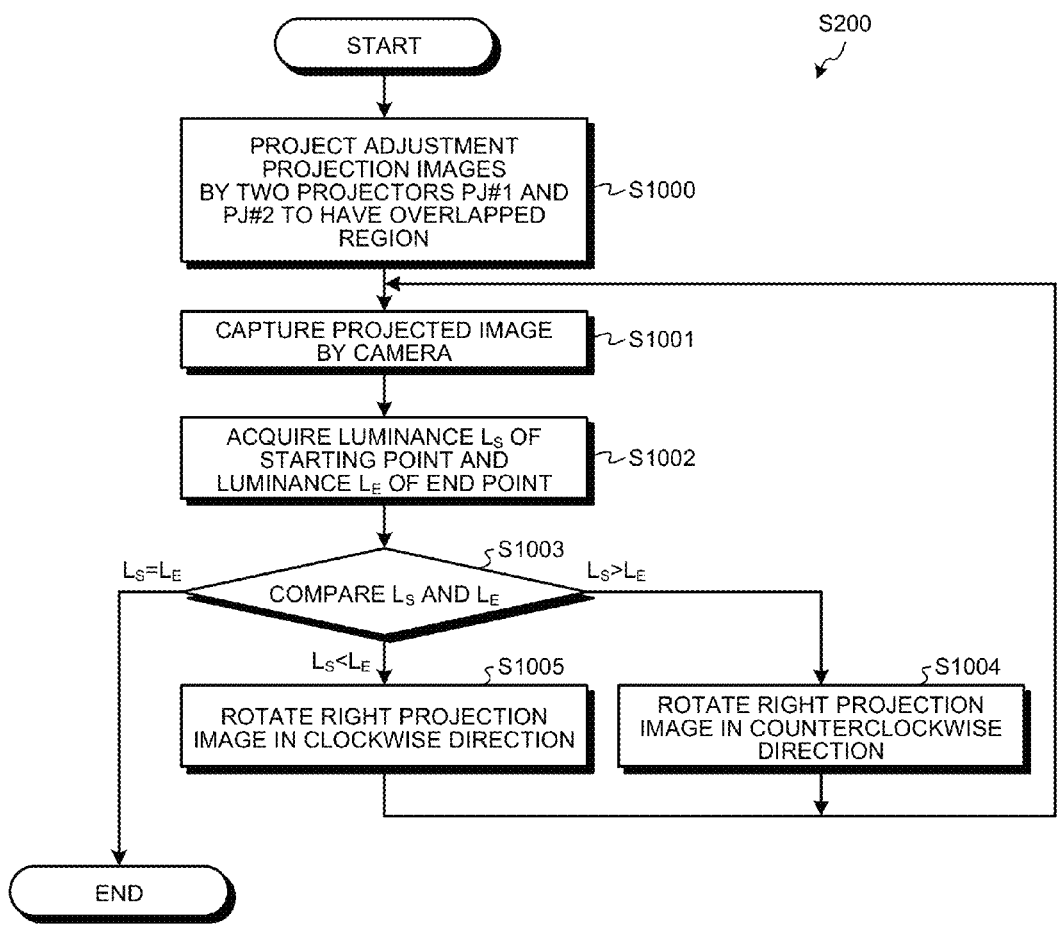
FIG. 24 is a flowchart illustrating an example of angle adjustment processing according to the fourth embodiment.

FIG. 24 is a flowchart illustrating an example of the angle adjustment processing in step S200. In step S1000, the adjustment projection images $30_{30}$ and $30_{31}$ are adjusted by two projectors PJ#1 and PJ#2 (the projector devices $1000_1$ and $1000_2$) to have the overlapped region $33_{30}$, for example, by visual observation, and projected on the screen 14.

In next step S1001, the camera 13 captures the projection image on the screen 14. In the fourth embodiment, the camera 13 captures the projection image such that the captured image includes at least the overlapped region $33_{30}$ of the entire projection image 300 on the screen 14, and any distortions of a subject image due to a tilt angle do not occur. The captured image is supplied to the adjustment device 1200, and input to the analysis unit 1210.

In next step S1002, the analysis unit 1210 extracts the overlapped region $33_{30}$ from the captured image supplied from the camera 13. The analysis unit 1210 then scans the overlapped region $33_{30}$, having the lower end and the upper end of the overlapped region $33_{30}$, as the starting point and the end point respectively, and acquires the luminance $L_S$ of the starting point and the luminance $L_E$ of the end point.

In next step S1003, the analysis unit 1210 compares the luminance $L_S$ of the starting point and the luminance $L_E$ of the end point acquired in step S1002.

As a result of the comparison in step S1003, when the luminance $L_S$>the luminance $L_E$ (corresponding to FIG. 21B), the analysis unit 1210 moves the processing onto step S1004, and determines that the adjustment projection image $30_{31}$ is rotated in the clockwise direction with respect to the adjustment projection image $30_{30}$. The control unit 1211 generates the control signal for rotating the projection image in the counterclockwise direction, according to the determination result, and supplies the control signal to the rotation mechanism unit $1010_2$ of the projector device $1000_2$. Then, the control unit 1211 puts the processing back to step S1001.

Further, as a result of the comparison in step S1003, when the luminance $L_S$<the luminance $L_E$ (corresponding to FIG. 21A), the analysis unit 1210 moves the processing onto step S1005, and determines that the adjustment projection image $30_{31}$ is rotated in the counterclockwise direction with respect to the adjustment projection image $30_{30}$. The control unit 1211 generates the control signal for rotating the projection image in the clockwise direction, according to the determination result, and supplies the control signal to the rotation mechanism unit $1010_2$ of the projector device $1000_2$. Then, the control unit 1211 puts the processing back to step S1001.

Further, as a result of the comparison in step S1003, when the luminance $L_S$=the luminance $L_E$, the analysis unit 1210 determines that the adjustment projection images $30_{30}$ and $30_{31}$ are in the correct angle relationship, and terminates the processing.

Note that it is favorable to perform the determination of the comparison result in step S1003, with a predetermined margin. For example, when an absolute value of a difference between the luminance $L_S$ and the luminance $L_E$ falls within a predetermined range, the luminance $L_S$=the luminance $L_E$ is determined. When the difference between the luminance $L_S$ and the luminance $L_E$ exceeds the predetermined range, the luminance $L_S$>the luminance $L_E$ or the luminance $L_S$<the luminance $L_E$ is determined.

Note that, in the position adjustment processing of the projection image in step S201, switch of the image data output from the image output device 11 at the point of time when the angle adjustment processing of the projection image in step S200 is completed, with the image data for projecting the adjustment projection images $30_1$ and $30_2$ illustrated in FIGS. 2A and 2B can be considered. After the image output device 11 switches the projection image data, the camera 13 captures the entire projection image 300 on the screen 14, and the position adjustment processing is performed according to the flowchart of FIG. 6.

An embodiment is not limited to the example. At the point of time of step S200, the adjustment projection images $30_1$ and $30_2$ may be projected. In this case, in the processing of step S200, the analysis unit 1210 scans the region 331 in which the gradation regions 311 and 321 with the luminance inclined in the horizontal direction are overlapped, in the direction perpendicular to the direction of the luminance gradient to acquire the luminance change, thereby to perform similar angle adjustment processing. Further, the analysis unit 1210 may similarly scan the region 330 to acquire the luminance change, thereby to perform similar angle adjustment processing.

Note that, when the angle adjustment is performed using the adjustment projection images $30_1$ and $30_2$, a width to be scanned to detect the luminance change becomes narrower than the case of using the lower end to the upper end of the adjustment projection images $30_{30}$ and $30_{31}$, as the adjustment regions 3060 and 3070, exemplarily illustrated in FIGS. 19A and 19B. Therefore, the case of using the adjustment projection images $30_1$ and $30_2$ may have a disadvantage in terms of accuracy, compared with the case of using the adjustment projection images $30_{30}$ and $30_{31}$.

In the above description, as illustrated in FIG. 20A, a case where the adjustment projection image $30_{31}$ is rotated around the center 410 of the image has been described. However, in reality, the adjustment projection image $30_{31}$ may be rotated around an arbitrary point inside the image or outside the image. In such a case, the angle adjustment method according to the fourth embodiment can be similarly applied.

Further, in the above description, the angle adjustment of the projection image has been performed by rotation of the image display device $101_2$ by the rotation mechanism unit $1010_2$ (in the case of the projector device $1000_2$). However, an embodiment is not limited to the example. That is, the angle adjustment of the projection image may be performed by driving of a stand of the projector device $1000_2$ by the stand drive unit $106_2$, like the above-described second embodiment, or the projection image may be rotated by image processing in an image processing unit $100_2'$, like the above-described third embodiment.

Fifth Embodiment

Next, a fifth embodiment will be described. In the fifth embodiment, a region of each adjustment projection image, corresponding to an overlapped region where the adjustment projection images projected by two projector devices are overlapped, is divided into three regions in a vertical direction, and upper and lower end regions are caused to be gradation images with a luminance inclined in a first direction, and an intermediate region is caused to be a gradation image with a luminance inclined in a direction perpendicular to the first direction.

Figure 25A:
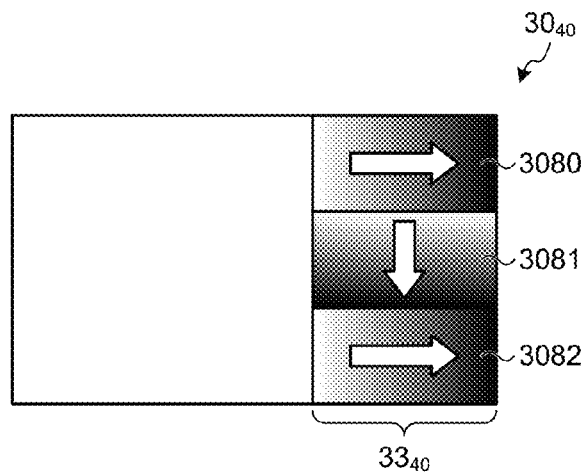
FIG. 25A is a diagram for describing a method of adjusting an angle of a projection image according to a fifth embodiment.
Figure 25B:
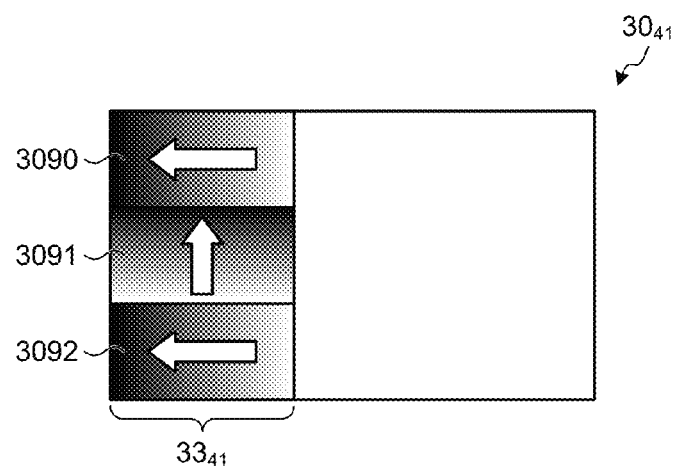
FIG. 25B is a diagram for describing a method of adjusting an angle of a projection image according to the fifth embodiment.
Figure 25C:
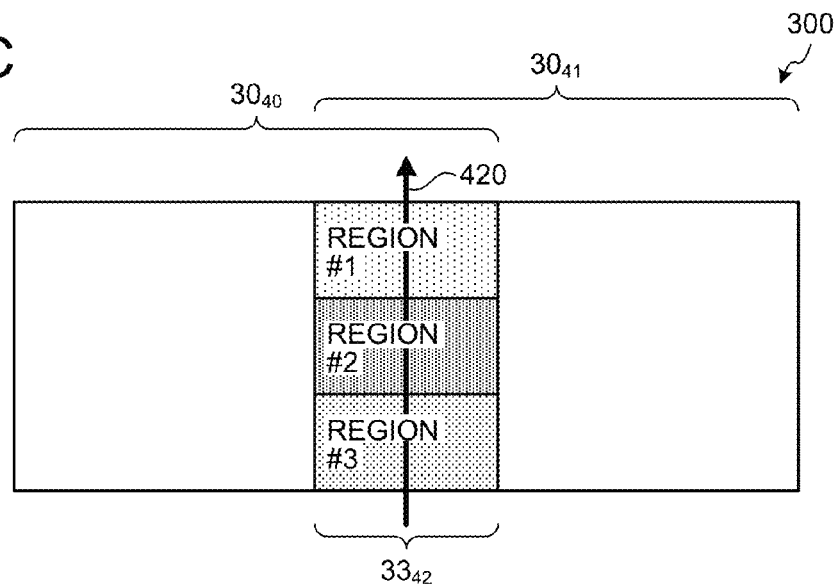
FIG. 25C is a diagram for describing a method of adjusting an angle of a projection image according to the fifth embodiment.

A method of adjusting an angle of a projection image according to the fifth embodiment will be schematically described using FIGS. 25A to 25C. Note that, in the fifth embodiment, the multi-projector system 1' according to the fourth embodiment can be applied as it is. Therefore, detailed descriptions of the system are omitted.

FIGS. 25A and 25B illustrate examples of adjustment projection image according to the fifth embodiment. FIG. 25A illustrates an example of an adjustment projection image $30_{40}$ projected from a projector device $1000_1$ arranged on the left side. FIG. 25B illustrates an example of an adjustment projection image $30_{41}$ projected from a projector device $1000_2$ arranged on the right side.

A region $33_{40}$ that is a right end portion of the adjustment projection image $30_{40}$ illustrated in FIG. 25A, and a region $33_{41}$ that is a left end portion of the adjustment projection image $30_{41}$ illustrated in FIG. 25B are overlapped, and projected on a screen 14. FIG. 25C illustrates an example in which the adjustment projection image $30_{40}$ and the adjustment projection image $30_{41}$ are overlapped and projected, and the regions $33_{40}$ and $33_{41}$ are overlapped to form an overlapped region $33_{42}$.

In the adjustment projection image $30_{40}$ exemplarily illustrated in FIG. 25A, the region $33_{40}$ includes three regions 3080, 3081, and 3082. The regions 3080 and 3082 across the region 3081 are gradation images with a luminance decreased at a fixed gradient toward the right side. Further, the region 3081 is a gradation image with a luminance decreased at a fixed gradient toward a lower side, in a direction perpendicular to directions of the gradients of the regions 3080 and 3082.

Meanwhile, in the adjustment projection image $30_{41}$ exemplarily illustrated in FIG. 25B, the region $33_{41}$ includes three regions 3090, 3091, and 3092 in positions respectively corresponding to the regions 3080, 3081, and 3082 in the adjustment projection image $30_{40}$. The regions 3090, 3091, and 3092 are gradation images with the luminance inclined in an opposite direction to the regions 3080, 3081, and 3082 in corresponding positions.

In such a configuration, in the overlapped region $33_{42}$ formed by overlapping and projecting the adjustment projection images $30_{40}$ and $30_{41}$ to overlap the regions $33_{40}$ and $33_{41}$, regions respectively corresponding to the regions 3080 and 3090, the regions 3081 and 3091, and the regions 3082 and 3092 are regions #1, #2, and #3, as exemplarily illustrated in FIG. 25C.

In the fifth embodiment, an adjustment device 1200 scans the image of the overlapped region $33_{42}$ across the regions #1, #2, and #3 in a vertical direction, as illustrated by the arrow 420 in FIG. 25C, and detects the luminances of the respective regions #1, #2, and #3. As the luminances of the respective regions #1, #2, and #3, an average value of the luminances in the respective regions #1, #2, and #3 can be used. The adjustment device 1200 compares the luminance of the regions #1 and #3, of the detected luminance of the respective regions #1, #2, and #3, and determines existence/non-existence of rotation of the projection image, based on a comparison result.

Hereinafter, based on the adjustment projection image $30_{40}$, the regions #1, #2, and #3 are scanned perpendicular to the region $33_{40}$, and the existence/non-existence of rotation of the projection image $30_{41}$ with respect to the adjustment projection image $30_{40}$ is determined.

Figure 26A:
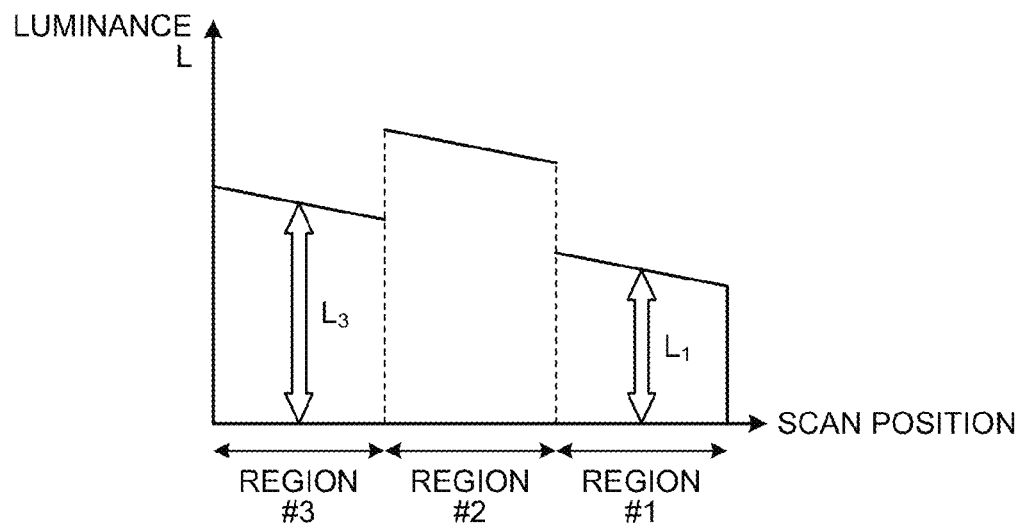
FIG. 26A is a diagram for describing a method of determining existence/non-existence of rotation of a projection image according to the fifth embodiment.
Figure 26B:
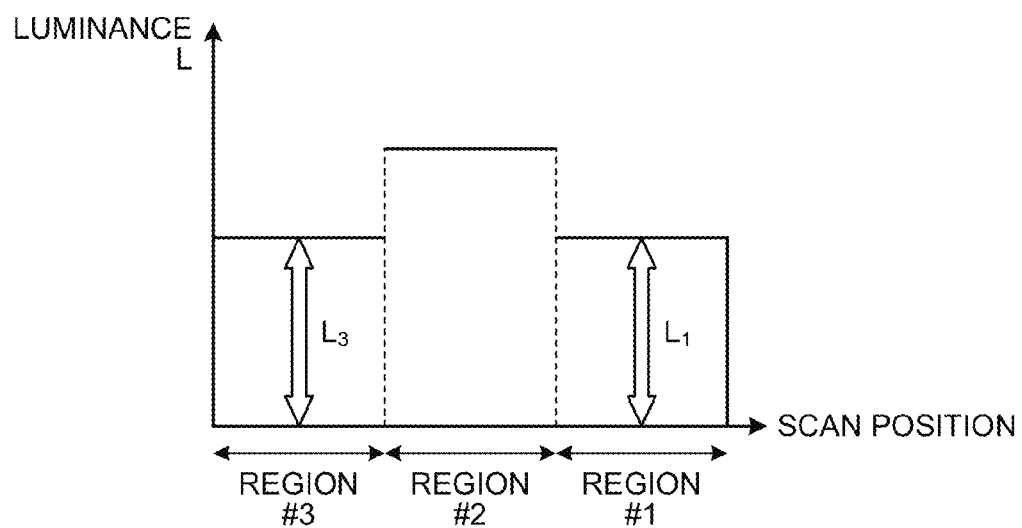
FIG. 26B is a diagram for describing a method of determining existence/non-existence of rotation of a projection image according to the fifth embodiment.

A method of determining existence/non-existence of rotation of a projection image according to the fifth embodiment will be schematically described using FIGS. 26A and 26B. FIG. 26A illustrates an example of the luminance of the respective regions #1, #2, and #3, of when one of the adjustment projection images $30_{40}$ and $30_{41}$ (here, the one is the adjustment projection image $30_{41}$) is rotated with respect to the other at a given angle θ.

As described using FIGS. 20A and 20B when one adjustment projection image is rotated at an angle θ, the luminance $L_S$ of a starting point of the scan is different from the luminance $L_E$ of an end point. Therefore, in the case of the adjustment projection images $30_{40}$ and $30_{41}$ illustrated in FIGS. 25A and 25B, the luminance $L_3$ of the region #3 in the lower end and the luminance $L_1$ of the region #1 in the upper end are different. In the example of FIG. 26A, the luminance $L_3$>the luminance $L_1$ is established, and FIG. 26A illustrates a case in which the adjustment projection image $30_{41}$ is rotated in a clockwise direction, based on the adjustment projection image $30_{40}$, corresponding to the example of FIG. 21B.

When the adjustment projection images $30_{40}$ and $30_{41}$ are in a correct angle relationship, the luminance $L_1$=the luminance $L_3$ is established, as exemplarily illustrated in FIG. 26B.

Note that, in the fifth embodiment, angle adjustment processing and position adjustment processing are performed in similar procedures to FIG. 23. At this time, the angle adjustment processing of step S200 of FIG. 23 is executable by reading the luminance $L_E$ as the luminance $L_1$, and the luminance $L_S$ as the luminance $L_3$, in the flowchart illustrated in FIG. 24, as details of step S200.

Figure 27A:
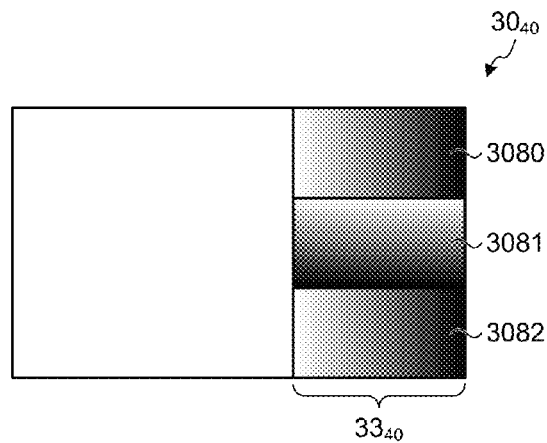
FIG. 27A is a diagram for describing an acquisition position of luminance of when an overlapped region is scanned according to the fifth embodiment.
Figure 27B:
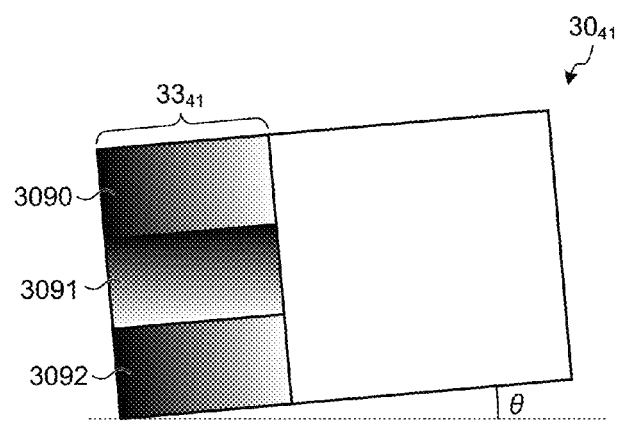
FIG. 27B is a diagram for describing an acquisition position of luminance of when an overlapped region is scanned according to the fifth embodiment.

An acquisition position of luminance of when the overlapped region $33_{42}$ is scanned, according to the fifth embodiment, will be described using FIGS. 27A to 27C. Based on the adjustment projection image $30_{40}$ illustrated in FIG. 27A, the adjustment projection image $30_{41}$ illustrated in FIG. 27B, and rotated in a counterclockwise direction at an angle θ, is overlapped, so that the overlapped region $33_{42}$ in which the regions $33_{40}$ and $33_{41}$ are overlapped is formed (see FIG. 27C).

Figure 27C:
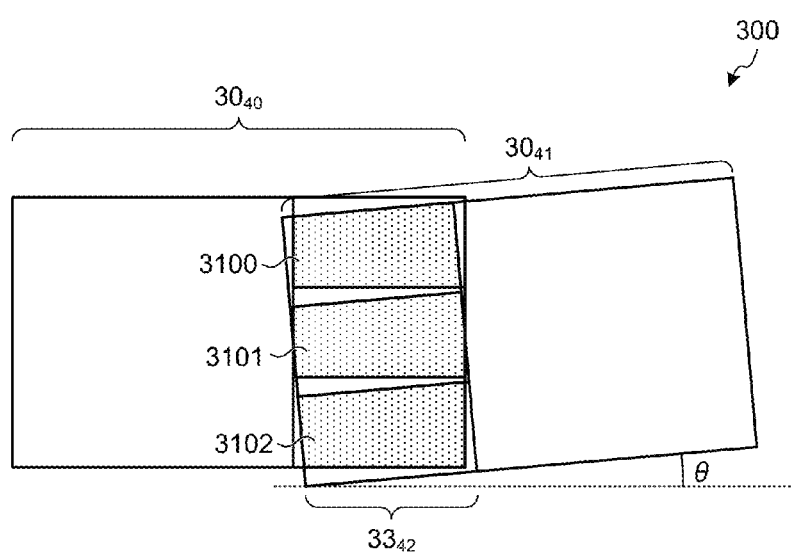
FIG. 27C is a diagram for describing an acquisition position of luminance of when an overlapped region is scanned according to the fifth embodiment.

Referring to FIG. 27C, the region 3100 in which the region 3090 is overlapped with the region 3080 is the region #1, the region 3101 in which the region 3091 is overlapped with the region 3081 is the region #2, and the region 3102 in which the region 3092 is overlapped with the region 3082 is the region #3. An analysis unit 1210 determines existence/non-existence of rotation, using the luminance acquired from portions corresponding to the regions #1, #2, and #3, of the luminance obtained by scanning the overlapped region $33_{42}$ in the vertical direction. These regions #1, #2, and #3 can be detected based on an edge of luminance change obtained by scanning the overlapped region $33_{42}$ in the vertical direction.

The method of detecting the luminance in the overlapped region $33_{42}$ can be applied to the fourth embodiment.

According to the fifth embodiment, in the region $33_{40}$, by use of two regions (the regions 3080 and 3081, for example) adjacent to each other, and having different directions of the luminance gradient, of the regions 3080, 3081, and 3082 included in the region $33_{40}$, the position adjustment processing according to the first to third embodiments can be executed. Therefore, when moving onto the position adjustment processing of step S201 after completion of the angle adjustment processing of step S200 of FIG. 23, it is not necessary to switch projection image data to be output in the image output device 11.

First Modification of Fifth Embodiment

Next, a first modification of the fifth embodiment will be described. In the first modification of the fifth embodiment, two or more sets of a first region with a luminance gradient being in a first direction and formed in one end side, a second region with a luminance gradient being perpendicular to the first direction, and a third region with a luminance gradient being the first direction, and formed in the other end, according to the fifth embodiment, are provided to one adjustment image, similarly to the first modification of the first embodiment. Hereinafter, the set of these first region, second region, and third region is called a "set of angle adjustment regions".

Figure 28:
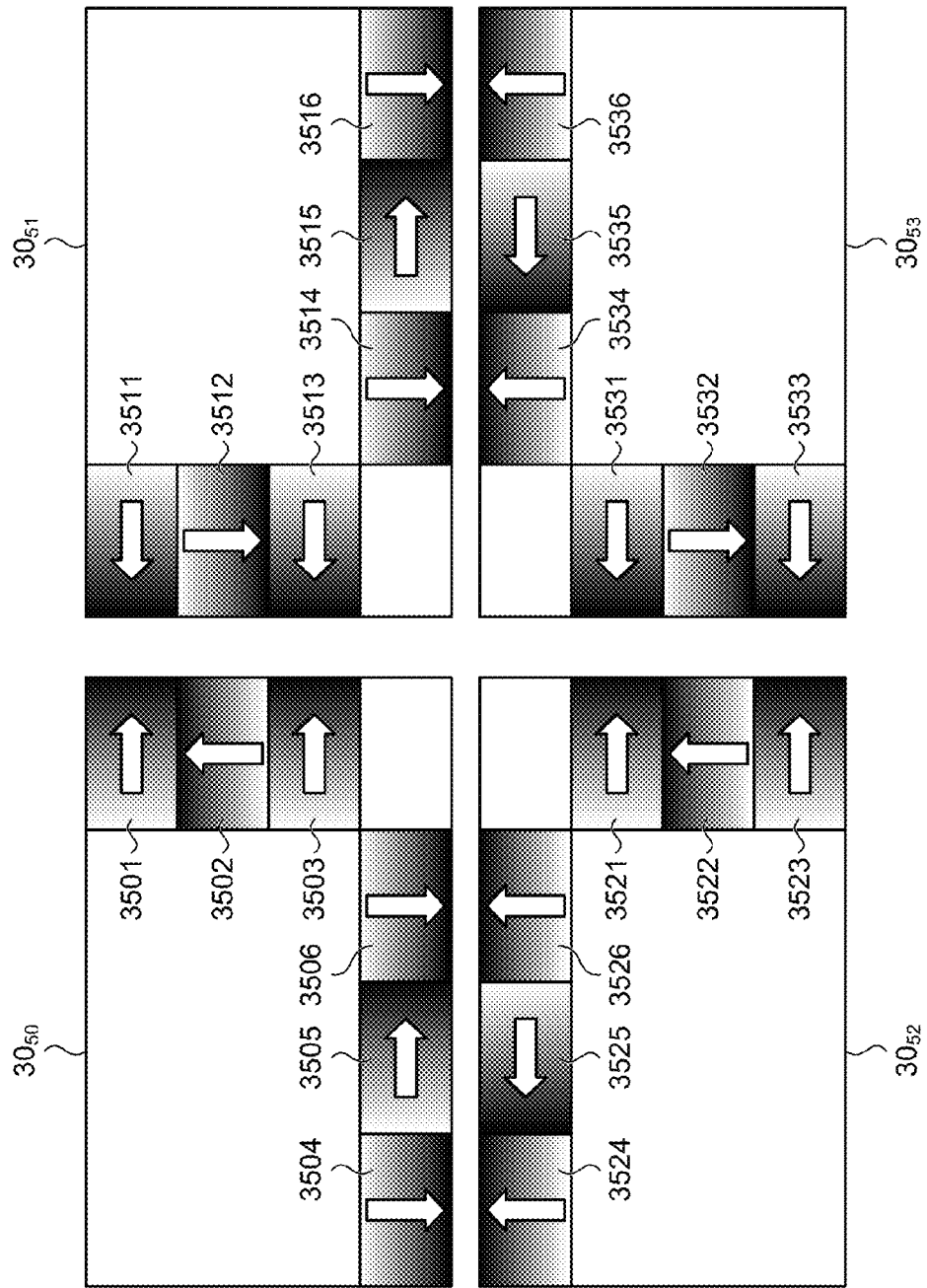
FIG. 28 is a diagram illustrating an example of an adjustment projection image according to a first modification of the fifth embodiment.

FIG. 28 illustrates examples of adjustment projection images according to the first modification of the fifth embodiment. In FIG. 28, the adjustment projection images $30_{50}$, $30_{51}$, $30_{52}$, and $30_{53}$ include sets of angle adjustment regions in two sides that share vertexes, respectively. By providing two sets of angle adjustment regions in the adjustment projection image, as described above, the method of adjusting an angle according to the fifth embodiment can be applied to a case where four projection images are projected on a common screen.

To be more specific, the adjustment projection image $30_{50}$ projected on an upper left part, of the four adjustment projection images $30_{50}$, $30_{51}$, $30_{52}$, and $30_{53}$ projected in a lattice manner, has the set of angle adjustment regions including gradation regions 3501, 3502, and 3503 arranged in a right end, and the set of angle adjustment regions including gradation regions 3504, 3505, and 3506 arranged in a lower end.

Further, the adjustment projection image $30_{51}$ projected on an upper right part has the set of angle adjustment regions including gradation regions 3511, 3512, and 3513 arranged in a left end, in which directions of luminance gradients are respectively reversed to the gradation, regions 3501, 3502, and 3503, and the set of angle adjustment regions including gradation regions 3514, 3515, and 3516 arranged in a lower end.

Further, the adjustment projection image $30_{53}$ projected on a lower right part has the set of angle adjustment regions including gradation regions 3534, 3535, and 3536 arranged in an upper end, in which directions of luminance gradients are respectively revered to the gradation regions 3514, 3515, and 3516, and a set of angle adjustment regions including gradation regions 3531, 3532, and 3533 arranged in a left end.

Still further, the adjustment projection image $30_{52}$ projected on a lower left part has the set of angle adjustment regions including gradation regions 3524, 3525, and 3526 arranged in an upper end, in which directions of luminance gradients are respectively reversed to the gradation regions 3504, 3505, and 3506, and the set of angle adjustment regions including gradation regions 3521, 3522, and 3523 arranged in a right end, in which directions of luminance gradients are respectively reversed to the gradation regions 3531, 3532, and 3533.

The sets of angle adjustment regions arranged in the facing sides are overlapped and the four adjustment projection images $30_{50}$, $30_{51}$, $30_{52}$, and $30_{53}$ are projected on the screen 14 to form the overlapped regions, respectively. Then, for example, based on the projection position of the adjustment projection image $30_{50}$, the angle adjustment of the projection images of the adjustment projection images $30_{51}$ and $30_{52}$ adjacent to the adjustment projection image $30_{50}$ are performed. After adjustment of emission positions of the adjustment projection images $30_{51}$ and $30_{52}$ is completed, the angle adjustment of the projection image of the adjustment projection image $30_{53}$ is performed based on either one of the adjustment projection images $30_{51}$ and $30_{52}$.

After the adjustment of emission positions of the adjustment projection images $30_{50}$, $30_{51}$, $30_{52}$, and $30_{53}$ is completed, the angle adjustment of the projection images may be executed again, as needed, based on the adjustment projection image other than the adjustment projection image $30_{50}$, which has first served as the reference.

Second Modification of Fifth Embodiment

Next, a second modification of the fifth embodiment will be described. In the first modification of the fifth embodiment, the number of projection image that can be projected on the screen 14 at the same time is limited to 4. In the second modification of the fifth embodiment, a set of angle adjustment regions is arranged in each side. Therefore, the upper limit of the number of projection images that can be projected on the screen 14 at the same time is eliminated.

Figures 29A, 29B:
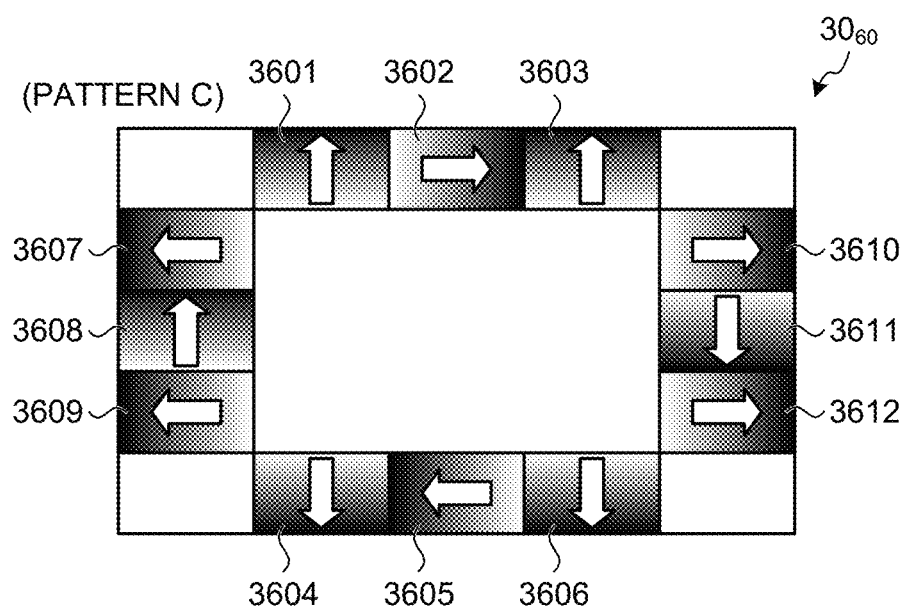
FIG. 29A is a diagram illustrating a first example of an adjustment projection image in a second modification of the fifth embodiment.
FIG. 29B is a diagram illustrating the first example of an adjustment projection image in the second modification of the fifth embodiment.

FIGS. 29A and 29B illustrate a first example of adjustment projection images in the second modification of the fifth embodiment. In FIG. 29A, an adjustment projection image $30_{60}$ includes two sets of angle adjustment regions in which directions of gradients of respective regions are opposite to each other in facing sides of the adjustment projection image $30_{60}$.

That is, in the example of FIG. 29A, the adjustment projection image $30_{60}$ has the set of angle adjustment regions including gradation regions 3601, 3602, and 3603 with luminance decreased toward an upper end side, a right end side, and an upper end side, respectively, arranged in an upper end, and the set of angle adjustment regions including gradation regions 3604, 3605, and 3606 with luminance decreased toward a lower end side, a left end side, and a lower end side, respectively, arranged in the facing side. Further, the adjustment projection image $30_{60}$ includes a set of angle adjustment regions including gradation regions 3607, 3608, and 3609 with luminance decreased toward a left end side, an upper end side, and a left end side, respectively, arranged in a left end, and the set of angle adjustment regions including gradation regions 3610, 3611, and 3612 with luminance decreased toward a right end side, a lower end side, and a right end side, respectively, arranged in the facing side. This pattern of FIGS. 29A and 29B is a pattern C.

The adjustment projection image $30_{60}$ of this pattern C can be arranged in a matrix manner by overlapping the sets of angle adjustment regions of adjacent adjustment projection images, as exemplarily illustrated in FIG. 29B. In the example of FIG. 29B, nine adjustment projection images $30_{60}$ are projected in a matrix manner. However, an embodiment is not limited to this example, and a larger number of adjustment projection images $30_{60}$ may be projected in a matrix manner, or a smaller number than nine of adjustment projection images $30_{60}$ may be projected. Obviously, only two adjustment projection images $30_{60}$ may be projected.

FIGS. 30A to 30C illustrate second examples of adjustment projection images according to the second modification of the fifth embodiment. In the second example, two patterns of adjusted projection images in which configurations of sets of angle adjustment regions arranged in respective sides are different from each other are prepared. Then, these two patterns of adjustment projection images are projected in a matrix manner such that the adjustment projection images of the same pattern are not adjacent to each other. That is, in the second example, the two patterns of adjustment projection images are projected in a checkerboard manner.

FIG. 30A illustrates an example of adjustment projection images of a pattern D, which is the first pattern, and FIG. 30B illustrates an example of adjustment projection images of a pattern E, which is the second pattern. An adjustment projection image $30_{70}$ illustrated in FIG. 30A, and an adjustment projection image $30_{80}$ illustrated in FIG. 30B include two sets of angle adjustment regions in which directions of gradients of respective regions are the same in facing sides.

In FIG. 30A, the adjustment projection image $30_{70}$ of the pattern D has the set of angle adjustment regions including gradation regions 3701, 3702, and 3703, and the set of angle adjustment regions including gradation regions 3704, 3705, and 3706, with luminance decreased toward an upper end side, a left end side, and an upper end side, respectively, arranged in an upper end and a lower end. Further, the adjustment projection image $30_{70}$ has the set of angle adjustment regions including gradation regions 3707, 3708, and 3709, and the set of angle adjustment regions including gradation regions 3710, 3711, and 3712, with luminance decreased toward a right end side, a lower end side, and a right end side, respectively, arranged in a left end and a right end.

Meanwhile, in FIG. 30B, the adjustment projection image $30_{80}$ of the pattern E has the set of angle adjustment regions including gradation regions 3801, 3802, and 3803, and the set of angle adjustment regions including gradation regions 3804, 3805, and 3806, with luminance decreased toward a lower end side, a right end side, and a lower end side, respectively, arranged in an upper end and a lower end. Further, the adjustment projection image $30_{80}$ has the set of angle adjustment regions including gradation regions 3807, 3808, and 3809, and the set of angle adjustment regions including gradation regions 3810, 3811, and 3812, with luminance decreased toward a left end side, an upper end side, and a left end side, respectively, arranged in a left end and a right end.

In this second example, the adjustment projection image $30_{70}$ of the pattern D and the adjustment projection image $30_{80}$ of the pattern E are projected in a checkerboard manner, as exemplarily illustrated in FIG. 30C. In the example of FIG. 30C, five adjustment projection images $30_{70}$ of the pattern D and four adjustment projection image $30_{80}$ of the pattern E are projected in a checkerboard manner. An embodiment is not limited to this example, and a larger number of adjustment projection images $30_{70}$ and $30_{80}$ may be projected in a checkerboard manner, or a smaller number than nine as a total of adjustment projection images $30_{70}$ and $30_{80}$ may be projected. Obviously, only two adjustment projection images $30_{70}$ and $30_{80}$ may be projected.

Note that, in the first and second examples of the second modification of the fifth embodiment, the adjustment procedures described in the second modification of the first embodiment can be applied as they are, and thus detailed description is omitted.

Other Embodiments

In the adjustment device 12 (adjustment device 1200) according to the embodiments, the analysis unit 120 (the analysis unit 1210) and the control unit 121 (the control unit 121', the control unit 121", and the control unit 1211) may be configured from mutually independent hardware devices, or the functions of the analysis unit 120 (the analysis unit 1210) and the control unit 121 (the control unit 121', the control unit 121", and the control unit 1211) may be realized by an image adjustment program operated on a central processing unit (CPU).

When the functional units of the adjustment device 12 (adjustment device 1200) are realized by the image adjustment program operated on the CPU, the adjustment device 12 (adjustment device 1200) includes at least the CPU, a read only memory (ROM), a random access memory (RAM), and a data interface (I/F), and the CPU is configured to control an operation of the entire adjustment device 12 (adjustment device 1200), using the RAM as a work memory, according to programs stored in the ROM.

The data I/F is used as an interface when the control signal is supplied to the lens shift units $105_1$ and $105_2$ of the projector devices $10_1$ and $10_2$ in the first embodiment. Further, in the second embodiment, the data I/F is used as an interface when the control signal is supplied to the stand drive units $106_1$ and $106_2$ of the projector devices $10_1$ and $10_2$. Further, in the fourth and fifth embodiments, the data I/F is used as an interface when the control signal is supplied to the rotation mechanism units $1010_1$ and $1010_2$ of the projector devices $1000_1$ and $1000_2$. Further, the operation of the camera 13 can be controlled through the data I/F. Still further, the data I/F may be used as an interface when communication is performed between the projector devices that project the adjustment projection image, when a large number of adjustment projection images are projected, like the first and second modifications of the first embodiment. A communication I/F that performs communication through a network may be further provided in the adjustment device 12 (adjustment device 1200).

The image adjustment program of the embodiment is configured to be stored on a computer connected through a network, and provided by being downloaded through the network. Further, the image adjustment program of the embodiments may be configured to be provided or distributed through the network. This program can be provided by being stored in ROM in advance.

An embodiment is not limited to the above examples, the program of the embodiments may be provided by being recorded in a computer-readable recording medium such as a compact disk (CD) or a digital versatile disk (DVD) in a file in an installable format or executable format. In this case, the image adjustment program is supplied to the adjustment device 12 through an external drive device connected to the data I/F, for example.

The image adjustment program of the embodiments has a module configuration including the above-described units (the analysis unit 120 (the analysis unit 1210), and the control unit 121 (the control unit 121', the control unit 121", or the control unit 1211)). As actual hardware, the CPU reads the image adjustment program from the ROM and executes the program, so that the above-described units are loaded on a main storage device (the RAM, for example), and the units are generated on the main storage device.

Further, in the above description, it has been described that the camera 13, the adjustment device 12 (the adjustment device 1200), the image output device 11, and the projector device 10₁ (the projector device 10₂, the projector device 1000₁, and the projector device 1000₂) are independent hardware devices. However, an embodiment is not limited to this example.

For example, the adjustment device 12 (the adjustment device 1200) and the image output device 11 may be integrally configured, and the camera 13 may be further included in the configuration. In this case, the configuration in which the camera 13, the adjustment device 12 (the adjustment device 1200), and the image output device 11 are integrated can be realized using a multi-functional mobile phone device such as a smart phone, or a tablet-type computer.

Further, the camera 13, the adjustment device 12 (the adjustment device 1200), and the image output device 11 can be incorporated in the projector device 10₁ (the projector device 10₂, the projector device 1000₁, or the projector device 1000₂). In this case, the positioning adjustment processing similar to the above description can be performed using the projector device 10₁ in which the camera 13, the adjustment device 12 (the adjustment device 1200), and the image output device 11 are incorporated, and another projector device responding to the control data by the control unit 121, or the control signal by the control unit 121' (the control unit 1211).

Further, an embodiment is not limited to the above example, the projector device 10₁ (the projector device 10₂, the projector device 1000₁, or the projector device 1000₂) in which the camera 13, the adjustment device 12 (the adjustment device 1200), and the image output device 11 are incorporated, and another projector device not responding to the control data by the control unit 121, or the control signal by the control unit 121' (the control unit 1211) may be used. In this case, for example, the projector device 10₁ and the another projector device respectively project the adjustment projection images 30₁ and 30₂ to form the overlapped region 33', and capture the entire projection image 300 using the camera 13 incorporated in the projector device 10₁. Then, the adjustment device 12 controls the lens shift unit 105₁ of the projector device 10₁, based on the captured image of the entire projection image 300, to perform the position adjustment.

According to the present invention, an effect to highly accurately perform positioning of a projection image among a plurality of projector devices is exhibited.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-projector system comprising:
two or more projection devices including a first projection device and a second projection device;
an image output device configured to output an image to each of the two or more projection devices; and
an adjustment device configured to adjust projection positions of projection images on a medium to be projected, the projection images being projected by the two or more projection devices, and
a first projection image emitted by the first projection device, and a second projection image emitted by the second projection device being projected on the medium to be projected to have an overlapped region, wherein
each of the projection devices includes
a light emission unit configured to modulate light from a light source according to an input image to emit the light as the projection image, and
an emission position adjustment unit configured to adjust an emission position of the light by the light emission unit,
the image output device includes
an output unit configured to output a first adjustment image and a second adjustment image, as the input images of the first projection device and the second projection device, respectively,
the first adjustment image having an adjustment region formed in a region corresponding to the overlapped region of the first projection image, the adjustment region including a first gradation region and a second gradation region in which directions of luminance gradients intersect with each other, and
the second adjustment image having an adjustment region formed in a region corresponding to the overlapped region of the second projection image, the adjustment region including a third gradation region having a direction of a luminance gradient being opposite to the first gradation region, and a fourth gradation region having a direction of a luminance gradient being opposite to the second gradation region, and in which the third gradation region is arranged in a position corresponding to the first gradation region, and the fourth gradation region is arranged in a position corresponding to the second gradation region,
the adjustment device includes
a capturing unit being configured to capture the projection image projected on the medium to be projected and output a captured image,
an analysis unit being configured to acquire first luminance of a region where the first gradation region and the third gradation region are overlapped, the first gradation region and the third gradation region being included in the overlapped region of a first adjustment projection image projected on the medium to be projected by the first projection device based on the first adjustment image, and a second adjustment projection image projected on the medium to be projected by the second projection device based on the second adjustment image, second luminance of a region where the second gradation region and the fourth gradation region are overlapped, and third luminance of a region outside the overlapped region, in at least one of the first adjustment projection image and the second adjustment projection image, by analyzing the captured image, a control unit being configured to output a control signal for controlling the emission position adjustment unit of the projection device so that each of the first luminance and the second luminance acquired by the analysis unit is matched with the third luminance.

2. The multi-projector system according to claim 1, wherein the control unit calculates a first moving distance of the emission position with respect to the direction of the gradient of the first gradation region, and a second moving distance of the emission position with respect to the direction of the gradient of the second gradation region, based on the first luminance, the second luminance, and the third luminance, and generates the control signal for moving the emission position according to the calculated first moving distance and second moving distance.

3. The multi-projector system according to claim 2, wherein the control unit calculates the first moving distance, based on a ratio of the third luminance, and a difference between the first luminance and the third luminance, and a width of the direction of the gradient of the first gradation region, and calculates the second moving distance, based on a ratio of the third luminance, and a difference between the second luminance and the third luminance, and a width of the direction of the gradient of the second gradation region.

4. The multi-projector system according to claim 1, wherein the capturing unit captures at least the overlapped region, and a predetermined range outside the overlapped region, and adjacent to the overlapped region, of the first adjustment projection image and the second adjustment projection image projected on the medium to be projected, and outputs the captured image.

5. The multi-projector system according to claim 1, wherein the capturing unit has resolution of luminance with which a tone corresponding to the number of pixels included in the width of the direction of the luminance gradient of the adjustment region is recognizable.

6. The multi-projector system according to claim 1, wherein the emission position adjustment unit adjusts the emission position of the light by moving an optical axis of the light emitted from the light emission unit.

7. The multi-projector system according to claim 1, wherein the emission position adjustment unit adjusts the emission position of the light by moving a position of the projection device.

8. The multi-projector system according to claim 1, wherein the light emission unit includes an optical modulation element configured to modulate the light from the light source according to the input image, and the emission position adjustment unit adjusts the emission position of the light by moving a position of the input image on the optical modulation element.

9. A projector device comprising:

a light emission unit configured to modulate light from a light source according to an input image and emit the light as a projection image;

an emission position adjustment unit configured to adjust an emission position of the light by the light emission unit;

a capturing unit configured to capture the projection image projected on a medium to be projected to output a captured image;

an analysis unit configured to analyze the captured image to acquire first luminance of a region where a first gradation region and a third gradation region are overlapped, the first gradation region and the third gradation region being included in an overlapped region of a first adjustment projection image and a second adjustment projection image, the first adjustment projection image being projected on the medium to be projected from the light emission unit, based on a first adjustment image having an adjustment region formed in a region corresponding to the overlapped region of a first projection image emitted from the light emission unit with a second projection image projected by another projector device, the adjustment region including the first gradation region and a second gradation region in which directions of luminance gradients intersect with each other, the second adjustment projection image being based on a second adjustment image having an adjustment region arranged in a region corresponding to the overlapped region of the second projection image projected by another projector device, the adjustment region including the third gradation region having a direction of a luminance gradient being opposite to the first gradation region, and a fourth gradation region having a direction of a luminance gradient being opposite to the second gradation region, and in which the third gradation region is arranged in a position corresponding to the first gradation region, and the fourth gradation region is arranged in a position corresponding to the second gradation region, second luminance of a region where the second gradation region and the fourth gradation region are overlapped, and third luminance of a region outside the overlapped region, in at least one of the first adjustment projection image and the second adjustment projection image; and a control unit configured to generate and output a control signal for controlling the emission position adjustment unit so that each of the first luminance and the second luminance acquired by the analysis unit is matched with the third luminance.

10. An adjustment device comprising:

an analysis unit configured to analyze a captured image obtained by capturing a projection image projected on a medium to be projected to acquire first luminance of a region where a first gradation region and a third gradation region are overlapped, the first gradation region and the third gradation region being included in an overlapped region of a first adjustment projection image and a second adjustment projection image, the first adjustment projection image being projected on the medium to be projected from a light emission unit, based on a first adjustment image having an adjustment region formed in a region corresponding to an overlapped region of a first projection image emitted from the light emission unit of a first projector device with a second projection image projected by a second projector device, the adjustment region including the first gradation region and a second gradation region in which directions of luminance gradients intersect with each other, the second adjustment projection image being based on a second adjustment image having an adjustment region formed in a region corresponding to the overlapped region of the second projection image projected by the second projector device, the adjustment region including the third gradation region having a direction of a luminance gradient being opposite to the first gradation region, and a fourth gradation region having a direction of a luminance gradient being opposite to the second gradation region, and in which the third gradation region is arranged in a position corresponding to the first gradation region, and the fourth gradation region is arranged in a position corresponding to the second gradation region, second luminance of a region where the second gradation region and the fourth gradation region are overlapped, and third luminance of a region outside the overlapped region, in at least one of the first adjustment projection image and the second adjustment projection image; and a control unit configured to generate a control signal for adjusting an emission position of at least the first projection image by the light emission unit of the first projector device so that each of the first luminance and the second luminance acquired by the analysis unit is matched with the third luminance.

11. An adjustment method comprising the steps of:

analyzing a captured image obtained by capturing a projection image projected on a medium to be projected to acquire first luminance of a region where a first gradation region and a third gradation region are overlapped, the first gradation region and the third gradation region being included in an overlapped region of a first adjustment projection image and a second adjustment projection image, the first adjustment projection image being projected on the medium to be projected from a light emission unit, based on a first adjustment image having an adjustment region formed in a region corresponding to an overlapped region of a first projection image emitted from the light emission unit of a first projector device with a second projection image projected by a second projector device, the adjustment region including the first gradation region and a second gradation region in which directions of luminance gradients intersect with each other, the second adjustment projection image being based on a second adjustment image having an adjustment region formed in a region corresponding to the overlapped region of the second projection image projected by the second projector device, the adjustment region including the third gradation region having a direction of a luminance gradient being opposite to the first gradation region, and a fourth gradation region having a direction of a luminance gradient being opposite to the second gradation region, and in which the third gradation region is arranged in a position corresponding to the first gradation region, and the fourth gradation region is arranged in a position corresponding to the second gradation region, second luminance of a region where the second gradation region and the fourth gradation region are overlapped, and third luminance of a region outside the overlapped region, in at least one of the first adjustment projection image and the second adjustment projection image; and generating a control signal for adjusting an emission position of at least the first projection image by the light emission unit of the first projector device so that each of the first luminance and the second luminance acquired by the analyzing step is matched with the third luminance.

12. A non-transitory computer-readable recording medium for causing a computer to execute the adjustment method according to claim 11.

13. A multi-projector system comprising:

two or more projection devices including a first projection device and a second projection device;

an image output device configured to output an image to each of the two or more projection devices; and an adjustment device configured to adjust projection positions of projection images on a medium to be projected, the projection images being projected by the two or more projection devices, and a first projection image emitted by the first projection device, and a second projection image emitted by the second projection device being projected on the medium to be projected to have an overlapped region, wherein each of the projection devices includes a light emission unit configured to modulate light from a light source according to an input image to emit the light as the projection image, and an angle adjustment unit configured to adjust an angle of the projection image emitted by the light emission unit, the image output device includes an output unit configured to output a first adjustment image and a second adjustment image as the input images of the first projection device and the second projection device, respectively, the first adjustment image having a first gradation region with luminance inclined in a first direction, formed in a region corresponding to the overlapped region of the first projection image, the second adjustment image having a second gradation region with luminance inclined in a second direction opposite to the first direction, and arranged in a position corresponding to the first gradation region, in a region corresponding to the overlapped region of the second projection image, the adjustment device includes a capturing unit configured to capture a projection image projected on a medium to be projected and output a captured image, an analysis unit configured to analyze the captured image to acquire luminance change in a direction perpendicular to the first direction, of a region where the first gradation region and the second gradation region are overlapped, the first gradation region and the second gradation region being included in an overlapped region of a first adjustment projection image projected on the medium to be projected by the first projection device, based on the first adjustment image, and a second adjustment projection image projected on the medium to be projected by the second projection device, based on the second adjustment image, and a control unit configured to output a first control signal for controlling the angle adjustment unit of the projection device so that the luminance change acquired by the analysis unit falls within a predetermined range.

14. The multi-projector system according to claim 13, wherein each of the projection devices further include an emission position adjustment unit configured to adjust an emission position of the light by the light emission unit, the output unit further forms, for the first adjustment image, a third gradation region with luminance inclined in a third direction intersecting with the first direction, in a region corresponding to the overlapped region of the first projection image, and for the second adjustment image, a fourth gradation region with luminance inclined in a fourth direction opposite to the third direction, in a position corresponding to the third gradation region, in a region corresponding to the overlapped region of the second projection image, the analysis unit analyzes the captured image to further acquire first luminance of a region where the first gradation region and the second gradation region are overlapped, the first gradation region and the second gradation region being included in an overlapped region of the first adjustment projection image and the second adjustment image, second luminance of a region where the third gradation region and the fourth gradation region are overlapped, and third luminance of a region outside the overlapped region, in at least one of the first adjustment projection image and the second adjustment projection image, and the control unit further outputs a second control signal for controlling the emission position adjustment unit of the projection device so that each of the first luminance and the second luminance acquired by the analysis unit is matched with third luminance.

15. The multi-projector system according to claim 14, wherein the adjustment device acquires the first luminance, the second luminance, and the third luminance from the captured image by the analysis unit, after the angle adjustment unit is controlled by the first control signal, and outputs the second control signal, based on the first luminance, the second luminance, and the third luminance by the control unit.

16. The multi-projector system according to claim 14, wherein the control unit calculates a first moving distance of the emission position with respect to the direction of the gradient of the first gradation region, and a second moving distance of the emission position with respect to the direction of the gradient of the third gradation region, based on the first luminance, the second luminance, and the third luminance, and generates the second control signal for moving the emission position according to the calculated first moving distance and second moving distance.

17. The multi-projector system according to claim 16, wherein the control unit calculates the first moving distance, based on a ratio of the third luminance, and a difference between the first luminance and the third luminance, and a width of the direction of the gradient of the first gradation region, and calculates the second moving distance, based on a ratio of the third luminance, and a difference between the second luminance and the third luminance, and a width of the direction of the gradient of the third gradation region.

18. The multi-projector system according to claim 14, wherein the capturing unit captures at least the overlapped region, and a predetermined range outside the overlapped region, and adjacent to the overlapped region, of the first adjustment projection image and the second adjustment projection image projected on the medium to be projected, and outputs the captured image.

* * * * *